US012365478B1

(12) United States Patent
Whaley et al.

(10) Patent No.: US 12,365,478 B1
(45) Date of Patent: Jul. 22, 2025

(54) AIRCRAFT MODIFICATION SYSTEM FOR SAFELY SECURING AN AERIAL REFUELING SYSTEM (ARS) TO A FUSELAGE SUBSYSTEM AND OPERATIVELY INTERFACING THE ARS WITH AIRCRAFT SYSTEMS, A REFUELING SYSTEM(S) MANAGER, AND OTHER SYSTEMS/COMPONENTS OF THE AIRCRAFT MODIFICATION SYSTEM

(71) Applicant: OnStation Corporation, Los Angeles, CA (US)

(72) Inventors: Lewis Allen Whaley, Charleston, WV (US); Mark Richard Jean, Palmdale, CA (US)

(73) Assignee: OnStation Corporation, Los Angeles, CA (US)

( * ) Notice: Subject to any disclaimer, the term of this patent is extended or adjusted under 35 U.S.C. 154(b) by 0 days.

(21) Appl. No.: 18/810,242

(22) Filed: Aug. 20, 2024

Related U.S. Application Data

(63) Continuation of application No. 17/828,915, filed on May 31, 2022, now Pat. No. 12,077,313.

(60) Provisional application No. 63/194,179, filed on May 28, 2021.

(51) Int. Cl.
  B64D 39/00 (2006.01)
  G09B 19/16 (2006.01)
(52) U.S. Cl.
  CPC ........... *B64D 39/00* (2013.01); *G09B 19/165* (2013.01)

(58) Field of Classification Search
  CPC ...... B64D 39/00; G09B 19/16; G09B 19/165; G09B 9/00
  See application file for complete search history.

(56) References Cited

U.S. PATENT DOCUMENTS

| 6,917,908 | B2 | 7/2005 | Williams | |
|---|---|---|---|---|
| 8,226,040 | B2 * | 7/2012 | Neto | B64C 17/10 244/135 C |
| 8,814,096 | B2 * | 8/2014 | Spottiswoode | G01M 1/127 244/135 C |
| 9,355,571 | B2 | 5/2016 | Rucci | |

(Continued)

*Primary Examiner* — Timothy A Musselman
(74) *Attorney, Agent, or Firm* — Concourse Law Group; Katherine B. Sales, Esq.

(57) ABSTRACT

Aircraft modification system for transforming an aircraft (that includes an aircraft fuselage, aircraft flight control surfaces, and aircraft subsystems). The aircraft modification system includes an aerial refueling system (ARS), a refueling system(s) manager, interface subsystems (including multi-dimensional/adjustable structural supports and operative interconnection systems) that secure the ARS to a fuselage subsystem and operatively interface the ARS with the aircraft systems, the refueling system(s) manager, and other systems of the aircraft modification system. The aircraft modification system includes: one or more aerial refueling (AR) apparatuses; a center-of-gravity (CG) subsystem for controlling fuel movement between and to and from a plurality of fuel tanks to manage and control (adjust) the aircraft CG; a flight control system (FCS) for controlling aircraft flight control surfaces; and CG-FCS interconnect subsystems that coordinate control of the aircraft CG and control of the aircraft flight control surfaces for improving flight performance and for selectively stabilizing AR presentations.

30 Claims, 26 Drawing Sheets

(56) References Cited

U.S. PATENT DOCUMENTS

2005/0051666 A1\* 3/2005 Lee .................. B64C 17/10
 244/10
2006/0240389 A1 10/2006 Testrake \* cited by examiner (Looking Aft)

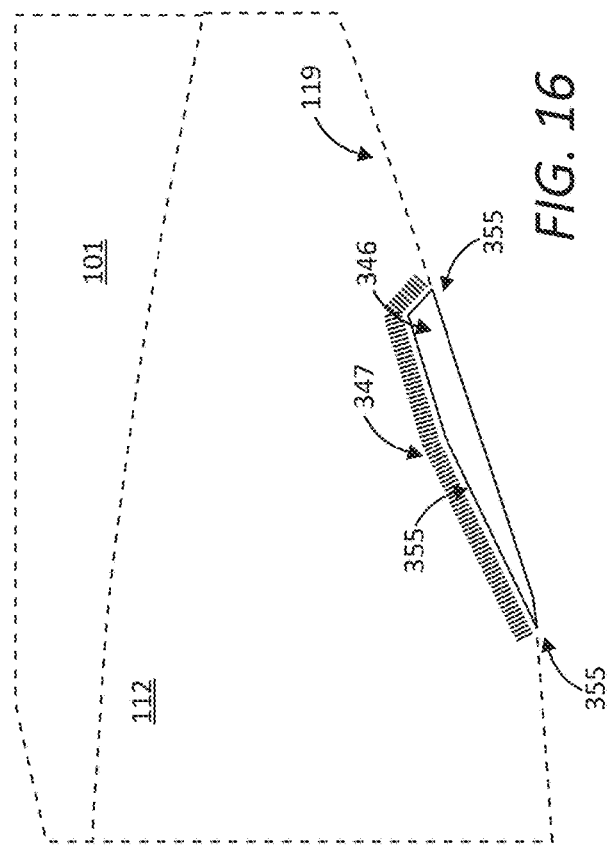
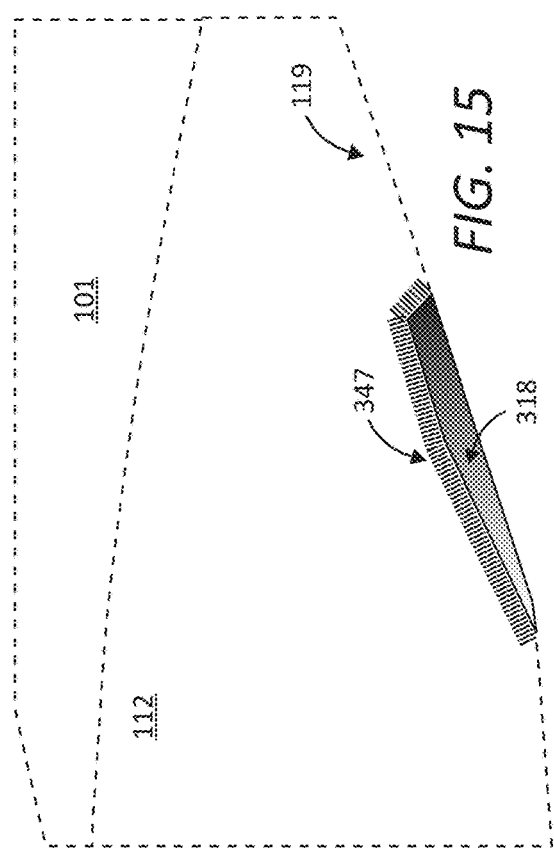
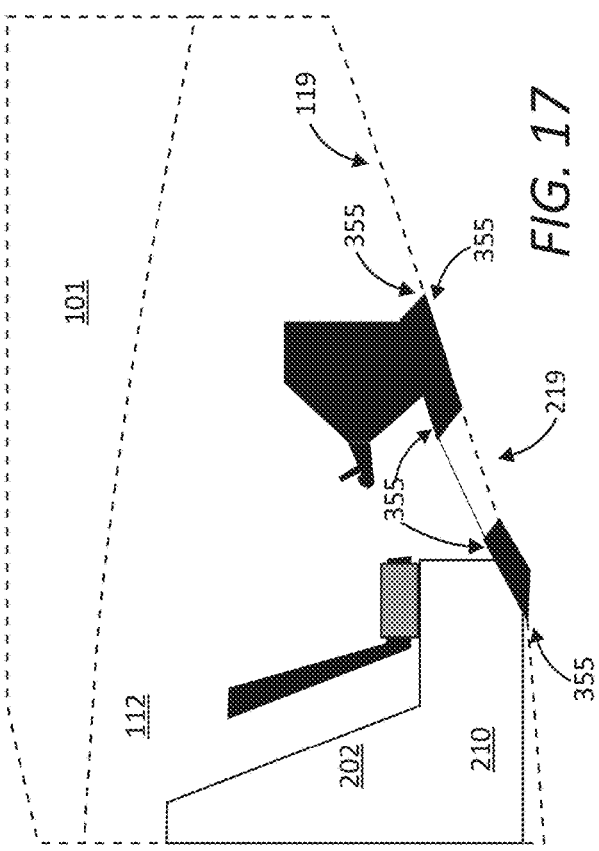

AIRCRAFT MODIFICATION SYSTEM FOR SAFELY SECURING AN AERIAL REFUELING SYSTEM (ARS) TO A FUSELAGE SUBSYSTEM AND OPERATIVELY INTERFACING THE ARS WITH AIRCRAFT SYSTEMS, A REFUELING SYSTEM(S) MANAGER, AND OTHER SYSTEMS/COMPONENTS OF THE AIRCRAFT MODIFICATION SYSTEM

CROSS-REFERENCE TO RELATED APPLICATION/PRIORITY CLAIM

The present application is a continuation of, and claims the benefit of, U.S. Utility patent application Ser. No. 17/828,915, filed on May 31, 2022, the entirety of which is incorporated by reference herein, which claims priority to U.S. Provisional Patent Application Ser. No. 63/194,179, filed on May 28, 2021, the entirety of which is incorporated herein by reference.

FIELD OF THE INVENTION

In various embodiments, the present invention generally relates to computer-based tools, devices, and processes for performing aerial refueling (AR) procedures using low-cost attritable aircraft (LCAA). In certain embodiments, the invention relates to using selectively-autonomous aerial refueling (SAAR) technology in connection with AR procedures.

BACKGROUND

Aerial refueling (AR) aircraft are relatively large, expensive to operate, and are usually in scarce supply. AR aircraft missions often demand refueling aircraft with tens of thousands of pounds of fuel during each sortie. At excessive cost and effort, the military typically needs to contract with civilian tanker companies to provide large, expensive tankers to address aircraft pilot and operator AR training deficiencies. However, despite assistance from contract refuelers, the high demand for (and the shortage of) AR tankers continues to contribute to the failure of efforts to address AR needs for aircraft fleets. Compounding this issue is the fact that government funding is often insufficient or limited, and this further exacerbates the expense issues associated with AR tanker pilot and operator training costs.

What are needed, therefore, are improved aircraft configurations, techniques, devices, and tools that can more effectively and efficiently perform AR procedures. Technological enhancements are needed which can leverage the use of low-cost attributable aircraft (LCAA) to accomplish different AR objectives.

SUMMARY

In various embodiments, systems, methods and configurations are provided to create a Selectively-Autonomous Aerial Refueling (SAAR) system, removably installed to modify and automate LCAA to fly missions as aerial refueling tankers, C3 nodes, ISR platforms, ASW platforms, MDA platforms, and networked strike fighter weapons platforms. In various aspects, a SAAR fuselage assembly removably attaches to LCAA fuselage hard points, and temporarily replaces a portion of aircraft fuselage floor wall to retain aircraft pressure vessel integrity. An Aerial Refueling Store (ARS), installed inside SAAR fuselage assembly, deploys or stows the refueling hose. SAAR fuel and center of gravity (CG) control systems transfer fuel in LCAA, SAAR and ARS—improving control and stability of LCAA and basket/drogue—for greater safety and mission effectiveness.

In other embodiments, SAAR-modified LCAA serve as C3 and sensor nodes for Advanced Battle Management System (ABMS) and other tactical edge networks, building the common operational picture, and supporting missions that include crewed/uncrewed weapons delivery. Also, SAAR-equipped LCA or LCAA aircraft may be used in crewed, semi-autonomous or autonomous configurations.

In an example embodiment, an aircraft modification system for an aircraft (in implementations in which the aircraft has an aircraft fuselage, aircraft flight control surfaces, and aircraft subsystems comprising one or more aircraft fuel systems, and an aircraft flight control system (FCS), and the aircraft is characterized by an aircraft center-of-gravity (CG)) comprises: an aerial refueling system (ARS); an ARS fuel management subsystem operatively integrated with the ARS; an ARS carriage assembly secured inside the aircraft fuselage and configured to support and secure the ARS when the ARS is installed within the ARS carriage assembly; a fuselage subsystem secured to the aircraft fuselage and configured to support and secure the ARS carriage assembly when the ARS carriage assembly is installed within the fuselage subsystem; a center-of-gravity (CG) subsystem configured to control movement of fuel between and to and from a plurality of fuel tanks to manage and control the aircraft CG; a refueling system(s) manager operatively integrated with and configured to manage the one or more aircraft fuel systems, the ARS, the ARS fuel management subsystem, the aircraft FCS, and the CG subsystem, to manage and control the aircraft CG; and interface subsystems comprising one or more support structures configured to provide structural support or reinforcement for, and between, the aircraft fuselage, the fuselage subsystem, the ARS carriage assembly, the ARS, and the refueling system(s) manager, the one or more support structures comprising one or more adjustable structures, and one or more operative interconnection systems configured to operatively interface the aircraft, the aircraft subsystems, the fuselage subsystem, the ARS carriage assembly, the ARS, and the refueling system(s) manager with each other. In example embodiments (in implementations in which the aircraft also has one or more aircraft fuel management subsystems), the refueling system(s) manager is, for example, operatively integrated with and configured to manage: the one or more aircraft fuel systems, the one or more aircraft fuel management subsystems, the ARS, the ARS fuel management subsystem, the aircraft FCS, and the CG subsystem, to manage and control the aircraft CG. In example embodiments (in implementations in which the aircraft also has an aircraft automatic flight control system (AFCS)), the refueling system(s) manager is, for example, operatively integrated with and configured to manage: the one or more aircraft fuel systems, the one or more aircraft fuel management subsystems, the ARS, the ARS fuel management subsystem, the aircraft FCS, the aircraft AFCS, and the CG subsystem, to manage and control the aircraft CG.

In example embodiments, the ARS carriage assembly is installed within the fuselage subsystem and comprises a carriage floor, a plurality of structural columns, and a plurality of support members extending along the carriage floor; wherein the carriage floor comprises load bearing locations, and the plurality of structural columns and the plurality of support members are secured to the carriage floor at the load bearing locations and configured to longitudinally, vertically, laterally, and rotationally support and secure the ARS when the ARS is installed within the ARS carriage assembly; and wherein the fuselage subsystem comprises a sealed fuselage subsystem. In other example embodiments, the fuselage subsystem comprises an unsealed fuselage subsystem.

In example embodiments, the ARS carriage assembly is installed within the fuselage subsystem and configured to support and secure the ARS in a parallel orientation in which an ARS longitudinal axis of the ARS is substantially parallel with an aircraft longitudinal axis when the ARS is installed within the ARS carriage assembly. In example embodiments (in implementations in which the aircraft fuselage comprises a lower wall portion), the aircraft modification system further comprises: an aerial refueling (AR) hose operatively connected to the ARS; a curved guidetube configured to receive the AR hose therein and direct the AR hose when the AR hose is being deployed; and a drogue and basket subsystem operatively connected to the AR hose and configured to extend aftward from the curved guidetube when the AR hose is extended outward; and wherein the fuselage subsystem comprises a sealed fuselage subsystem comprising an exit configured, at the lower wall portion of the aircraft fuselage, to provide a passageway for the curved guidetube to extend downwardly from the sealed fuselage subsystem and guide the AR hose, when the AR hose is being deployed, into a position that provides smoother air and greater stability for the AR hose and the drogue and basket subsystem, and in providing selectively stabilized AR presentations of the AR hose and the drogue and basket subsystem to one or more receiver aircraft. The sealed fuselage subsystem is, for example, sealed against the aircraft fuselage and configured such that pressure inside the sealed fuselage subsystem is maintained at the ambient external pressure and pressure inside the aircraft fuselage is pressurized to maintain a desired pressurization for human aircrew and systems operators. The curved guidetube is, for example, fixedly secured in position in relation to the sealed fuselage subsystem when the AR hose is being deployed. The curved guidetube is, for example, configured to provide smooth unobstructed movement of the AR hose through the curved guidetube when the AR hose is being deployed, when aerial refueling operations are occurring, and when the AR hose is being retracted. The curved guidetube, by way of example, has end portions that are substantially parallel to horizon of earth, the curved guidetube, between the end portions, initially curving downward moving aftward and then curving upward to being horizontal again at the aft end of the curved guidetube wherein the curved guidetube has dimensions and an internal shape configured such that the AR hose longitudinal axis, where the AR hose enters the curved guidetube inside the sealed fuselage subsystem, is substantially parallel to the curved guidetube entrance longitudinal axis when the AR hose is stowed, in transit aft or forward, and deployed, and the AR hose longitudinal axis, where the AR hose exits the curved guidetube outside in the slipstream, is substantially parallel to the curved guidetube exit longitudinal axis when the AR hose is stowed, in transit aft or forward, and deployed; and wherein the dimensions and the internal shape of the curved guidetube, as well as materials and internal coefficient of friction, are configured to provide responsive, unrestricted movement of the AR hose within the curved guidetube.

In example embodiments, the ARS carriage assembly is installed within the fuselage subsystem and configured to support and secure the ARS in an inclined orientation in which an ARS longitudinal axis of the ARS has a 5 degree to 15 degree incline in relation to an aircraft longitudinal axis when the ARS is installed within the ARS carriage assembly. In example embodiments (in implementations in which the aircraft fuselage comprises a lower wall portion), the aircraft modification system further comprises: an aerial refueling (AR) hose operatively connected to the ARS; a drogue and basket subsystem operatively connected to the AR hose; a straight guidetube configured to receive the AR hose therein and direct the AR hose when the AR hose is being deployed; and a drogue and basket subsystem operatively connected to the AR hose and configured to extend aftward from the straight guidetube when the AR hose is extended; and wherein the fuselage subsystem comprises a sealed fuselage subsystem comprising an exit configured, at the lower wall portion of the aircraft fuselage, to provide a passageway for the straight guidetube to extend downwardly from the sealed fuselage subsystem and guide the AR hose, when the AR hose is being deployed, into a position that provides smoother air and greater stability for the AR hose and the drogue and basket subsystem, and in providing selectively stabilized AR presentations of the AR hose and the drogue and basket subsystem to one or more receiver aircraft. The straight guidetube is, for example, configured to provide smooth unobstructed movement of the AR hose through the straight guidetube when the AR hose is being deployed, when aerial refueling operations are occurring, and when the AR hose is being retracted. The straight guidetube, by way of example, is fixedly secured in position in relation to the sealed fuselage subsystem when the AR hose is being deployed; wherein the AR hose longitudinal axis, where the AR hose enters the straight guidetube inside the sealed fuselage subsystem, is substantially parallel to the straight guidetube entrance longitudinal axis when the AR hose is stowed, in transit aft or forward, and deployed, and the AR hose longitudinal axis, where the AR hose exits the straight guidetube outside in the slipstream, is substantially parallel to the straight guidetube exit longitudinal axis when the AR hose is stowed, in transit aft or forward, and deployed; and wherein the dimensions and the internal shape of the straight guidetube, as well as materials and internal coefficient of friction, are configured to provide responsive, unrestricted AR hose movement within the straight guidetube.

The refueling system(s) manager comprises, for example: one or more computer processing subsystems operatively integrated with the one or more operative interconnection systems, and one or more distributed AI/ML software and firmware subsystems operatively integrated with the one or more computer processing subsystems and the one or more operative interconnection systems.

In example embodiments (in implementations in which the aircraft has an aircraft automatic flight control system (AFCS) and is characterized by an aircraft center of lift (CL)), the aircraft modification system further comprises: one or more AI/ML subsystems; a flight control system (FCS) configured to manage and control the aircraft flight control surfaces in consideration of and responsive to onboard crewed aircraft or offboard remote pilot flight control inputs, or automatic flight control system (AFCS) inputs, or onboard or offboard AI flight control inputs, and in consideration of and responsive to a current location of the aircraft center-of-gravity (CG), the FCS being configured to manage and control the aircraft flight control surfaces such that FCS-controlled movement of the aircraft flight control surfaces manages aircraft aerodynamic control (roll, pitch, yaw, acceleration, deceleration), aircraft flight performance (speed, straight and level, climb, descent, turn) and the aircraft center of lift (CL); and a CG subsystem-AFCS interconnect (CG-AFCS-I) subsystem configured to manage and control movement of fuel within the aircraft modification system and the aircraft, in coordination with the CG subsystem, the aircraft fuel management subsystem, the one or more AI/ML subsystems, the AFCS, and the FCS, to dynamically manage the interaction of purposeful movements of the aircraft CG and of the aircraft flight controls, respectively, to manage and control the aircraft aerodynamic control (roll, pitch, yaw, acceleration, deceleration), the aircraft flight performance (speed, straight and level, climb, descent, turn), and aircraft flight performance stability, and to assist in providing one or more receiver aircraft with correct refueling presentations.

In example embodiments (in implementations in which the aircraft has an aircraft automatic flight control system (AFCS)), the aircraft modification system further comprises: one or more AI/ML subsystems; an aerial refueling (AR) hose; and a drogue and basket subsystem operatively connected to the AR hose; and wherein the refueling system(s) manager is configured to operatively manage or interface with: the one or more aircraft fuel systems, the one or more aircraft fuel management subsystem(s), the ARS, the AR hose, the drogue and basket subsystem, the ARS fuel management subsystem, the aircraft FCS, the aircraft AFCS, the AFCS, the CG subsystem, the aircraft fuel management subsystem, and the one or more AI/ML subsystems, in providing selectively stabilized AR presentations of the AR hose and the drogue and basket subsystem to one or more receiver aircraft. In example embodiments (in implementations in which the aircraft also has an aircraft CG subsystem), the refueling system(s) manager is configured to operatively manage or interface with: the one or more aircraft fuel systems, the one or more aircraft fuel management subsystem(s), the ARS, the AR hose, the drogue and basket subsystem, the ARS fuel management subsystem, the aircraft FCS, the aircraft AFCS, the AFCS, the aircraft CG subsystem, the CG subsystem, the aircraft fuel management subsystem, and the one or more AI/ML subsystems, in providing selectively stabilized AR presentations of the AR hose and the drogue and basket subsystem to one or more receiver aircraft.

In example embodiments of an aircraft modification system, the refueling system(s) manager and the interface subsystems are configured to operatively interface with and control the aerial refueling system (ARS), the AR hose, the drogue and basket subsystem, the CG subsystem, and the aircraft FCS; wherein the ARS is operatively connected with, and configured to manage and control, the AR hose and the drogue and basket subsystem, in providing AR hose, drogue, and basket deployment, retraction, and inflight refueling processes; and wherein the refueling system(s) manager is operatively interfaced with the ARS and is configured to manage and control the ARS in providing the AR hose, drogue, and basket, deployment, retraction, and inflight refueling processes, for providing selectively stabilized AR presentations of the AR hose and the drogue and basket subsystem to one or more receiver aircraft.

In example embodiments (in implementations in which the aircraft systems comprise aircraft CG subsystems and aircraft FCS subsystems, and the aircraft is characterized by an aircraft center of lift (CL)), the aircraft modification system further comprises: a flight control system (FCS); wherein the refueling system(s) manager and the interface subsystems are configured to operatively interface with and control the aerial refueling system (ARS), the AR hose, the drogue and basket subsystem, and the CG subsystem; wherein the CG subsystem comprises one or more CG management subsystems that operatively interface with and control the aircraft subsystems including the one or more aircraft fuel management subsystems, and one or more CG-to-flight control system (CG-to-FCS) interface systems that operatively interface with and control the CG management subsystems and the FCS; wherein the CG management subsystems are configured to manage and control the aircraft CG, and to interface with and provide data to the one or more CG-to-FCS interface systems; wherein the one or more CG-to-FCS interface systems are configured to interface with and provide data to the FCS; wherein the FCS is configured to manage and control the aircraft flight control surfaces in consideration of and responsive to where the aircraft CG is currently located such that the aircraft flight control surfaces manage the center of lift (CL) of the aircraft to balance the CG and the CL; and wherein the refueling system(s) manager and the interface subsystems that are operatively interfaced with the ARS and configured to manage and control the ARS in providing the AR hose, drogue, and basket, deployment, retraction, and inflight refueling processes, are additionally configured to manage the aircraft CG subsystems and the aircraft FCS subsystems for providing selectively stabilized AR presentations of the AR hose and the drogue and basket subsystem to one or more receiver aircraft. In example embodiments, the refueling system(s) manager, the CG-to-FCS interface systems, the CG management subsystem, and the flight control system manage and control the aircraft CG and the aircraft flight control surfaces in coordination with each other, for providing flight performance and mission performance optimization, and selectively stabilized AR presentations of the AR hose and the drogue and basket subsystem to one or more receiver aircraft. By way of example, the refueling system(s) manager, the CG-to-FCS interface systems, the CG management subsystem, and the flight control system are configured to provide flight performance and mission performance optimization by increasing/improving one or more of: endurance, range, speed, mission effectiveness, fuel remaining for use in the future, operational effectiveness, weather and other environmental considerations, and dynamic planning across multiple parameters for quickly updating plans when conditions and/or mission(s) change.

In example embodiments (in implementations in which the aircraft fuselage comprises a lower fuselage wall), the interface subsystems comprise: an internal fuselage reinforcement plate and an external fuselage reinforcement plate, that, together, when installed at opposite sides of the lower fuselage wall, are configured to strengthen a portion of the lower fuselage wall.

In example embodiments (in implementations in which the aircraft fuselage comprises fuselage airframe structural hard points), the fuselage subsystem comprises: a sealed fuselage subsystem installed internally to the aircraft fuselage with the ARS carriage assembly and the ARS being installed inside the sealed fuselage subsystem; and wherein the interface subsystems comprise multiple attachment points that are connected to the sealed fuselage subsystem, the multiple attachment points being connected to one or more of the fuselage airframe structural hard points. The sealed fuselage subsystem is, for example, attached to one or more adjustable structures that are connected to one or more of the fuselage airframe structural hard points via adjustable length, locking connecting rod trusses; and wherein lightweight, adjustable strain gauges measure strain on connecting rod trusses and provide data to reduce the risk of hardware failure at and around the fuselage airframe structural hard points. In example embodiments (in implementations in which the aircraft fuselage comprises fuselage ports), the aircraft modification system further comprises: an ARS pylon between the aircraft fuselage and the ARS; and wherein the one or more operative interconnection systems comprise: an ARS wiring harness and ARS fuel lines that are configured to be operatively connected to the ARS via the ARS pylon; and wherein the sealed fuselage subsystem comprises a pressure vessel that is fitted to the fuselage ports in the aircraft fuselage, for the ARS wiring harness and the ARS fuel lines to have sealed passage to the ARS pylon, such that the aircraft retains pressurization.

In example embodiments, the interface subsystems comprise: a horizontal stabilizer and a vertical stabilizer attached to one or more external portions/surfaces of the aircraft fuselage. In example embodiments, the one or more adjustable structures comprise adjustable length, locking connecting rod trusses; and the aircraft modification system further comprises: one or more fuel wiring harnesses and reporting subsystems, and one or more strain and pressure gauges that are operatively interfaced with the one or more adjustable length, locking connecting rod trusses, the one or more strain and pressure gauges being configured to provide strain and pressure gauge data to aircrew via the one or more fuel wiring harnesses and reporting subsystems. In example embodiments, the refueling system(s) manager comprises: a fuel management subsystem, one or more fuel measurement subsystems, one or more fuel wiring harnesses and reporting subsystems, a fault detection and isolation subsystem, one or more fuel tanks, one or more fuel distribution subsystems, one or more fuel pumps, and one or more fuel control units.

BRIEF DESCRIPTION OF THE FIGURES

The apparatus, features, functions, methods, configurations and advantages described herein can be achieved independently in various embodiments of the present invention disclosure or may be combined in additional embodiments, further details of which can be seen with reference to the following drawings.

FIGS. 15 through 17 provide three cutaway views of the optional SAAR temporary fuselage aft wall 346, the optional AROS viewport window 219, and the optional semi-permanent aft wall seals 355, according to various embodiments presented herein.

DESCRIPTION

Figure 1:
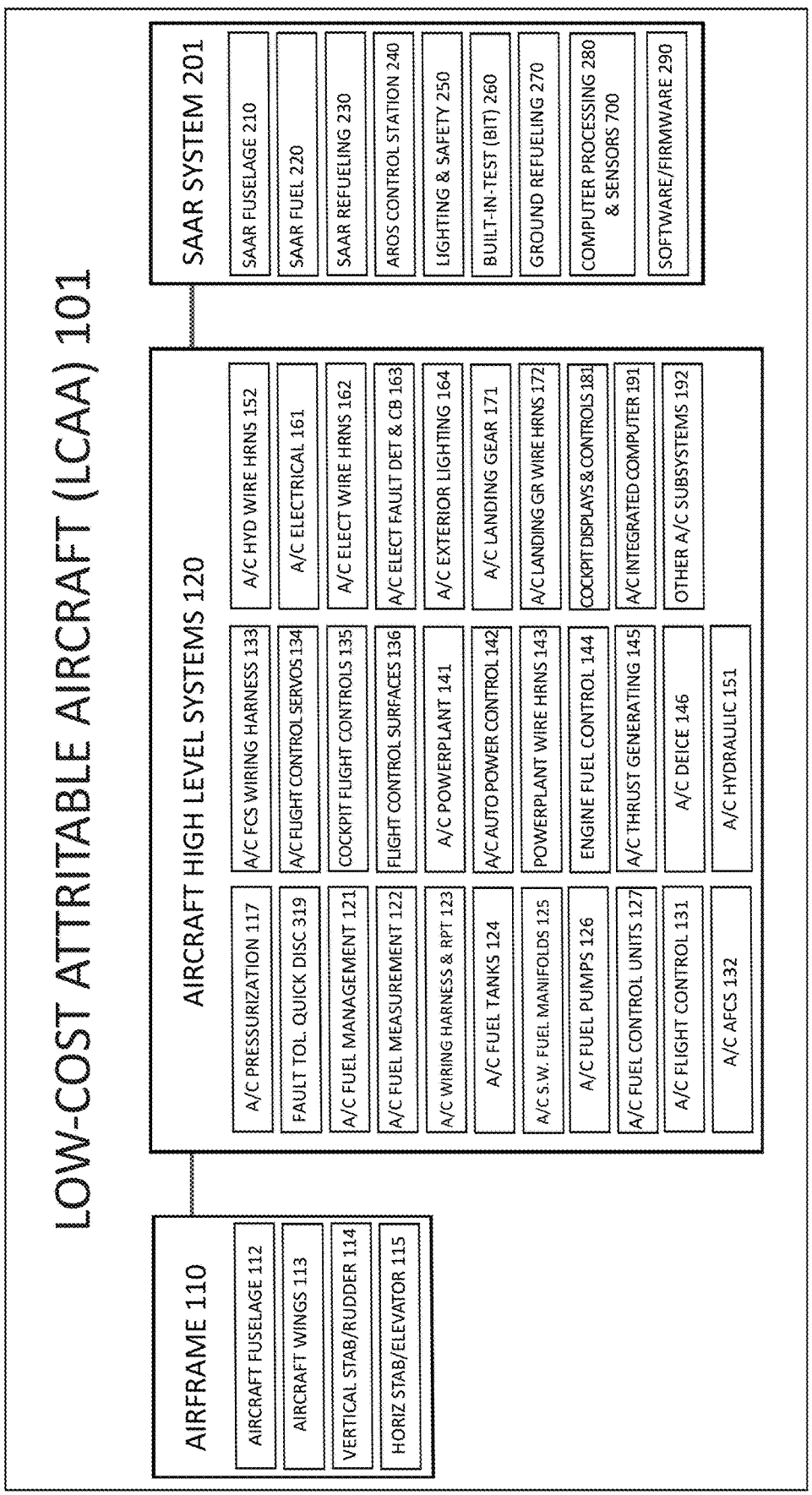
FIG. 1 is a block diagram of the Low-Cost Attritable Aircraft (LCAA) 101, the aircraft high-level systems 120, the SAAR system 201, the SAAR subsystems (210, 220, 230, 240, 250, 260, 270, 280, 290), and the SAAR Refueling System 230, according to various embodiments presented herein.

The inventors have recognized that it would be helpful if there were ways to convert existing low-cost aircraft to the aerial refueling role—aircraft that were not originally intended to be used for aerial refueling or other combat or training missions. To be useful in the aerial refueling mission, candidate low-cost aircraft would need to meet performance requirements to supplement existing aircraft such as the KC-46, MQ-25, KC-10, KC-135 and F/A-18, for example, among others. It would be helpful if there were a retrofit kit or adaptive kit that could be utilized to modify and equip old low-cost aircraft—that meet performance requirements—to be successfully modified for the aerial refueling mission.

To also be useful in LCAA missions, candidate low-cost aircraft and any such adaptive kits would need to meet additional engineering, manufacturing and product lifecycle requirements. The existing low-cost aircraft solution for this crisis are thousands of old but airworthy King Airs, Metroliners, Cheyennes, Brasilias, De Havillands, Dorniers, Saabs, Jetstreams, Fokker and other turbine aircraft. These proven, high performance aircraft cost orders of magnitude less to purchase, convert and install new equipment, and orders of magnitude less to operate. When upgraded with the right equipment and software, these previously dilapidated but now customized aircraft are "Low-Cost Attritable Aircraft" (LCAA), or "Low-Cost Attritable" (LCA) aircraft.

Inexpensive SAAR systems, built with commercial-off-the-shelf (COTS) parts and software, meet the USAF's definition of a "Low-Cost Attritable Aircraft Technology" (LCAAT). Moreover, reconfigured LCAA may be flown crewed, or uncrewed—in the semi-autonomous or autonomous role. Unlike KC-46 and MQ-25 high value targets, crewed or uncrewed LCAA's may be flown on "higher risk" missions. If crewed, aircrew may bail out of an LCAA that is in imminent danger of being shot down or has been damaged such that a bailout is appropriate. If uncrewed, LCAA outfitted (converted/equipped/modified) with SAAR become expendable AR tankers and other mission-capable aircraft, including expendable weapons systems. Damaged uncrewed LCAA tankers may be flown to targets and used as precision ordnance. Installing a SAAR system into an LCA aircraft is relatively inexpensive and quick. Candidate aircraft for the LCAA role are available throughout the world and support a variety of missions. Palletized SAAR systems, for quick installation in LCAAs, can be shipped by truck, sea or air.

LCAA are inexpensive commercial aircraft that are not designed for military aerial refueling, ISR, communications, data link, or other military missions, and are not designed for crewed, semi-autonomous or autonomous configurations. Candidate aircraft for the LCAA role and for SAAR installation, as described herein, are aircraft that can fly fast enough and can carry enough weight to provide AR tanker support, and that also have sufficient room inside the aircraft's fuselage to enable internal installation of a SAAR Aerial Refueling Store (ARS). Candidate aircraft for LCAA and SAAR have a fuselage interior that is large enough to install an assembled or partially assembled SAAR Aerial Refueling Store (ARS), SAAR fuel tanks, fuel management systems, and an Aerial Refueling Operator Station (AROS). When "dry plugging" is appropriate, candidate aircraft for SAAR may not need to be converted to carry additional fuel inside their fuselage. They may only need to be fitted with an internally installed SAAR Aerial Refueling Store (ARS). In other words, for AR training missions, LCAAs fitted with the SAAR system may not need to offload fuel to receiver aircraft. Regardless of whether a SAAR equipped LCAA may offload fuel or not, candidate non-military aircraft for the SAAR role, and prior to SAAR installation, do not have the internal fuel tanks, fuel distribution systems, nor refueling apparatus required to refuel other aircraft inflight. For AR missions, LCA aircraft provide an appropriate alternative to large, expensive military tankers.

Example embodiments and implementations described herein involve systems, apparatuses, methods and configurations that produce an effective, inexpensive and safe aerial refueling system that is the least expensive and fastest to modify and create. This disclosure presents a value proposition, which in example embodiments utilizes Federal Aviation Administration (FAA) and Naval Air Systems Command (NAVAIRSYSCOM) approved components.

To accomplish the SAAR conversion, there are several design hurdles for LCAAs to overcome. This is due to (1) airspeeds required by many AR receiver aircraft, (2) drag created by an external SAAR Aerial Refueling Store (ARS), and (3) the LCAA-specific requirement to manage center of gravity (CG) when extra fuel is carried inside of an LCAA fuselage. These challenges require new apparatus and methods. LCAAs must fly fast enough to meet AR receiver aircraft speed requirements, they must carry sufficient fuel when "give" is required by receiver aircraft, and they may need to actively manage CG. If CG management is required, SAAR CG management may need to be integrated with the LCAA onboard flight control subsystem (FCS) and/or autopilot system. Once converted with the SAAR system, LCA aircraft are fully functional for the AR mission.

Combined with or separate from the Aerial Refueling role, SAAR-converted Low-Cost Attritable Aircraft (LCAA) may perform as a platform for a variety of high-risk, extended range and endurance missions. With the SAAR AI computer, network, and sensors installed, LCA aircraft may be further modified to fly semi-autonomous or autonomous missions. Additionally, with the SAAR AI computer, network, and sensors installed, LCA aircraft may be further modified to fly with network communications, networked sensors or networked weapons.

In conjunction with aerial refueling or separately, LCAA missions may include crewed or uncrewed network node in a secure communications, command, and control (C3) network topology, that may be incorporated into the Advanced Battle Management System (ABMS). ABMS is a new network enabling a secure military Internet of Things (IoT). ABMS is a tactical edge C3 initiative within the Joint All-Domain Command and Control (JADC2). JADC2 ubiquitously connects sensors, weapons, platforms and people. JADC2 provides seamless command and control (C3) for Joint Forces, and enables lightning-quick maneuver warfare with intelligent swarming Skyborg and LCA aircraft. Applications and operational environments may include: crewed or uncrewed networked sensors ISR platform; crewed or uncrewed networked weapons ASW platform; crewed or uncrewed networked maritime domain awareness (MDA) platform; crewed or uncrewed networked weapons strike platform; and/or crewed or uncrewed networked weapons fighter platform.

There are no known previous attempts or suggestions in known literature to convert Low-Cost Attritable Aircraft (LCAA) to the tanker role—nor to the tactical edge C3 network node, ISR, ASW, MDA, networked weapon, or fighter roles—in the crewed, semi-autonomous or autonomous configurations. In example embodiments, SAAR-equipped LCAA become actively contributing decision-support nodes in tactical edge C3 networks.

Example technologies and methodologies described herein involve renovating old low-cost aircraft to SAAR-converted Low-Cost Attritable Aircraft (LCAA), and converting external Aerial Refueling System (ARS) Buddy Pods—which are further integrated with adaptive SAAR Kits—to transform LCA aircraft so they may fulfill requirements for the AR tanker and other combat and training roles.

Systems and methods described herein provide a Selectively-Autonomous Aerial Refueling (SAAR) System (or selectively-autonomous multi-role aircraft conversion system) 201 that is semi-permanently installed to modify Low-Cost Attritable Aircraft (LCAA) to fill the AR tanker, and the tactical edge C3, ISR, ASW, MDA, networked weapon, or fighter roles. The modular SAAR system can be semi-permanently installed in the slightly modified fuselage of a Low-Cost Attritable Aircraft (LCAA). When installed, the SAAR system enables LCA aircraft to act as a fully or partially functional aerial refueling platform—in crewed aircraft and in aircraft that may be further modified to be uncrewed, in the semi-autonomous or autonomous role.

The SAAR fuselage subassembly attaches firmly inside the fuselage of Low-Cost Attritable Aircraft (LCAA). The assembly may include an internal fuselage reinforcement wall and a new external fuselage reinforcement wall, that, together, temporarily strengthen a portion of the aircraft lower fuselage wall. A SAAR fuselage subassembly, that is temporarily installed inside the fuselage, may be utilized to store SAAR fuel tanks, aircraft pressurization, AROS, systems to manage fuel, systems to manage the LCAA CG, and other subsystems. The SAAR fuselage subassembly, that is temporarily installed inside the fuselage, may be a pressure vessel, and it may be fitted to the ports in the fuselage, for the SAAR ARS refueling hose to have sealed passage to the outside of the aircraft, to enable the LCAA to retain its pressurization capabilities. The SAAR fuselage subassembly may be removably attached non-destructively to fuselage hard points and is also removably connected to aircraft electrical and fuel subsystems.

In another embodiment, the SAAR ARS is only connected to the LCAA via a wiring harness, to operate the refueling hose—with no fuel given—to provide AR training presentations for dry plugging. The SAAR Aerial Refueling System (ARS) correctly manages and routes the hose from/to the ARS for use in aerial refueling. SAAR fuel tanks and SAAR fuel transfer and management subsystems may enable automated fuel management/CG control, and may operate in conjunction with both the aircraft and SAAR fuel control systems.

Alternatively, the SAAR equipped LCA aircraft may be utilized without transferring fuel, and/or without SAAR internal fuel tanks, to meet aircrew AR training requirements without the transfer of fuel. The ARS is utilized for deploying the hose, basket and drogue to optimized positions. When extended, the refueling hose and basket/drogue are positioned to the aft of and below the aircraft. The center-of-gravity (CG) and flight control stabilization and control subsystems, which may be integrated with the LCA aircraft and SAAR system, may assist in providing receiver aircraft with correct refueling presentations. The CG and flight control stabilization and control subsystems, integrated with the LCA aircraft and SAAR system facilitate manually or automatically controlling the CG and/or flight controls to reduce basket turbulence and/or enable the basket to provide correct refueling presentations.

The internal installation of the ARS does not increase aircraft form drag, however, when the aerial refueling hose is deployed outside the aircraft, it does increase parasite drag. SAAR control, lighting and safety subsystems enable safe and efficient AR tanking. Two SAAR Aerial Refueling Operator Stations (AROS) may provide aircrew with SAAR monitor and control subsystems for completion of refueling missions. For the Air Refueling Officer (ARO), an AROS may be located in the aft fuselage. For the captain and first officer (FO), an AROS may be located in the cockpit. For higher risk missions, SAAR equipped LCA aircraft may be flown in either the crewed or uncrewed configuration. If crewed, aircrew may bail out of an LCAA that is in imminent danger of being shot down or has been damaged such that a bailout is appropriate. LCAA, outfitted with SAAR, become expendable AR tankers and expendable weapons systems. Damaged uncrewed LCAA tankers may be flown to targets and used as precision ordnance.

The SAAR AI/ML computers process LCAA sensor, as well as tactical edge C3 network data, to provide computer vision processing, intelligent decision aids and alerts to the ARO, captain and FO. SAAR-modified LCA aircraft may fly missions as safe and effective AR tankers. Additionally, SAAR-modified LCA aircraft may fly missions as safe and effective tactical edge C3 nodes, and as platforms for ISR, ASW, MDA, networked sensors, networked strike weapons, and networked fighter weapons. As a data relay, ISR platform and networked sensor contributor, SAAR-modified LCA aircraft may serve as C3 nodes for ABMS and other tactical edge networks, to assist in building the common operational picture. As a platform for ASW, MDA, networked strike weapons, and fighter weapons, SAAR-modified LCA aircraft may take swift and effective action to contribute to force mission goals. SAAR enabled Low-Cost Attritable Aircraft (LCAA) may act as a platform to support tactical edge missions. Mission roles beyond aerial refueling may require additional mission-specific equipment be installed.

Semi-autonomous and autonomous configurations may require additional equipment be installed. In the semi-autonomous and autonomous configurations, SAAR enabled LCAA may act as networked weapons platforms and also as expendable weapons themselves.

One method for enabling a Low-Cost Attritable Aircraft (LCAA) to act as a fully functional aerial refueling platform starts with the Air Refueling Officer (ARO), who has moved into position in the aft SAAR Aerial Refueling Operator Station (AROS), and is using the AROS to initiate the tanking mission by selectively deploying the refueling hose from the SAAR Aerial Refueling System (ARS) to the optimal position, based on current conditions. Another method for enabling a Low-Cost Attritable Aircraft (LCAA) to act as a fully functional aerial refueling platform similarly starts with the captain or first officer, who are sitting in the cockpit, and using a cockpit-installed version of the SAAR Aerial Refueling Operator Station (AROS) to initiate the tanking mission by selectively deploying the refueling hose from the SAAR Aerial Refueling System (ARS) to the optimal position, based on current conditions.

In either case, the ARO, captain or first officer may selectively operate the AROS refueling hose control system, to initiate its deployment sequence into the slipstream aft and below the aircraft fuselage, in preparation for tanking. The hose and basket/drogue continue to deploy aft and below the LCA aircraft fuselage, until they are in optimal position for tanking. The LCA aircraft center of gravity (CG) and/or flight controls may be manually or automatically managed to provide stabilized refueling presentations. The pilot of the receiver aircraft engages the drogue within the basket, and then pushes the basket and hose forward to an acceptable distance from the guidetube. Lines, painted at the correct distances on the aerial refueling hose, provide the receiver pilot with correct visual cues for the refueling operation. Once the receiver aircraft is stabilized in the correct position aft of the Low-Cost Attritable Aircraft (LCAA), fuel may, or may not, be transferred to the Receiver via the hose, from the SAAR fuel tanks and SAAR fuel transfer subsystem, that may be located within the aft fuselage of the LCAA.

In other embodiments, an aircraft configuration includes a Low-Cost Attritable Aircraft (LCAA) with an optionally pressurized internal fuselage area; wings, horizontal stabilizer and vertical stabilizer attached to the outside of the LCA aircraft fuselage; the sealed reinforcement of a small portion of the LCA aircraft's aft lower fuselage wall with an added interior wall and an added exterior wall, which may assist in ensuring the LCAA cabin pressurization remains functionally intact, and that the SAAR fuselage assembly may be a secure pressure vessel that is maintains ambient pressure; the sealed SAAR fuselage assembly, situated internally to the LCAA fuselage, and temporarily and non-destructively affixed to internal hard points inside the fuselage; an LCA aircraft fuel system, modified to temporarily connect to the SAAR fuselage subassembly fuel system; an array of SAAR fuel tanks, which may be connected to the SAAR fuselage assembly; an SAAR fuel/center-of-gravity (CG) control system and an SAAR fuel transfer and management subsystem, which may be connected to the SAAR fuselage assembly; an aircraft electrical system, which may be modified to temporarily connect to the SAAR electrical system; an SAAR Aerial Refueling Operator Station (AROS), which may be connected to the SAAR fuselage assembly; an electrically driven SAAR Aerial Refueling System (ARS), that is mounted internal to the LCA fuselage; a refueling hose stowed internal to the SAAR ARS; the refueling hose, that is stowed internal to the SAAR ARS, is routed to the aft and outside of the LCA aircraft, so it may be positioned for engagement by receiver aircraft; a refueling hose with a drogue/basket, and lines painted for receiver pilot cues; a SAAR fuselage assembly, that integrates with the SAAR ARS, via the lower fuselage wall; automated aerial refueling control systems—that may assist the ARO or caption/FO in managing the SAAR, fuel transfer between LCA aircraft and/or SAAR fuel tanks, CG control system; and multiple lighting and safety subsystems—that are integrated with the SAAR and aircraft subsystems; and networked sensors, cameras and computer hardware and software.

The SAAR ARS may guide the refueling hose to a deployed position aft and below the Low-Cost Attritable Aircraft (LCAA). The SAAR AI/ML computers may process LCAA sensor, as well as tactical edge C3 network data, to provide computer vision processing, intelligent decision aids and alerts to the ARO, captain and FO. SAAR-modified LCA aircraft may fly missions as safe and effective AR tankers. SAAR-modified LCA aircraft may serve as C3 nodes for ABMS and other tactical edge networks, to assist in building the common operational picture, and in networking data to/from other C3 nodes. SAAR-modified LCA aircraft may serve as platforms for ISR, ASW, MDA, networked sensors, networked strike weapons, and networked fighter weapons. In the semi-autonomous and autonomous configurations, SAAR enabled LCAA may act in the above roles, and also as expendable weapons themselves. SAAR replacement electric power generation and distribution systems, to increase power. SAAR replacement wing, wingtips, wing fuel tanks, and subsystems, to increase performance.

In various embodiments, a SAAR system may be installed into a Low-Cost Attritable Aircraft (LCAA) to convert the aircraft into a fully functional aerial refueling (AR) platform. The economic value of employing Low-Cost Attritable Aircraft (LCAA) for the tanker role is they are orders of magnitude less expensive to purchase, and orders of magnitude less expensive to operate. The military value of employing Low-Cost Attritable Aircraft (LCAA) for the tanker role as part of an AR system of systems is that, together, many inexpensive Low-Cost Attritable Aircraft (LCAA) can provide more fuel "give" to crewed and uncrewed aircraft, and in less time, than large, expensive AR tankers—that are in short supply. Another military value of employing Low-Cost Attritable Aircraft (LCAA) for the tanker role is that a relatively small number of large, expensive AR tanker aircraft are "high value targets" for enemy air defenses to shoot down—due to their relative scarcity and high cost to replace. Yet another military value of employing Low-Cost Attritable Aircraft (LCAA) for the tanker role is that large, expensive AR tanker aircraft are strategically important US assets, and they are currently overcommitted. LCAAs fill the gaps created by insufficient numbers of large AR tankers. Finally, there is both military and economic value of employing Low-Cost Attritable Aircraft (LCAA) to provide pilot AR training. An LCAA with a SAAR Aerial Refueling System (ARS) can provide dedicated AR tanker support for two orders of magnitude less cost.

In various embodiments, the apparatus, methods and configurations described herein provide for a system of systems that result in a Selectively-Autonomous Aerial Refueling (SAAR) system that may be installed into a Low-Cost Attritable Aircraft (LCAA) to convert the aircraft into a fully functional aerial refueling (AR) platform. The SAAR system may be selectively removed at any time, returning the aircraft to other configurations that enable it to perform other missions as required. Referring specifically to the drawings, in which like numerals represent like elements through the several figures, a Selectively-Autonomous Aerial Refueling (SAAR) system, methods for installing and removing the SAAR system, and methods for employing the SAAR system's operational modes, according to multiple embodiments, are described.

FIG. 1 shows a subsystem block diagram of a Low-Cost Attritable Aircraft (LCAA) 101 and a Selectively-Autonomous Aerial Refueling (SAAR) system 201, according to the illustrations, examples, and embodiments provided herein. For the purposes of this invention disclosure, the Low-Cost Attritable Aircraft (LCAA) 101, (at times hereafter referred to as "aircraft 101") may be any aircraft designed primarily for operations other than military missions, that may have installed within its fuselage the Selectively-Autonomous Aerial Refueling (SAAR) system 201, (hereafter referred to as "SAAR 201"), in order for it to perform the aerial or ground refueling mission, per the illustrations, examples, and embodiments provided herein. The aircraft 101 includes an airframe 110, that includes a fuselage 112, two aircraft wings 113, a vertical stabilizer and rudder 114, and a horizontal stabilizer and elevator 115. The aircraft fuselage 112 has an adequately sized, open, interior area with suitable airframe hard points 116, and is pressurized by a pressurization subsystem 117. The fuselage 112 has a floor wall cutout 118.

The SAAR fuselage subsystem 210 may be a pressure vessel 202, and may replace a small portion of the aircraft floor wall cutout 118 with a SAAR floor wall system 218 and that may be reliably sealed against the fuselage 112, with a durable semi-permanent floor wall seals 215, to enable the aircraft pressurization subsystem 117 to continue to function normally. Higher-level subsystems 120 of the aircraft 101 include but are not limited to, an aircraft fuel management subsystem 121, an aircraft flight control subsystem 131, an aircraft powerplant subsystem 141, an aircraft automated power control subsystem 142, an aircraft powerplant wiring harness 143, an aircraft engine fuel control subsystem 144, an aircraft thrust generating subsystem 145, an aircraft deicing subsystem 146, an aircraft hydraulic system 151, an aircraft hydraulic wiring harness 152, an aircraft electrical system 161, an aircraft electrical wiring harness 162, an aircraft electrical fault detection and circuit breaker subsystem 163, an aircraft exterior lighting subsystem 164, an aircraft landing gear subsystem 171, an aircraft landing gear wiring harness 172, an aircraft cockpit, with integrated displays and controls subsystem 181, and an aircraft integrated computer subsystem 191 may be functional to control any other aircraft subsystem 192 in the manners described below.

The aircraft 101 includes aircraft systems such as an aircraft fuel management subsystem 121, an aircraft fuel measurement (sending units) subsystem 122, an aircraft fuel wiring harness and reporting subsystem 123, aircraft fuel tanks 124, aircraft single wall fuel manifolds 125, aircraft fuel pumps 126, aircraft fuel control units 127, and a number of other aircraft fuel system components 128. Based on selections the aircrew make, the aircraft fuel management subsystem 121 may appropriately manage the fuel located in the aircraft fuel tanks 124, fuel being moved to/from aircraft fuel tanks 124, and fuel being sent to the aircraft engine fuel control subsystem 144.

Figure 14:
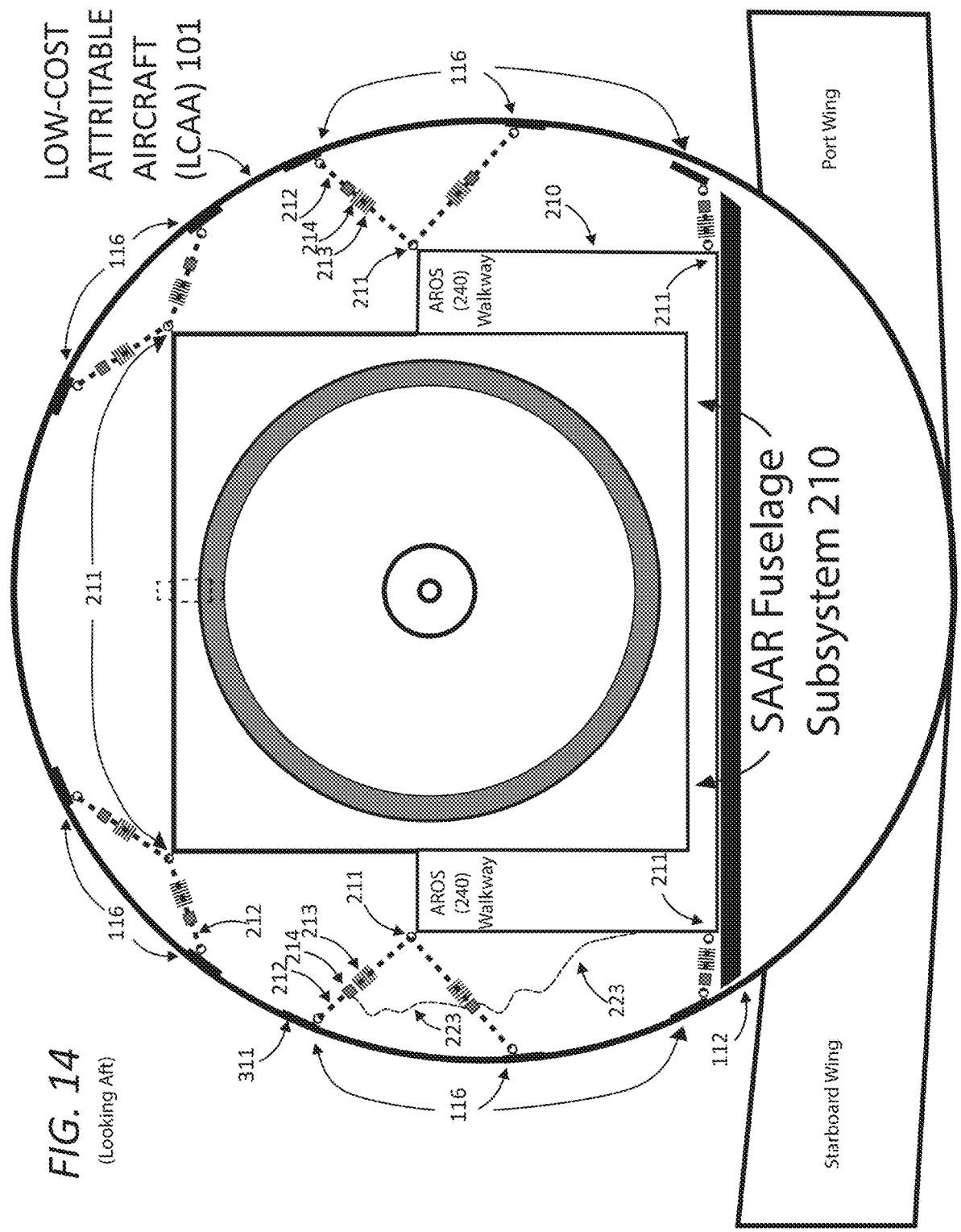
FIG. 14 is a cutaway front-to-aft view of the SAAR fuselage subsystem 210, that may include multiple attachment points 211, that may removably attach to aircraft fuselage airframe hard points 116, via adjustable length, locking connecting rod trusses 212, with lightweight, high tensile strength bolts, according to various embodiments presented herein.

The aircraft 101 includes an aircraft flight control subsystem 131, an automatic flight control subsystem (AFCS) 132, a flight control wiring harness 133, flight control servos 134, cockpit flight controls 135, flight control surfaces 136, and a number of other flight control subsystem components 137. The aircraft flight control subsystem 131 may include any type and number of sensors, gyros, cables, pulleys, or other components used to appropriately move the flight control surfaces 136—based on the cockpit flight control 135 inputs the pilot flying provides, or the automatic flight control subsystem (AFCS) 132 modes the pilot flying selects. The aircraft 101 includes a fuselage 112 that is an adequately sized, open, interior area with suitable airframe hard points 116 (FIG. 14).

Figure 13:
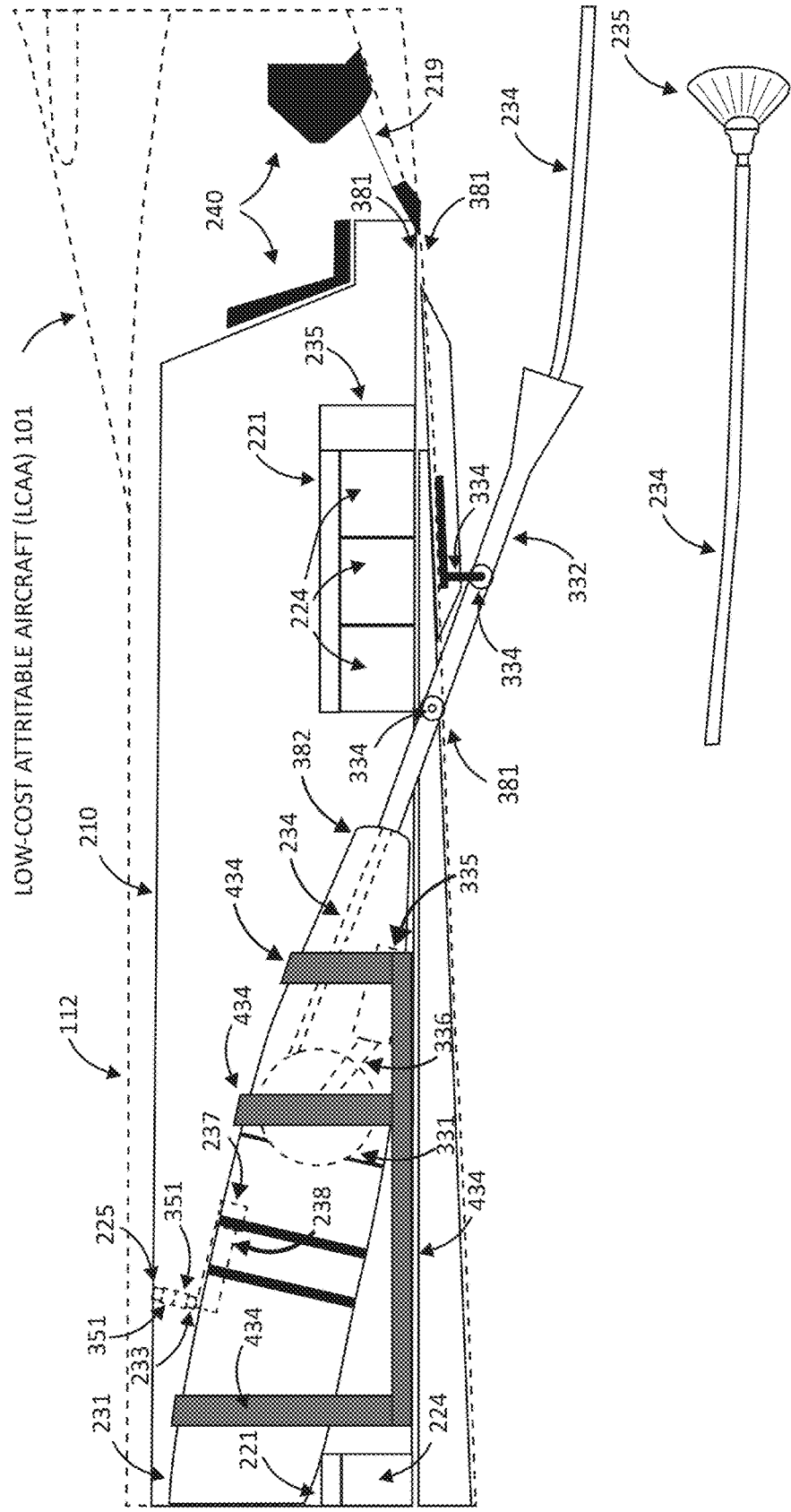
FIG. 13 is a cutaway side view of the aft fuselage of the Low-Cost Attritable Aircraft (LCAA) 101, showing the internal and external fuselage reinforcement plates 381 installed, according to various embodiments described herein.

According to the illustrations, examples, and embodiments provided herein, a Selectively-Autonomous Aerial Refueling (SAAR) system 201, ("SAAR 201"), that is itself a pressure vessel 202, may be temporarily installed to connect to the fuselage 112 airframe hard points 116, and replacing a small portion of the aircraft floor wall cutout 118, and reliably sealed against the fuselage 112 to enable the aircraft pressurization subsystem 117 to continue to function normally. Further, the optional SAAR dual-walled fuel manifolds 225 can be selectively attached to the aircraft 101 single walled fuel manifolds 125, and to the SAAR Aerial Refueling System (ARS) refueling manifolds 233 (FIG. 13). The optional SAAR fuel wiring harness and reporting subsystem 223 (FIG. 14) can be selectively attached to the aircraft fuel wiring harness and reporting subsystem 123, and to the SAAR Aerial Refueling System (ARS) wiring harness 232.

Based on selections the aircrew make, the aircraft fuel management subsystem 121 may appropriately manage the fuel located in the SAAR fuel tanks 224, fuel being moved to/from SAAR fuel tanks 224 to/from the aircraft fuel tanks 124, and fuel being sent from SAAR fuel tanks 224 to the SAAR Refueling System 230.

For the purposes of this invention disclosure, "temporarily installed" and "selectively attached" relate to the means of impermanently connecting the SAAR 201 subsystems to aircraft 101 subsystems. SAAR 201 subsystems and aircraft 101 subsystems may be secured together using COTS quick disconnects, matching pin quick disconnects, coupling systems, bolts, screws, fasteners, or any other securing means that allow for repeated installation and removal of the components according to the currently assigned mission of the aircraft.

Figure 1A:
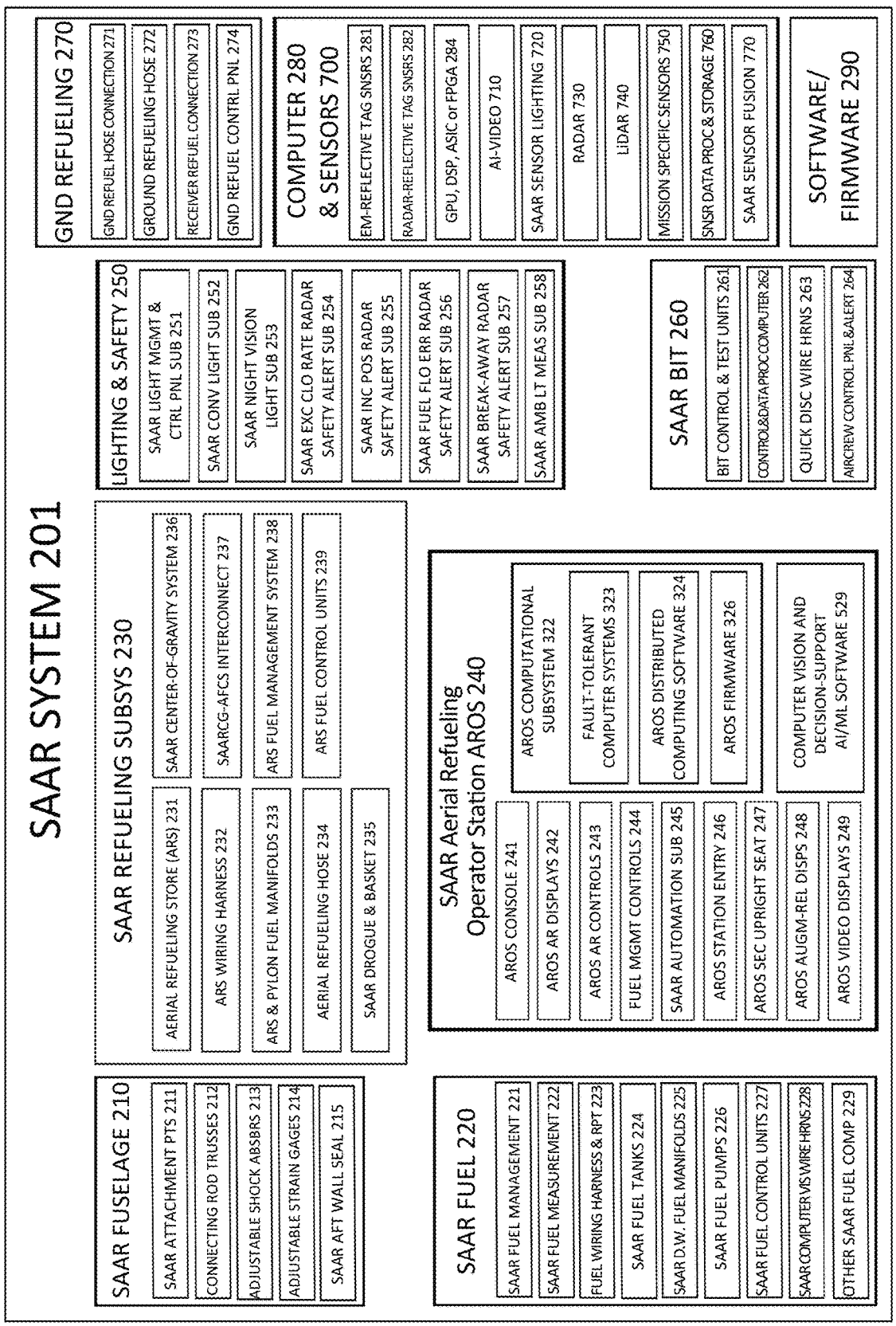
FIG. 1A includes a block diagram schematically illustrating one example of a SAAR system of the LCAA of FIG. 1.

Referring to FIG. 1A, the SAAR system 201 may include a variety of subsystems and related components. Subsystems of the SAAR system 201 may include a SAAR fuselage subsystem 210, a SAAR fuel subsystem 220, a SAAR Refueling System 230, a SAAR Aerial Refueling Operator Station (AROS) 240, a SAAR lighting and safety subsystems 250, a SAAR Built-In-Test (BIT) subsystem 260, a SAAR ground refueling subsystem 270, a SAAR computer processing subsystem 280, and a SAAR Software/Firmware/Object Code 290 (e.g., SAAR computer vision and decision-support software, SAAR distributed software and firmware subsystem, or SAAR distributed AI/ML software and firmware subsystem). The SAAR fuselage subsystem 210 may include a variety of subsystems and related components. Subsystems of the SAAR fuselage subsystem 210 may include multiple attachment points 211, that may removably attach to aircraft fuselage airframe hard points 116, via adjustable length, locking connecting rod trusses 212. To reduce fatigue and the potential for hardware failure at and around aircraft fuselage airframe hard points 116, certain connecting rod trusses 212 may employ lightweight, adjustable shock absorbers 213 (FIG. 14).

To measure strain on connecting rod trusses 212, and to reduce the potential for hardware failure at and around aircraft fuselage airframe hard points 116, certain connecting rod trusses 212 may employ lightweight, adjustable strain gages 214, that provide data to aircrew via the optional SAAR fuel wiring harness and reporting subsystem 223, may be displayed in the SAAR Aerial Refueling Operator Station (AROS) 240. The SAAR fuselage subsystem 210 may be rapidly installed or uninstalled in modular subsystem pieces. SAAR fuselage subsystem 210 components are loaded into the aircraft 101 via the cargo door 102 and the passenger entry door 103.

Figure 19:
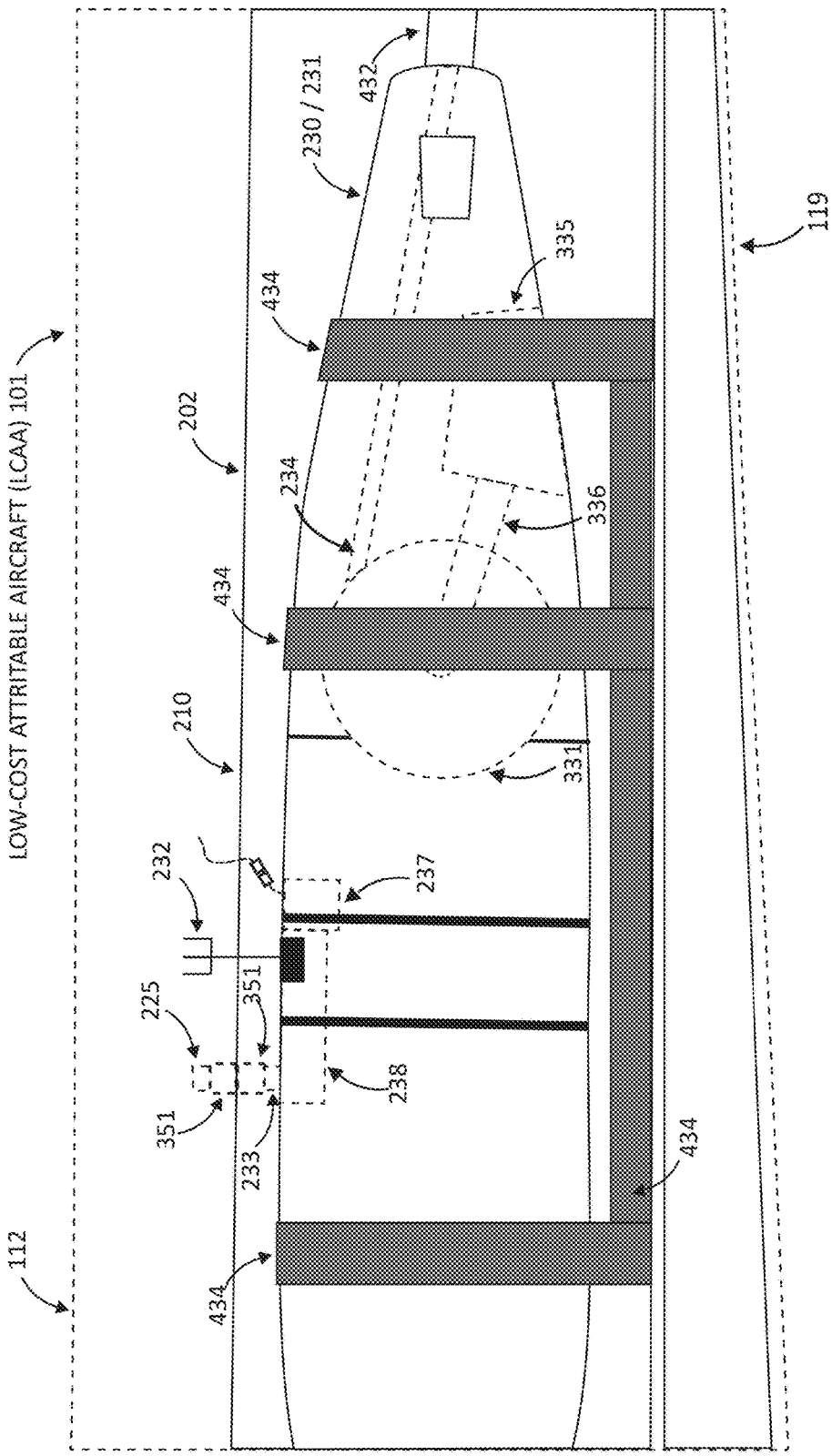
FIG. 19 shows a cutaway side view of the SAAR Semi-Permanent installation and integration of an optional ARS Refueling Manifold 233 and an optional ARS Electrical Wiring Harness 232, according to various embodiments described herein.

For fuel systems connectivity, the SAAR fuselage subsystem 210 may provide reliable, fault tolerant quick disconnects 350/351, which may provide interfaces between the optional SAAR dual-walled fuel manifolds 225 and the aircraft 101 single walled fuel manifolds 125 (FIG. 8) and between the SAAR dual-walled fuel manifolds 225 and the SAAR Aerial Refueling System (ARS) 231 refueling manifolds 233 (FIG. 19). For fuel electrical power and fuel control systems connectivity, the SAAR fuselage subsystem 210 may provide reliable, fault tolerant quick disconnects 319, which may provide interfaces between the SAAR fuel wiring harness and reporting subsystem 223, the aircraft fuel wiring harness and reporting subsystem 123 the aircraft electrical wiring harness 162, and to the SAAR Aerial Refueling System (ARS) wiring harness 232.

For selectively automated CG management, the SAAR fuselage subsystem 210 may provide reliable, fault tolerant quick disconnects 319, which may provide interfaces between the aircraft fuel management subsystem 121, the aircraft automatic flight control subsystem (AFCS) 132, a SAAR center-of-gravity (SAARCG) subsystem 236, the SAARCG-AFCS Interconnect (SAARCG-AFCS-I) subsystem 237, and the aircraft flight control wiring harness 133. Additional subsystems of the SAAR fuselage subsystem 210 may include the SAAR fuel subsystem 220, the SAAR Refueling System 230, the SAAR Aerial Refueling Operator Station (AROS) 240, the SAAR lighting and safety subsystems 250, the SAAR Built-In-Test (BIT) subsystem 260, the SAAR ground refueling subsystem 270, the SAAR computer processing subsystem 280, and the SAAR distributed AI/ML software and firmware subsystem 290.

The SAAR fuel subsystem 220 may include a variety of subsystems and related components. Subsystems of the SAAR fuel subsystem 220, and referring also to FIGS. 13 and 14, may include the SAAR fuselage subsystem 210, a SAAR fuel management subsystem 221, a SAAR fuel measurement (sending units) subsystem 222, a SAAR fuel wiring harness and reporting subsystem 223, a number of SAAR fuel tanks 224, an optional SAAR dual-walled fuel manifold subsystem 225, a number of SAAR fuel pumps 226, a number of SAAR fuel control units 227, a SAAR computer vision system wiring harness 228, and a number of other SAAR fuel system components 229.

Based on selections the aircrew make, the SAAR fuel management subsystem 221 may appropriately manage the fuel located in the SAAR fuel tanks 224, fuel being moved from aircraft fuel tanks 124 to individual SAAR fuel tanks 224, fuel being moved between individual: SAAR fuel tanks 224, fuel being sent to the SAAR Refueling System 230, and fuel being sent to the SAAR ground refueling subsystem 270.

The SAAR Refueling System 230 may include a variety of subsystems and related components. Subsystems of the SAAR Refueling System 230 may include the SAAR fuselage subsystem 210, the SAAR fuel subsystem 220, as well as, a SAAR Aerial Refueling System (ARS) 231, ARS refueling manifolds 233, ARS wiring harness 232, an aerial refueling hose 234, a SAAR drogue and basket subsystem 235, and a SAAR center-of-gravity (SAARCG) subsystem 236. Aircraft subsystems integrated with the SAAR Refueling System 230 may include the aircraft fuel management subsystem 121, the aircraft flight control subsystem 131, and the aircraft automatic flight control subsystem (AFCS) 132. Additional subsystems of the SAAR Refueling System 230 may include a selective SAARCG-AFCS Interconnect (SAARCG-AFCS-I) subsystem 237. The SAAR fuselage subsystem 210 may appropriately provide a lightweight, strong structure to interface between the SAAR Refueling System 230 components, the ARS 231, and the aircraft fuselage 112.

Based on manual or automated system selections the aircrew make on the SAAR Aerial Refueling Operator Station (AROS) 240, the SAAR Refueling System 230 may appropriately manage the ARS 231, the SAAR drogue and basket subsystem 235, and the SAAR center-of-gravity (SAARCG) subsystem 236. Based on manual or automated system selections the aircrew make, the ARS 231 may appropriately manage the aerial refueling hose 234, and may manually or automatically complete the aerial refueling hose 234 deployment, retraction, and inflight refueling processes. The aerial refueling hose 234 may be connected to and interface with the SAAR drogue and basket subsystem 235. The SAAR drogue and basket subsystem 235 may provide a selectively stabilized AR presentation to receiver aircraft. Based on manual or automated system selections the aircrew make, the SAAR center-of-gravity (SAARCG) subsystem 236, may provide manual or automated movement of fuel within SAAR fuel tanks 224. Based on manual or automated system selections the aircrew make, the SAARCG-AFCS Interconnect (SAARCG-AFCS-I) subsystem 237, may provide manual or automated movement of fuel within SAAR fuel tanks 224 that is coordinated with the aircraft fuel management subsystem 121, and with the aircraft automatic flight control subsystem (AFCS) 132, to provide optimized stabilization of the SAAR drogue and basket subsystem 235.

Fuel located within the aircraft fuel tanks 124 may be moved to the SAAR fuel tanks 224, and may be moved to the SAAR Aerial Refueling System (ARS) 231, and may be moved to the aerial refueling hose 234, and may be moved via the SAAR drogue and basket subsystem 235 to the receiver aircraft for inflight refueling. Additionally, based on manual or automated system selections the aircrew make, fuel located within the SAAR fuel tanks 224 may be moved to the aircraft fuel tanks 124. Additionally, fuel located in the aerial refueling hose 234 and the SAAR Aerial Refueling System (ARS) 231 may be moved to the SAAR fuel tanks 224 for appropriate management of fuel.

The SAAR Aerial Refueling Operator Station (AROS) 240 may include a variety of subsystems and related components. Subsystems of the SAAR Aerial Refueling Operator Station (AROS) 240 may include the SAAR fuselage subsystem 210, the SAAR fuel subsystem 220, the SAAR Refueling System 230, the SAAR lighting and safety subsystems 250, the SAAR Built-In-Test (BIT) subsystem 260, SAAR ground refueling subsystem 270, the SAAR computer processing subsystem 280, and the SAAR distributed AI/ML software and firmware subsystem 290, as well as an AROS console 241, AROS aerial refueling displays 242, AROS aerial refueling controls 243, SAAR fuel management controls 244, a Selectively-Autonomous Aerial Refueling Automation (SAARA) subsystem 245, a AROS station entry 246, and a AROS secure upright seat 247. Aircraft subsystems integrated with the SAAR Aerial Refueling Operator Station (AROS) 240 may include the aircraft fuel management subsystem 121, the aircraft flight control subsystem 131, and the aircraft automatic flight control subsystem (AFCS) 132. Subsystems of the SAAR Aerial Refueling Operator Station (AROS) 240 may include the SAAR center-of-gravity (SAARCG) subsystem 236, and the SAARCG-AFCS Interconnect (SAARCG-AFCS-I) subsystem 237.

Additional subsystems of optional AROS 240 may include AROS augmented-reality displays 248, AROS video displays 249, and ISR, Computer vision and Decision-Support AI/ML Software 529, that may be integrated with the AROS aerial refueling displays 242. These computer vision systems may utilize more than one video cameras that capture the drogue and basket subsystem 235 engagement area, that capture and process visual information in real-time, to provide the ARO with the constant status of extension, retraction, and engagement status of the ARS 231, the aerial refueling hose 234, and the drogue and basket subsystem 235. The optional AROS 240 provides the Aerial Refueling Operator (ARO) with the AROS displays 242, AROS controls 243, SAAR fuel management controls 244, and SAAR Automation (SAARA) 245 controls for management and control of the SAAR system 201. The optional AROS 240 may be made up of modular units, that are quickly and easily installed and removed. When removed, the optional AROS 240 modular units may be stored and moved in a set of AROS cases 299, that are similar to "Pelican" design of instrument cases.

The SAAR lighting and safety subsystems 250 may include a variety of subsystems and related components. Subsystems of the SAAR lighting and safety subsystems 250 may include the SAAR fuselage subsystem 210, the SAAR Aerial Refueling Operator Station (AROS) 240, the SAAR Built-In-Test (BIT) subsystem 260, the ARS 231, the aerial refueling hose 234, the SAAR drogue and basket subsystem 235, the wire ducting and exterior of the aircraft 101 and fuselage 112, as well as a SAAR light management and control panel subsystem 251, a manually and automatically dimmable SAAR conventional refueling hose, basket/drogue and aircraft light subsystem 252 (FIGS. 2 and 4), a manually and automatically dimmable SAAR night-vision-device refueling hose, basket/drogue and aircraft light subsystem 253 (FIGS. 2 and 4), a SAAR "excessive closure rate" RADAR safety alert subsystem 254, a SAAR "incorrect position" RADAR safety alert subsystem 255, a SAAR "fuel flow error" safety alert subsystem 256, and a manually and automatically executed SAAR "break-away" light safety subsystem 257. Aircraft subsystems integrated with the SAAR lighting and safety subsystems 250 may include the aircraft electrical system 161, the aircraft electrical wiring harness 162, the aircraft electrical fault detection and circuit breaker subsystem 163, the aircraft exterior lighting subsystem 164, and the aircraft cockpit, with integrated displays and controls subsystem 181. Additional subsystems of the SAAR lighting and safety subsystems 250 may include a SAAR ambient light measurement subsystem 258. Additionally, the SAAR light management and control panel subsystem 251, which provides controls for all SAAR lighting and safety subsystems, may be located in both the optional AROS 240 and in the aircraft cockpit 181.

The SAAR Built-In-Test (BIT) subsystem 260 may include a variety of subsystems and related components. Subsystems of the SAAR Built-In-Test (BIT) subsystem 260 may include the SAAR fuselage subsystem 210, the SAAR strain gauges 214, the SAAR fuel wiring harness and reporting subsystem 223, the SAAR fuel subsystem 220, the SAAR fuel management subsystem 221, the SAAR fuel measurement (sending units) subsystem 222, the SAAR fuel wiring harness and reporting subsystem 223, the SAAR fuel pumps 226, the SAAR fuel control units 227, the SAAR computer vision system wiring harness 228, the number of other SAAR fuel system components 229, the SAAR Refueling System 230, the ARS 231, the SAAR Aerial Refueling System (ARS) refueling manifolds 233, the aerial refueling hose 234, the SAAR drogue and basket subsystem 235, the SAAR center-of-gravity (SAARCG) subsystem 236, the SAARCG-AFCS Interconnect (SAARCG-AFCS-I) subsystem 237, the ARS fuel management system 238, the SAAR Aerial Refueling Operator Station (AROS) 240, the AROS console 241, the AROS aerial refueling displays 242, the AROS aerial refueling controls 243, the SAAR fuel management controls 244, the Selectively-Adaptive Aerial Refueling Automation (SAARA) subsystem 245, the AROS augmented-reality displays 248, the AROS video displays 249, the ISR, Computer vision and Decision-Support AI/ML Software 529, the SAAR lighting and safety subsystems 250, the SAAR light management and control panel subsystem 251, the SAAR conventional refueling hose, basket/drogue and aircraft light subsystem 252, the SAAR night-vision-device refueling hose, basket/drogue and aircraft light subsystem 253, the SAAR "excessive closure rate" RADAR safety alert subsystem 254, the SAAR "incorrect position" RADAR safety alert subsystem 255, the SAAR "fuel flow error" safety alert subsystem 256, the SAAR "break-away" light safety subsystem 257, and the SAAR ambient light measurement subsystem 258, SAAR ground refueling subsystem 270, the SAAR computer processing subsystem 280, and the SAAR distributed AI/ML software and firmware subsystem 290, as well as a number of purpose-made BIT control and test units 261, a BIT control and data processing computer subsystem 262, a BIT quick-disconnect wiring harness 263, and a BIT aircrew control panel and alert subsystem 264 which may be located in the SAAR Aerial Refueling Operator Station (AROS) 240 which may be located in both the SAAR fuselage subsystem 210 or in the aircraft cockpit, with integrated displays and controls subsystem 181.

Aircraft subsystems integrated with the SAAR Built-In-Test (BIT) subsystem 260 may include the aircraft pressurization subsystem 117, the aircraft fuel management subsystem 121, the aircraft flight control subsystem 131, the aircraft automatic flight control subsystem (AFCS) 132, the aircraft powerplant subsystem 141, the aircraft hydraulic system 151, the aircraft electrical system 161, the aircraft electrical fault detection and circuit breaker subsystem 163, and the aircraft integrated computer subsystem 191.

The SAAR ground refueling subsystem 270 may include a variety of subsystems and related components. Subsystems of the SAAR ground refueling subsystem 270 may include the SAAR fuselage subsystem 210, the SAAR fuel subsystem 220, the SAAR fuel management subsystem 221, the SAAR Refueling System 230, the SAAR Aerial Refueling Operator Station (AROS) 240, the SAAR lighting and safety subsystems 250, and the SAAR Built-In-Test (BIT) subsystem 260, as well as a SAAR ground refueling hose connection 271, which may be located on the outside of the SAAR floor wall system 218, to which may be connected a SAAR ground refueling hose 272, which has on its other end a receiver aircraft refueling connection 273, and SAAR ground refueling aircrew control panel and alert subsystem 274 which may be located in the SAAR Aerial Refueling Operator Station (AROS) 240 which may be located in both the SAAR fuselage subsystem 210 or in the aircraft cockpit, with integrated displays and controls subsystem 181. Aircraft subsystems integrated with the SAAR ground refueling subsystem 270 may include the aircraft fuel management subsystem 121, the aircraft fuel measurement (sending units) subsystem 122, the aircraft fuel wiring harness and reporting subsystem 123, the aircraft fuel tanks 124, the aircraft single wall fuel manifolds 125, the aircraft fuel pumps 126, the aircraft fuel control units 127, a number of other aircraft fuel system components 128, the aircraft electrical system 161, the aircraft electrical wiring harness 162, the aircraft electrical fault detection and circuit breaker subsystem 163, the aircraft cockpit, with integrated displays and controls subsystem 181, and the aircraft integrated computer subsystem 191.

A SAAR computer processing subsystem 280 and integrated SAAR distributed software and firmware subsystem 290 may include a variety of subsystems and related components. Subsystems of the SAAR computer processing subsystem 280 and integrated SAAR distributed software and firmware subsystem 290 may include the SAAR fuselage subsystem 210, the SAAR fuel subsystem 220, the SAAR Refueling System 230, the SAAR Aerial Refueling Operator Station (AROS) 240, the SAAR lighting and safety subsystems 250, the SAAR Built-In-Test (BIT) subsystem 260, the SAAR ground refueling subsystem 270, and the lightweight, adjustable SAAR strain gauges 214, the durable semi-permanent floor wall seals 215, the floor wall system 218, the SAAR fuel management subsystem 221, the fuel measurement (sending units) subsystem 222, the SAAR fuel wiring harness and reporting subsystem 223, the number of SAAR fuel tanks 224, the dual-walled fuel manifold subsystem 225, the number of SAAR fuel pumps 226, the number of SAAR fuel control units 227, the computer vision system wiring harness 228, the number of other SAAR fuel system components 229, the SAAR Aerial Refueling System (ARS) 231, the SAAR Aerial Refueling System (ARS) refueling manifolds 233, the aerial refueling hose 234, the SAAR drogue and basket subsystem 235, the center-of-gravity (SAARCG) 236, the SAARCG-AFCS Interconnect (SAARCG-AFCS-I) subsystem 237, the ARS fuel management system 238, the floor wall wiring harness and installation kit 345, the AROS console 241, the AROS aerial refueling displays 242, the AROS aerial refueling controls 243, the SAAR fuel management controls 244, the ISR, Computer vision and Decision-Support AI/ML Software 529, the Selectively-Autonomous Aerial Refueling Automation (SAARA) subsystem 245, the AROS station entry 246, the AROS secure upright seat 247, the AROS augmented-reality displays 248, the AROS video displays 249, the SAAR light management and control panel subsystem 251, the SAAR conventional refueling hose, basket/drogue and aircraft light subsystem 252, the SAAR night-vision-device refueling hose, basket/drogue and aircraft light subsystem 253, the SAAR "excessive closure rate" RADAR safety alert subsystem 254, the SAAR "incorrect position" RADAR safety alert subsystem 255, the SAAR "fuel flow error" safety alert subsystem 256, the SAAR "break-away" light safety subsystem 257, the SAAR ambient light measurement subsystem 258, the number of purpose-made BIT control and test units 261, the BIT control and data processing computer subsystem 262, the BIT quick-disconnect wiring harness 263, the BIT aircrew control panel and alert subsystem 264, the SAAR ground refueling hose connection 271, the SAAR ground refueling hose 272, the receiver aircraft refueling connection 273, and the SAAR ground refueling aircrew control panel and alert subsystem 274.

Aircraft subsystems integrated with the SAAR computer processing subsystem 280 may include the aircraft pressurization subsystem 117, the reliable, fault tolerant quick disconnects 319, the aircraft fuel management subsystem 121, the aircraft fuel measurement (sending units) subsystem 122, the aircraft fuel wiring harness and reporting subsystem 123, the aircraft automatic flight control subsystem (AFCS) 132, the aircraft flight control wiring harness 133, the aircraft powerplant subsystem 141, the aircraft automated power control subsystem 142, the aircraft powerplant wiring harness 143, the aircraft hydraulic system 151, the aircraft hydraulic wiring harness 152, the aircraft electrical system 161, the aircraft electrical wiring harness 162, the aircraft electrical fault detection and circuit breaker subsystem 163, the aircraft exterior lighting subsystem 164, the aircraft cockpit, with integrated displays and controls subsystem 181, and the aircraft integrated computer subsystem 191.

Additional data acquisition subsystems of the SAAR computer processing subsystem 280 and integrated SAAR distributed software and firmware subsystem 290 may include EM-reflective tag sensors 281, RADAR-reflective tag sensors 282, AI-video 710, RADAR 730, LiDAR 740, mission-specific sensors 750, sensor data processing and storage 760, and SAAR sensor fusion 770, with the goal that these SAAR data acquisition systems may be used to provide processed telemetry and image data to the SAAR computer processing subsystem 280. Additionally, SAAR AI-Video 710 system may utilize more than one video camera and/or other SAAR sensors (or Sensor systems, or AI-Controlled and Enhanced Sensors) 700, that capture the drogue and basket subsystem 235 engagement area, that capture and process visual information in real-time, to provide the ARO with the constant status of extension, retraction, and engagement status of the aerial refueling hose 234, and the drogue and basket subsystem 235, as well as the relative distance, closure and instantaneous acceleration of the receiver aircraft.

SAAR computer processing subsystem 280 and integrated SAAR distributed software and firmware subsystem 290 may include SAAR function-specific firmware programs 523, that may be utilized with a number of strategically placed SAAR GPU, DSP, ASIC or FPGA chips or chipsets 284, that may be located within the SAAR computer vision system wiring harness 228 and/or integrated or connected to SAAR Sensors 700—including but not limited to the AI-video 710, EM-reflective tag sensors 281, RADAR-reflective tag sensors 282, RADAR 730, LiDAR 740, mission-specific sensors 750, sensor data processing and storage 760, and SAAR sensor fusion 770, which are described below.

Additional data displays and alerts subsystems of the SAAR computer processing subsystem 280 and integrated SAAR distributed software and firmware subsystem 290 may include a number of strategically placed AROS augmented-reality displays 248, AROS video displays 249, and ISR, Computer vision and Decision-Support AI/ML Software 529, that may be integrated with the AROS aerial refueling displays 242. These AROS displays 242 provide processed and/or optimized sensor and camera data, in order to provide optimized computer vision processing to the ARO, and metadata tagged sensor and camera data to various SAAR alert systems, to enable consistently safe and effective AR tanking by Low-Cost Attritable Aircraft (LCAA). The optional AROS 240 provides the Aerial Refueling Operator (ARO) with the AROS displays 242, AROS controls 243, SAAR fuel management controls 244, and SAAR Automation (SAARA) 245 controls for management and control of the SAAR system 201.

Both the SAAR computer processing subsystem 280 and integrated SAAR distributed software and firmware subsystem 290 will be explained in greater detail, provided below. The goals the SAAR Sensors 700 data acquisition systems, the SAAR computer processing subsystem 280, the integrated SAAR distributed software and firmware subsystem 290, and the SAAR network 800 are to (1) parallel process and optimize multiple sensor, camera and telemetry data, (2) provide computer vision processing, and (3) provide intelligent alerts and decision aids to the ARO, pilot and first officer—with the ultimate goal of consistently safe and effective AR tanking by Low-Cost Attritable Aircraft (LCAA).

Figure 2:
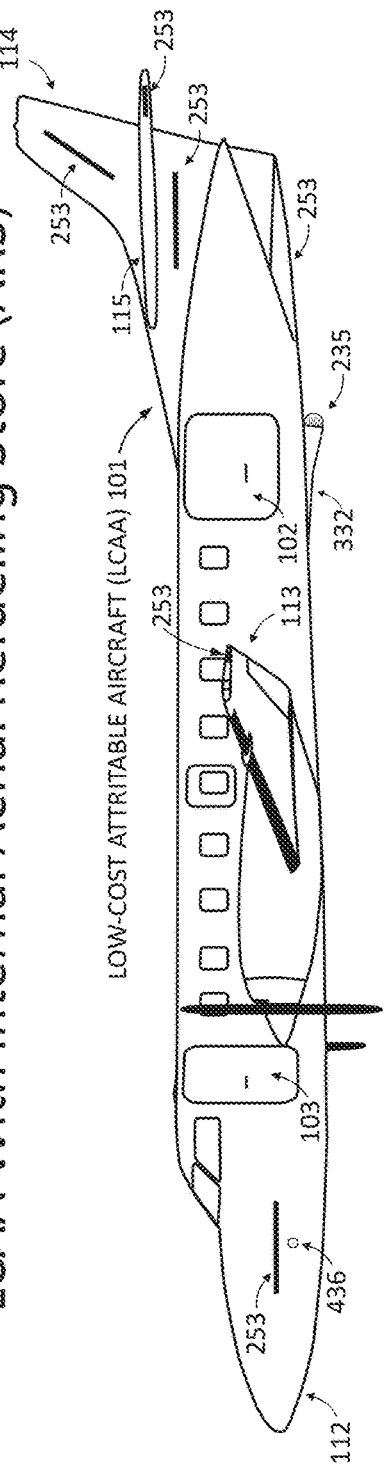
FIG. 2 provides a side view of the Low-Cost Attritable Aircraft (LCAA) 101, with the installed and fitted Selectively-Autonomous Aerial Refueling (SAAR) system 201 located inside the LCAA fuselage 112, according to various embodiments described herein.

FIG. 2 provides a side view of the Low-Cost Attritable Aircraft (LCAA) 101, with the installed and fitted Selectively-Autonomous Aerial Refueling (SAAR) system 201 located inside the LCAA fuselage 112, with the optional articulating guidetube 332 in the stowed configuration, with the aerial refueling hose 234 in the retracted position, according to various embodiments described herein.

Figure 3:
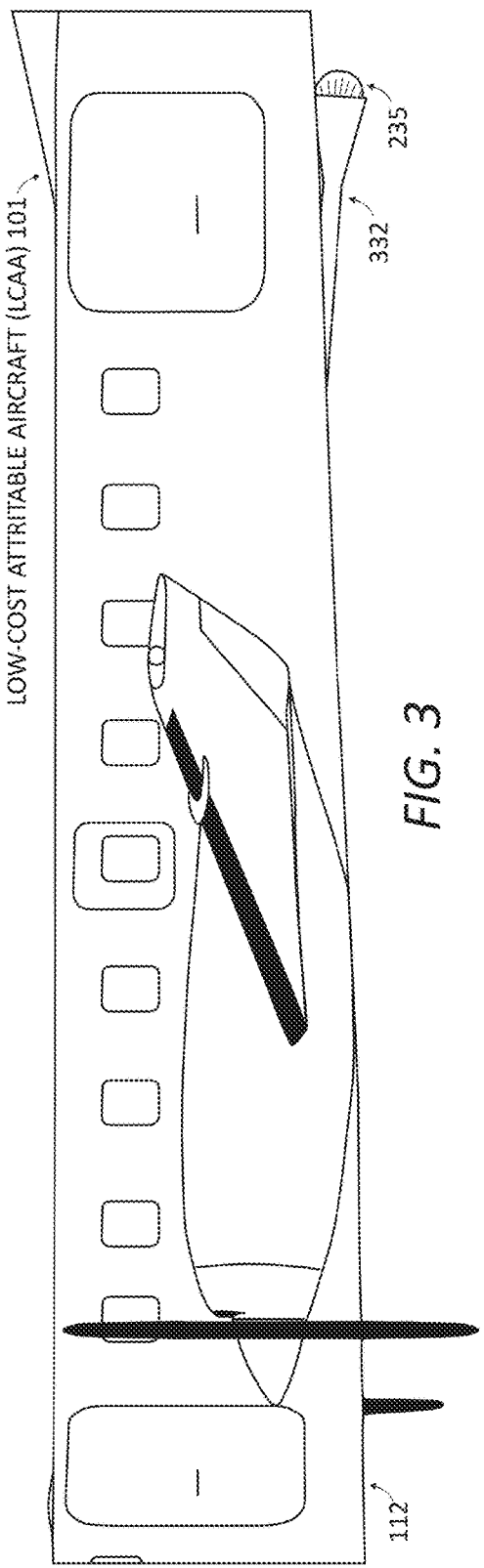
FIG. 3 provides a close-up side view of a Low-Cost Attritable Aircraft (LCAA) 101 showing the SAAR Aerial Refueling System (ARS) aerial refueling hose 234 in the retracted configuration, according to various embodiments described herein.

FIG. 3 provides a close-up side view of the Low-Cost Attritable Aircraft (LCAA) 101, with the installed and fitted Selectively-Autonomous Aerial Refueling (SAAR) system 201 located inside the LCAA fuselage 112, with the optional articulating guidetube 332 in the stowed configuration, with the aerial refueling hose 234 in the retracted position, with the SAAR drogue and basket subsystem 235 flush against the external surface of the LCAA fuselage 112, according to various embodiments described herein.

Figure 4:
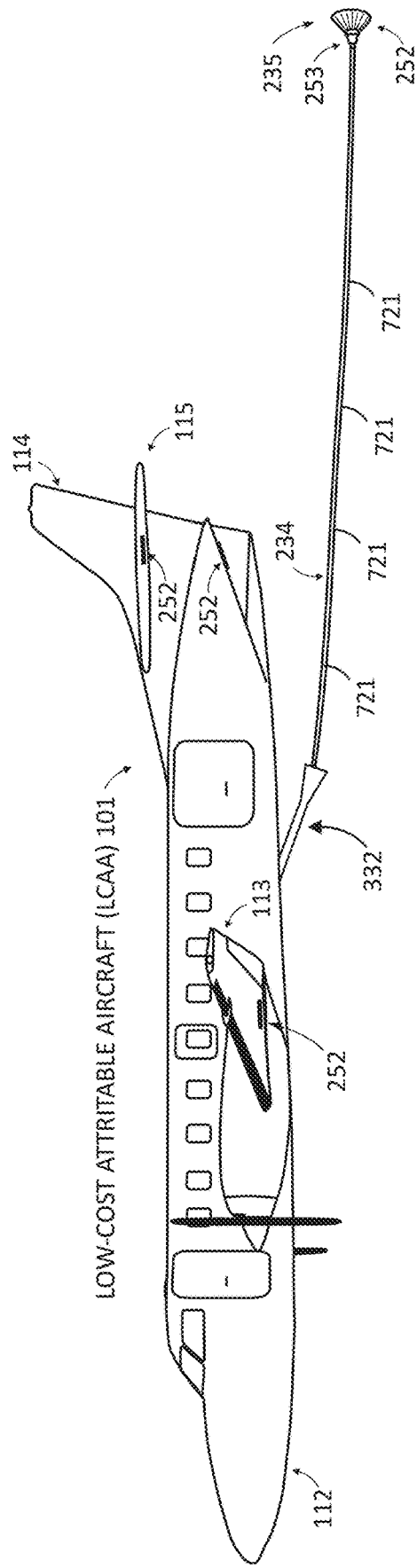
FIG. 4 is a side view of the Low-Cost Attritable Aircraft (LCAA) 101, showing the SAAR aerial refueling hose 234 in the extended configuration, according to various embodiments described herein.

FIG. 4 provides a side view of the LCA aircraft 101 with the installed and fitted SAAR system 201 and the SAAR Aerial Refueling System (ARS) 231, with the aerial refueling hose 234 in the extended position, according to various embodiments described herein. When the aerial refueling hose 234 is extended aft of the LCA aircraft 101 fuselage 112, the force of gravity pulls it downward while the relative wind and aircraft wake turbulence tend to push it upward. The optional articulating guidetube 332, rotated downward to a deployed position, moves the aerial refueling hose 234 further downward into clean air. The downward displacement enables the aerial refueling hose 234 and the SAAR drogue and basket subsystem 235 to stay below and somewhat clear of the propellor and/or jet wash wake turbulence, that are created by the aircraft thrust generating subsystem 145. The reduced turbulence air enables the receiver aircraft to complete the AR tanking process by engaging the SAAR drogue and basket subsystem 235 with their refueling probe. The aerial refueling hose 234 is extended by the SAAR Aerial Refueling System (ARS) 231, and the aerial refueling hose 234 is routed through and out of the optional articulating guidetube 332 to the deployed position. The aerial refueling hose 234 is retracted by the SAAR Aerial Refueling System (ARS) 231, and the aerial refueling hose 234 is routed back into the optional articulating guidetube 332 and into the SAAR Aerial Refueling System (ARS) 231, to the stowed position.

Additional subsystems and methods of use for the SAAR system 201, with respect to its installation in LCA aircraft 101 will be presented now in FIGS. 5-12, according to various embodiments described herein.

Figure 5:
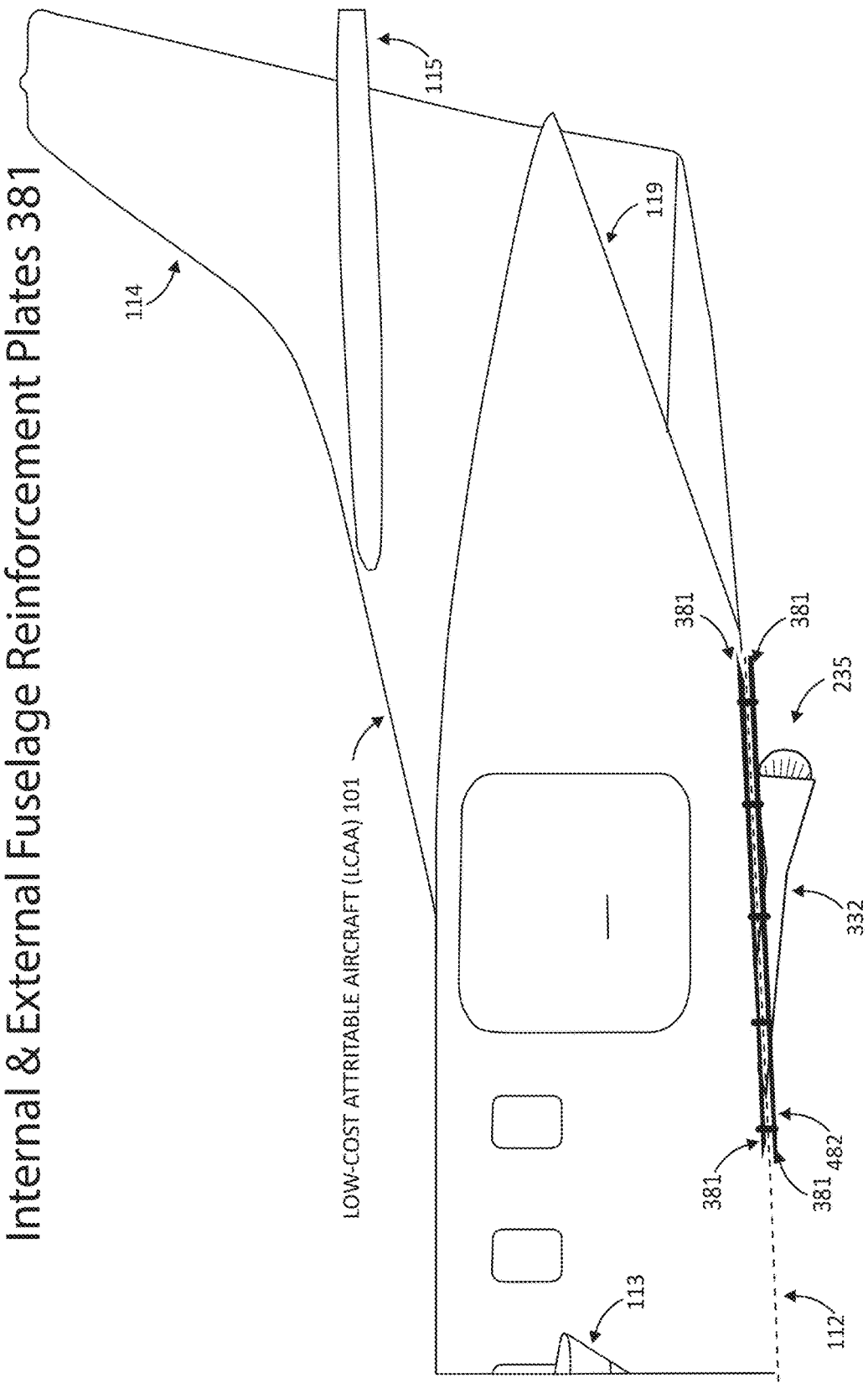
FIG. 5 is a cutaway side view of the Low-Cost Attritable Aircraft (LCAA) 101, showing the internal and external fuselage reinforcement plates 381, with the ARS 231 installed inside the SAAR fuselage subsystem 210, which in turn is installed inside the LCAA fuselage 112, with the aerial refueling hose 234 retracted, according to various embodiments described herein.

FIG. 5 is a cutaway side view of the Low-Cost Attritable Aircraft (LCAA) 101 and the SAAR system 201, showing the internal and external fuselage reinforcement plates 381 installed, with the SAAR Refueling System 230, with the aerial refueling hose 234 retracted, according to various embodiments described herein. The SAAR Aerial Refueling System (ARS) 231, selectively controlled by the aerial refueling officer (ARO), pilot or first officer at either of two SAAR Aerial Refueling Operator Stations (AROS) 240, rotates its internal refueling hose drum 331 in opposite directions in order to unroll out or roll in the aerial refueling hose 234. The SAAR Aerial Refueling Operator Stations (AROS) 240 is connected to the ARS fuel management system 238 via the SAAR fuel wiring harness and reporting subsystem 223, and the ARS fuel management system 238 is connected to the SAAR Aerial Refueling System (ARS) 231 via the SAAR Aerial Refueling System (ARS) wiring harness 232. Extending the aerial refueling hose 234 enables the drogue and basket subsystem 235 to be deployed downward and aft for the inflight refueling processes for receiver aircraft. Retracting the aerial refueling hose 234 enables the drogue and basket subsystem 235 to be stowed back into the SAAR Aerial Refueling System (ARS) 231.

Figure 6:
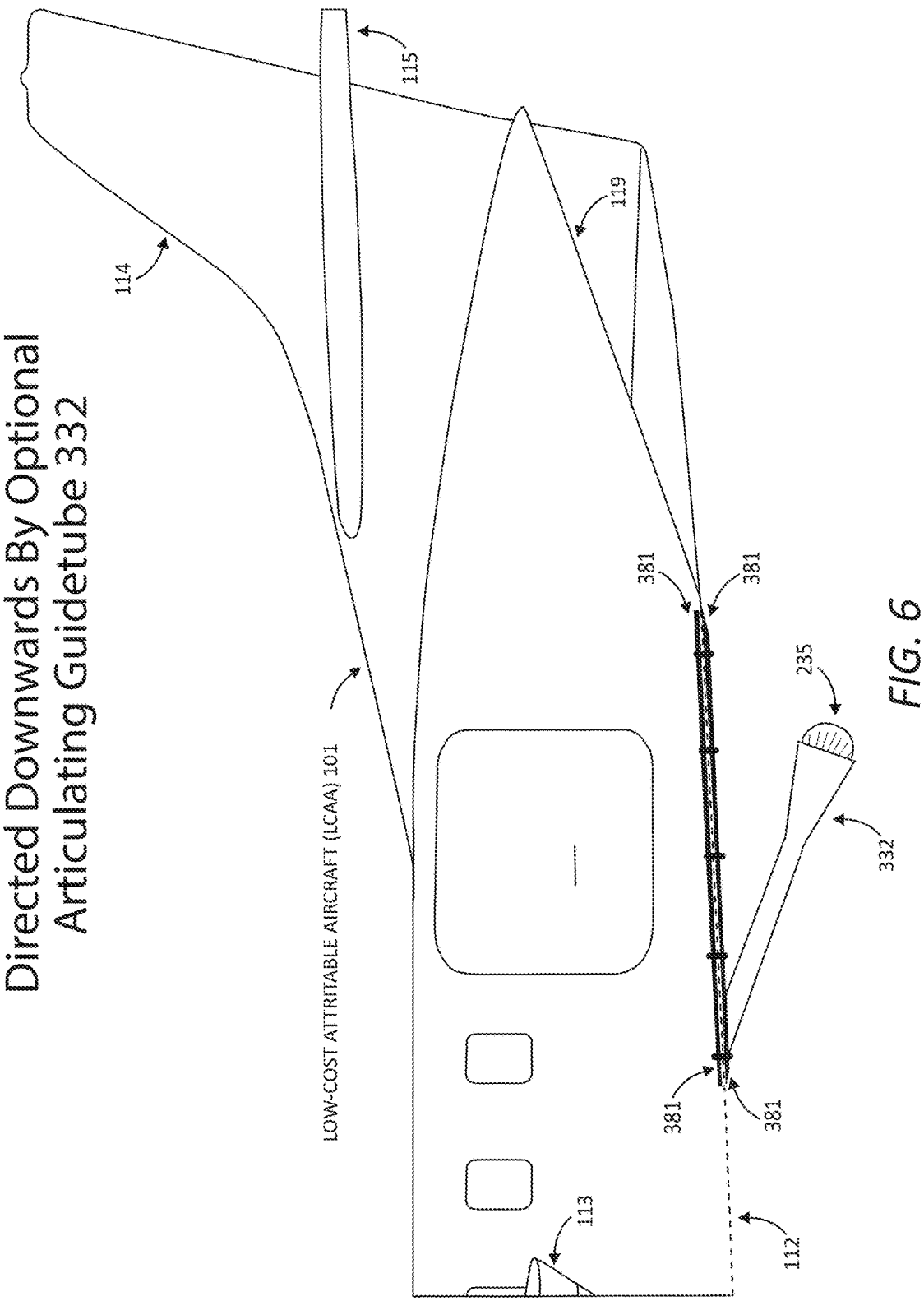
FIG. 6 is a cutaway side view of the Low-Cost Attritable Aircraft (LCAA) 101, showing the internal and external fuselage reinforcement plates 381 installed, with the ARS 231 installed inside the SAAR fuselage subsystem 210, according to various embodiments described herein.

FIG. 6 is a cutaway side view of the Low-Cost Attritable Aircraft (LCAA) 101, showing the internal and external fuselage reinforcement plates 381 installed, with the ARS 231 installed inside the SAAR fuselage subsystem 210, which in turn is installed inside the LCAA fuselage 112, with the aerial refueling hose 234 retracted, with the optional articulating guidetube 332 rotated downward to a deployed position, according to various embodiments described herein. The SAAR Aerial Refueling System (ARS) 231, with the aerial refueling hose 234, drogue and basket subsystem 235 retracted, and with the ARS 231 refueling manifolds 233 connected to the optional SAAR dual-walled fuel manifold subsystem 225.

Figure 7:
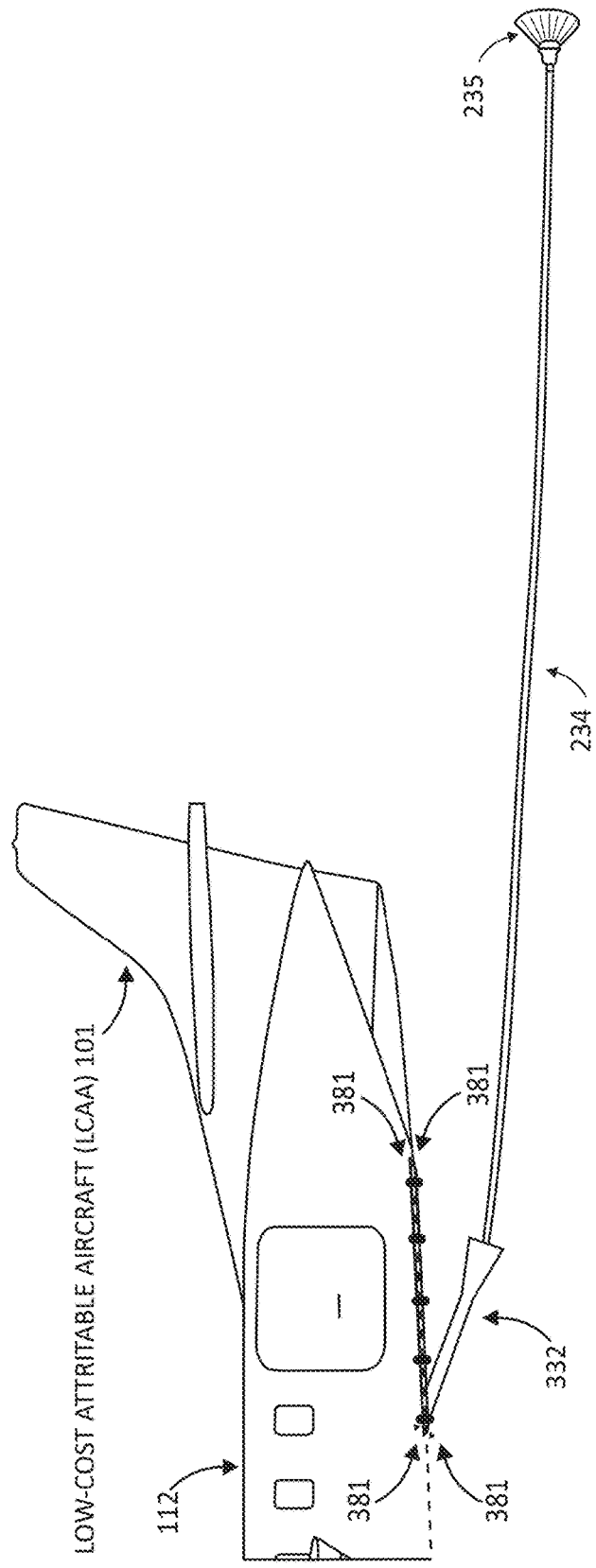
FIG. 7 is a cutaway side view of the Low-Cost Attritable Aircraft (LCAA) 101, showing the internal and external fuselage reinforcement plates 381 installed, with the ARS 231 installed inside the SAAR fuselage subsystem 210, according to various embodiments described herein.

FIG. 7 is a cutaway side view of the Low-Cost Attritable Aircraft (LCAA) 101, showing the internal and external fuselage reinforcement plates 381 installed, with the ARS 231 installed inside the SAAR fuselage subsystem 210, which in turn is installed inside the LCAA fuselage 112, with the optional articulating guidetube 332 rotated downward to a deployed position, and with the aerial refueling hose 234 extended, and according to various embodiments described herein. The SAAR Aerial Refueling System (ARS) 231, with the aerial refueling hose 234, drogue and basket subsystem 235 extended, and with the ARS 231 wiring harness 232 connected to the SAAR fuel wiring harness and reporting subsystem 223.

Figure 8:
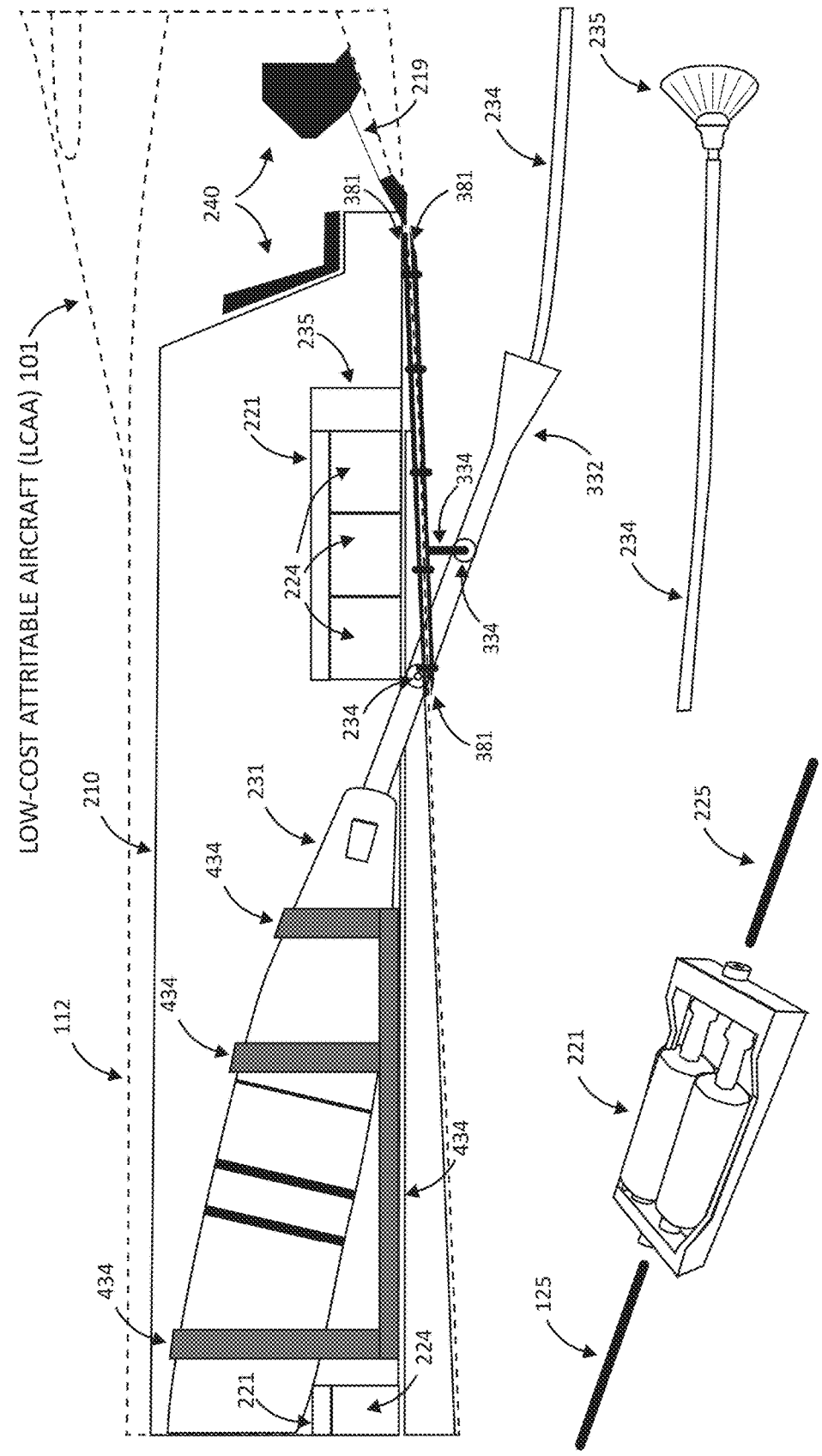
FIG. 8 is a cutaway side view of the Low-Cost Attritable Aircraft (LCAA) 101, showing the internal and external fuselage reinforcement plates 381 installed, with the ARS 231 installed inside the SAAR fuselage subsystem 210, according to various embodiments described herein.

FIG. 8 is a cutaway side view of the Low-Cost Attritable Aircraft (LCAA) 101, showing the internal and external fuselage reinforcement plates 381 installed, with the ARS 231 installed inside the SAAR fuselage subsystem 210, which in turn is installed inside the LCAA fuselage 112, with the optional articulating guidetube 332 rotated downward to a deployed position, with the aerial refueling hose 234 and the drogue and the drogue and basket subsystem 235 extended, where the ARS 231 pushes or pulls the aerial refueling hose 234 into or out of the slipstream, based on ARO control selections of the optional AROS 240, according to various embodiments described herein. Additionally, the installed ARS 231 may be supported securely by an ARS Carriage Assembly 434, that may be oriented horizontally or in a 5-15 degree inclined orientation to better align the aerial refueling hose 234 with its necessary exit from the LCAA fuselage.

Additionally, the installed SAAR fuselage subsystem 210, may include the optional SAAR dual-walled fuel manifold subsystem 225, that may be temporarily attached to the aircraft single walled fuel manifolds 125 and to the optional SAAR Aerial Refueling System (ARS) 231 refueling manifolds 233, and therefore may integrate the optional SAAR fuel management subsystem 221 with the aircraft fuel management subsystem 121 and the ARS fuel management system 238. Additionally, the installed SAAR fuselage subsystem 210, may include the optional SAAR fuel wiring harness and reporting subsystem 223, that may be temporarily attached to the aircraft fuel wiring harness and reporting subsystem 123, and to the optional SAAR Aerial Refueling System (ARS) wiring harness 232, and therefore be integrated with the aircraft fuel management subsystem 121, and the ARS fuel management system 238. Additionally, the installed SAAR fuselage subsystem 210, may include the optional SAARCG subsystem 236, that may manage center-of-gravity, based on ARO control selections of the optional AROS 240, in order to maximize drogue/basket 235 stability while minimizing LCAA wake turbulence. The ARS fuel management system 238 manages fuel within the SAAR Aerial Refueling System (ARS) 231, and the optional SAAR fuel management subsystem 221 manages fuel with the optional SAAR fuel tanks 224. Additionally, fuel flow/distribution between the aircraft fuel system and the optional SAAR fuel system, and between the number of optional SAAR fuel tanks 224, and from the number of SAAR fuel tanks 224 to the ARS fuel management system 238 may be managed by the optional SAAR fuel management subsystem 221.

Figure 9:
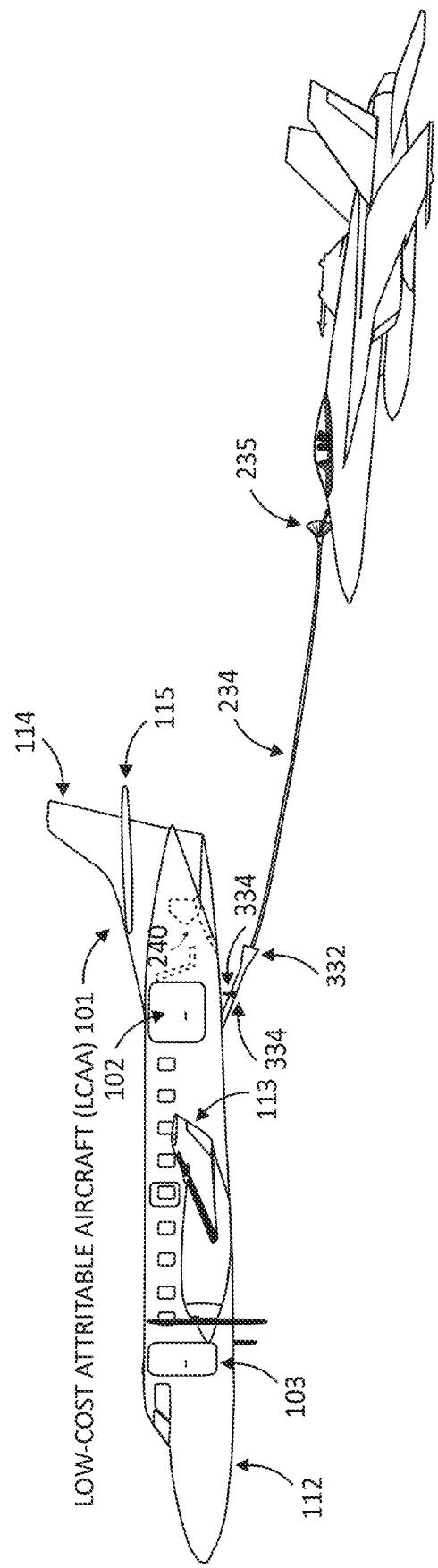
FIG. 9 is a cutaway side view of the Low-Cost Attritable Aircraft (LCAA) 101, the ARS 231 assembled and installed inside the LCAA fuselage 112, with the aerial refueling hose 234 and the drogue and the drogue and basket subsystem 235 extended, according to various embodiments presented herein.

FIG. 9 is a cutaway side view of the Low-Cost Attritable Aircraft (LCAA) 101, the ARS 231 assembled and installed inside the LCAA fuselage 112, with the aerial refueling hose 234 and the drogue and the drogue and basket subsystem 235 extended, with the optional articulating guidetube 332 rotated downward to a deployed position, and with an F/A-18 receiver aircraft refueling, according to various embodiments presented herein. Additionally, the optional articulating guidetube 332 may exit through an optional SAAR sealed pressure vessel fuselage exit 482, to enable the LCA Aircraft to maintain its standard pressurization schedule, as well as to provide the SAAR aerial refueling hose 234 an apparatus to be routed aft and below the LCA Aircraft 101, to a position that provides AR receiver aircraft smoother air and a more stable aerial refueling hose 234 and drogue and basket 235. The SAAR fuselage subsystem 210 is a compact size and shape that fits within the confines of the aircraft fuselage 112. The SAAR Aerial Refueling System (ARS) 231, ARS refueling manifolds 233, ARS wiring harness 232, ARS fuel management system 238, and SAAR subsystem 210 components may be loaded into the aircraft 101 via the cargo door 102 and passenger entry door 103. The modular components may enable relatively easy installation, removal and palletization.

The installed SAAR fuselage subsystem 210 may include the optional SAAR dual-walled fuel manifold subsystem 225, that may be temporarily attached to the aircraft single walled fuel manifolds 125, and therefore be integrated with the aircraft fuel management subsystem 121. Additionally, the installed SAAR fuselage subsystem 210 may include the optional SAAR fuel wiring harness and reporting subsystem 223 that may be selectively attached to the aircraft fuel wiring harness and reporting subsystem 123, and to the SAAR Aerial Refueling System (ARS) wiring harness 232. If so installed, the SAAR fuel wiring harness and reporting subsystem 223 may therefore be integrated with the aircraft fuel management subsystem 121 and the ARS fuel management system 238.

Related to various embodiments, and using fault tolerant quick disconnects 350/351, the aircraft 101 single walled fuel manifolds 125 may be removably coupled to the optional SAAR dual-walled fuel manifolds 225, which may be removably coupled to the ARS 231 refueling manifolds 233, which may be semi-permanently coupled to the aerial refueling hose 234. The selectively removable SAAR dual-walled fuel manifolds 225 may be semi-permanently coupled to the number of SAAR fuel tanks 224, as well as, the SAAR fuel management subsystem 221. Based on selections the aircrew make, the SAAR fuel management subsystem 221 may appropriately manage the fuel located in the SAAR fuel tanks 224, fuel being moved from aircraft fuel tanks 124 to individual SAAR fuel tanks 224, and fuel being moved from individual SAAR fuel tanks 224 to aircraft fuel tanks 124. Based on selections the aircrew make, the SAAR fuel management subsystem 221 may appropriately manage fuel being moved from the SAAR fuel tanks 224 to the ARS refueling manifolds 233, and from the ARS refueling manifolds 233 to the SAAR fuel tanks 224. Additionally, fuel flow/distribution between the number of SAAR fuel tanks 224 may be managed by the SAAR fuel management subsystem 221. Additionally, ARS 231 refueling may be managed by the ARS fuel management system 238, which is temporarily connected to the ARS wiring harness 232. Further, the selectively removable SAAR dual-walled fuel manifolds 225 may temporarily connect the number of SAAR fuel tanks 224 to each other, and may temporarily connect to the ARS refueling manifolds 233. Readily available COTS fault tolerant quick disconnects 350/351 for fuel line coupling may be employed for removably connecting fuel lines and fuel subsystems, as described above. To clarify the role of "single" versus "dual" walled fuel manifolds, and per safety regulations and practices, they are determined to be single walled or dual walled as a result of their being located in a pressurized or an unpressurized area of the aircraft 101 or the SAAR system 201.

Multiple SAAR fuel control units 227, acting as fuel flow controller/shutoff valves, may be positioned between the aircraft fuel tanks 124 and the SAAR fuel tanks 224, as well as, between the SAAR fuel tanks 224. Electronic commands to SAAR fuel control units 227, distributed by the SAAR fuel wiring harness and reporting subsystem 223, are initiated by aircrew—or are initiated by the SAAR fuel management subsystem 221 or the SAAR center-of-gravity (SAARCG) subsystem 236. In addition to multiple SAAR fuel control units 227, vacuum relief fuel check valves 321 and other SAAR fuel system components 229, may be installed in unpressurized areas to provide drainage of fuel remaining within the aircraft 101 single walled fuel manifolds 125, when the SAAR fuel control units 227 (fuel flow controller/shutoff valves) are closed.

While the SAAR fuel control units 227 (fuel flow controller/shutoff valves) and the vacuum relief fuel check valves 321 are described and illustrated above, a number of other SAAR fuel system components 229 might be used, with respect to a temporary installation of the SAAR system 201 within the aircraft 101, as well as, to enable the transfer of fuel between the aircraft fuel tanks 124 and the SAAR fuel tanks 224, between the SAAR fuel tanks 224, and finally, from the SAAR fuel tanks 224 to the ARS fuel management system 238. Additionally, the SAAR Refueling System 230 may include a wide variety of control mechanisms, pressure regulators, fuel pumps and other SAAR fuel system components 229 to enable the flow of fuel via the aerial refueling hose 234 to the SAAR drogue and basket subsystem 235.

For Aerial Refueling System networked control and communications, the SAAR system 201 may include the SAAR Aerial Refueling Operator Station (AROS) 240, which may be networked with the aircraft cockpit, with integrated displays and controls subsystem 181, and the aircraft integrated computer subsystem 191, via the SAAR fuel wiring harness and reporting subsystem 223. Additionally, the SAAR Aerial Refueling Operator Station (AROS) 240, may also be selectively networked with the aircraft fuel wiring harness and reporting subsystem 123, to the SAAR Aerial Refueling System (ARS) wiring harness 232, the ARS fuel management system 238, the aircraft flight control subsystem 131, the aircraft automatic flight control subsystem (AFCS) 132, the SAAR center-of-gravity (SAARCG) subsystem 236, and the SAARCG-AFCS Interconnect (SAARCG-AFCS-I) subsystem 237, via the SAAR fuel wiring harness and reporting subsystem 223. In this manner, the SAAR Aerial Refueling Operator Station (AROS) 240 provides selectively automated (crewed), selectively autonomous (uncrewed), and selectively stabilized aerial refueling operations.

As previously described, the SAAR Aerial Refueling Operator Station (AROS) 240 may be made up of several modular quick-disconnect components, assembled inside the aircraft 101 fuselage 112. As previously described, the SAAR Aerial Refueling Operator Station (AROS) 240 may include an AROS console 241, an AROS aerial refueling displays 242, an AROS aerial refueling controls 243, a SAAR fuel management controls 244, a Selectively-Autonomous Aerial Refueling Automation (SAARA) subsystem 245, an AROS station entry 246, and an AROS secure upright seat 247.

The SAAR Aerial Refueling Operator Station (AROS) 240 subsystems may be provided computational data processing by an AROS computational subsystem 322, made up of reliable, fault-tolerant computer systems 323, AROS distributed computing software 324, and AROS firmware 326 operating on SAAR GPU, DSP, ASIC or FPGA chips or chipsets 284. The SAAR Aerial Refueling Operator Station (AROS) 240 may be used to control power input to the SAAR Aerial Refueling System (ARS) 231, ARS wiring harness 232, the ARS fuel management system 238, the ARS fuel control units 239, and the SAAR center-of-gravity (SAARCG) subsystem 236. For example, the SAAR Aerial Refueling Operator Station (AROS) 240 may be operated to start or stop the ARS fuel management system 238 for extending or retracting the aerial refueling hose 234.

Figure 10:
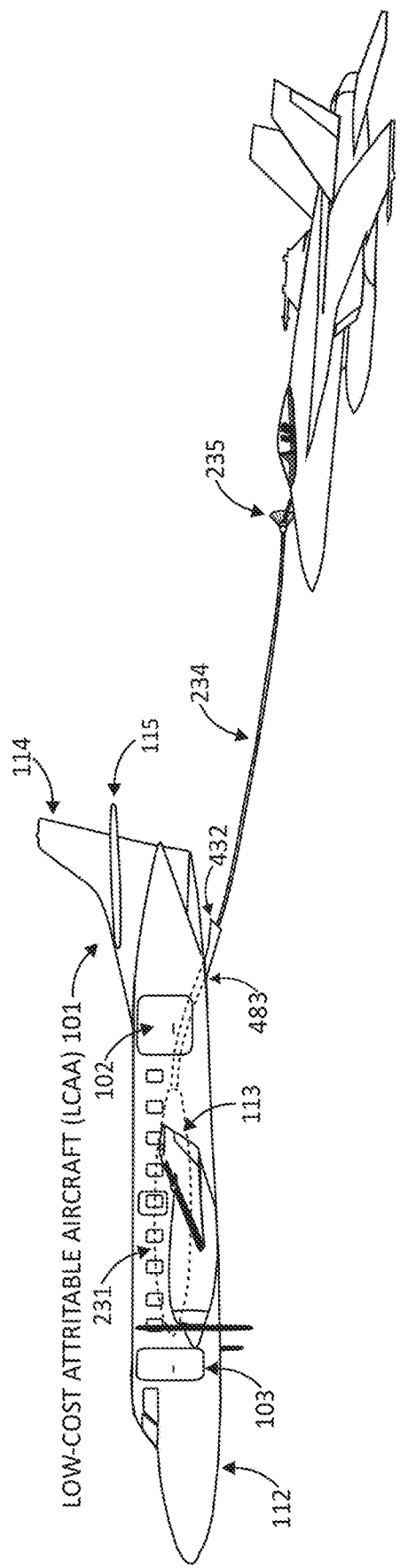
FIG. 10 provides a side view of the SAAR Low-Cost Attritable Aircraft (LCAA) 101, the ARS 231 installed in a horizontal configuration, with a curved fixed guidetube 432, and without the optional pressure vessel 202 or optional AROS 240, while refueling a receiver F/A-18E, according to various embodiments presented herein.

FIG. 10 provides a side view of the SAAR Low-Cost Attritable Aircraft (LCAA) 101, the ARS 231 installed in a horizontal configuration, with the curved fixed guidetube 432, and without the optional pressure vessel 202 or optional AROS 240, while refueling a receiver F/A-18E, according to various embodiments presented herein. Additionally, the curved fixed guidetube 432 may exit through a SAAR unsealed pressure vessel fuselage exit 483 to provide the SAAR aerial refueling hose 234 an apparatus to be routed aft and below the LCA Aircraft 101, to a position that provides AR receiver aircraft smoother air and a more stable aerial refueling hose 234 and drogue and basket 235. The optional SAAR unsealed pressure vessel fuselage exit 483 results in the LCA Aircraft maintaining ambient outside pressure and oxygen levels. Therefore, all personnel stations can be outfitted with OBOGS or another type of oxygen system.

Figure 11:
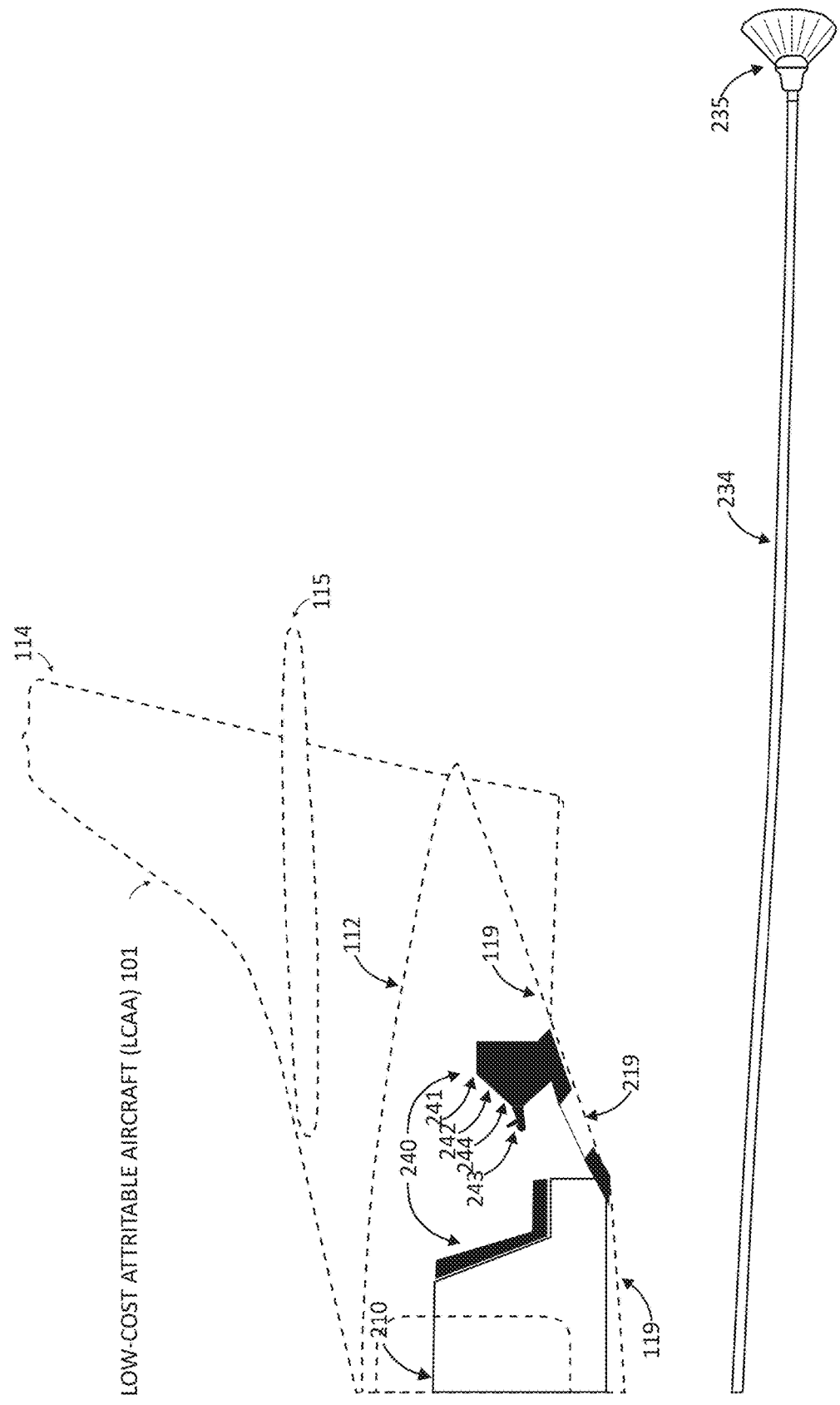
FIG. 11 is a cutaway side view of the Low-Cost Attritable Aircraft (LCAA) 101, the installed SAAR fuselage subsystem 210, according to various embodiments presented herein.

FIG. 11 is a cutaway side view of the Low-Cost Attritable Aircraft (LCAA) 101, the installed SAAR fuselage subsystem 210, and the optional SAAR Aerial Refueling Operator Station (AROS) 240, that may be located at the aft end of the fuselage subsystem 210 in the SAAR fuselage 112, where the ARO, while seated at the optional AROS console 241, may operate the optional Selectively-Autonomous Aerial Refueling Automation (SAARA) subsystem 245, which reduces ARO workload and improves situational awareness, according to various embodiments presented herein. When seated in front of the optional AROS console 241, the ARO may view optional aerial refueling displays 242, and may operate optional aerial refueling controls 243 and optional fuel management controls 244, which may be connected to a variety of aircraft 101 subsystems and wiring harnesses with quick-disconnect fittings. When seated in front of the optional AROS console 241, the ARO may view receiver aircraft tanker operations via an optional ARO viewport window 219.

Figure 12:
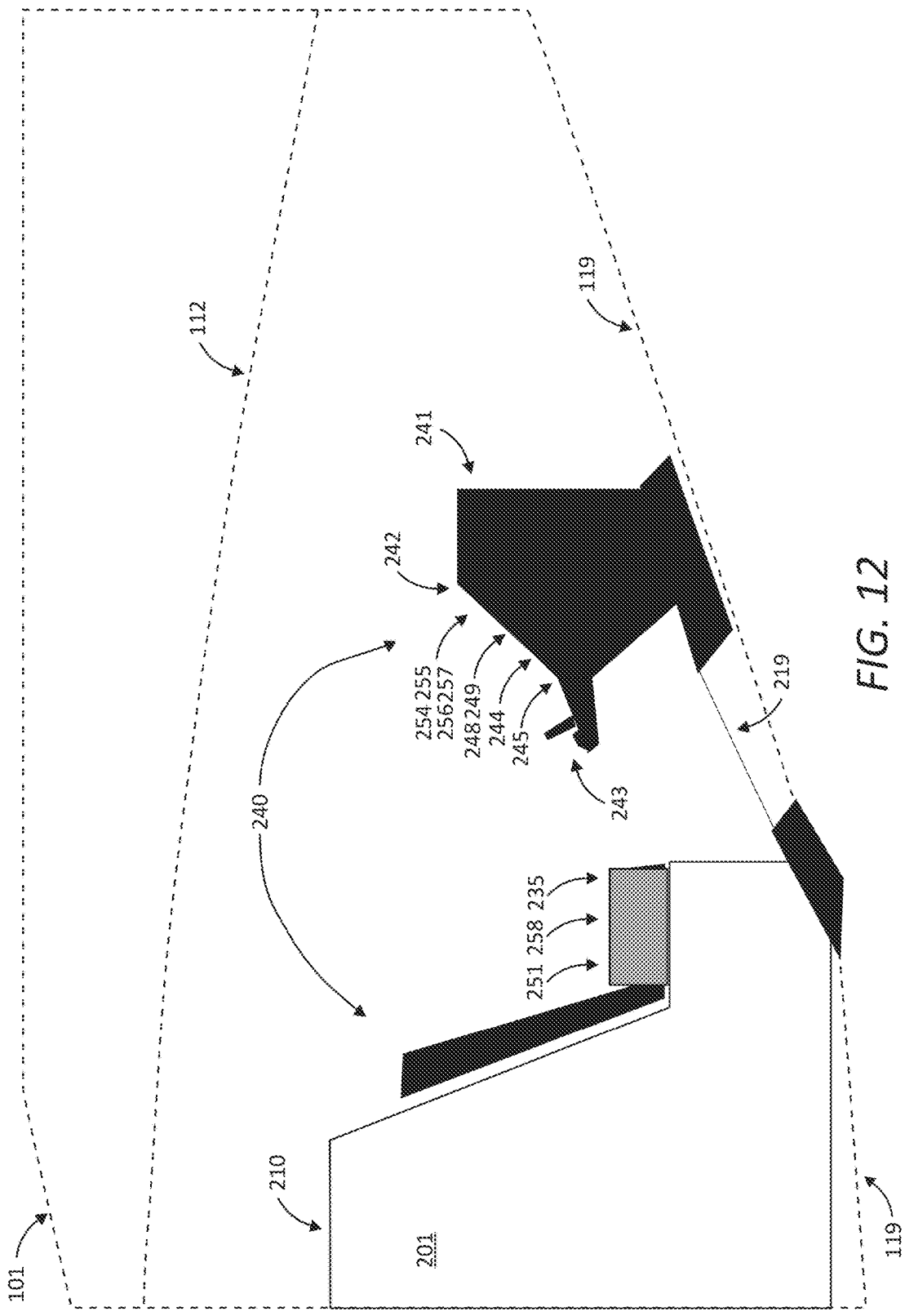
FIG. 12 is a cutaway side view of the Low-Cost Attritable Aircraft (LCAA) 101, the installed SAAR fuselage subsystem 210, and a more detailed view of the optional SAAR Aerial Refueling Operator Station (AROS) 240, according to various embodiments presented herein.

FIG. 12 is a cutaway side view of the Low-Cost Attritable Aircraft (LCAA) 101, the installed SAAR fuselage subsystem 210, and a more detailed view of the optional SAAR Aerial Refueling Operator Station (AROS) 240, that may be located at the aft end of the fuselage subsystem 210 in the SAAR fuselage 112, where the ARO, while seated at the optional AROS console 241, may operate the optional Selectively-Autonomous Aerial Refueling Automation (SAARA) subsystem 245, which reduces ARO workload and improves situational awareness, according to various embodiments presented herein. Additional subsystems of optional AROS 240 may include AROS augmented-reality displays 248, AROS video displays 249, and ISR, Computer vision and Decision-Support AI/ML Software 529, that may be integrated with the AROS aerial refueling displays 242. These optional computer vision systems may utilize more than one video cameras that capture the drogue and basket subsystem 235 engagement area, that capture and process visual information in real-time, to provide the ARO with the constant status of extension, retraction, and engagement status of the ARS 231, the aerial refueling hose 234, and the drogue and basket subsystem 235.

LCAA 101 subsystems integrated with the optional SAAR Aerial Refueling Operator Station (AROS) 240 may include the aircraft fuel management subsystem 121, the aircraft flight control subsystem 131, and the aircraft automatic flight control subsystem (AFCS) 132. The Aerial Refueling Operator Station (AROS) 240 may include the optional SAAR center-of-gravity (SAARCG) subsystem 236, and the optional SAARCG-AFCS Interconnect (SAARCG-AFCS-I) subsystem 237. The optional AROS 240 provides the Aerial Refueling Operator (ARO) with the AROS displays 242, AROS controls 243, SAAR fuel management controls 244, and SAAR Automation (SAARA) 245 controls for management and control of the SAAR system 201. Additionally, FIG. 12 shows the optional AROS viewport window 219 may be located in the aft fuselage wall 119 of the aircraft 101. The optional AROS 240 may be made up of modular units, that are quickly and easily installed and removed. When removed, the optional AROS 240 modular units may be stored and moved in a set of AROS cases 299, that are similar to "Pelican" design of instrument cases.

FIG. 13 is a cutaway side view of the aft fuselage of the Low-Cost Attritable Aircraft (LCAA) 101, showing the internal and external fuselage reinforcement plates 381 installed, with the ARS 231 installed inside the SAAR fuselage subsystem 210, which in turn is installed inside the LCAA fuselage 112, with the optional articulating guidetube 332 rotated downward to a deployed position, with the aerial refueling hose 234 and the drogue and the drogue and basket subsystem 235 extended, where the ARS 231 pushes or pulls the aerial refueling hose 234 into or out of the slipstream, based on ARO control selections of the optional AROS 240, according to various embodiments described herein. Additionally, the installed ARS 231 may be supported securely by an ARS Carriage Assembly 434, that may be oriented horizontally or in a 5-15 degree inclined orientation to better align the aerial refueling hose 234 with its necessary exit from the LCAA fuselage. Additionally, the installed SAAR fuselage subsystem 210, may include the SAAR dual-walled fuel manifold subsystem 225, that may be temporarily attached to the aircraft single walled fuel manifolds 125 and to the SAAR ARS refueling manifolds 233, and therefore may integrate the SAAR fuel management subsystem 221 with the aircraft fuel management subsystem 121 and the ARS fuel management system 238. Additionally, the installed SAAR fuselage subsystem 210, may include the SAAR fuel wiring harness and reporting subsystem 223, that may be temporarily attached to the aircraft fuel wiring harness and reporting subsystem 123, and to the SAAR ARS wiring harness 232, and therefore be integrated with the aircraft fuel management subsystem 121, and the ARS fuel management system 238. Additionally, the installed SAAR fuselage subsystem 210, may include the optional SAARCG subsystem 236, that may manage center-of-gravity, based on ARO control selections of the optional AROS 240, in order to maximize drogue/basket 235 stability while minimizing LCAA wake turbulence. The ARS fuel management system 238 manages fuel within the SAAR Aerial Refueling System (ARS) 231, and the SAAR fuel management subsystem 221 manages fuel with the optional SAAR fuel tanks 224. Additionally, fuel flow/distribution between the aircraft fuel system and the SAAR fuel system, and between the number of optional SAAR fuel tanks 224, and from the number of SAAR fuel tanks 224 to the ARS fuel management system 238 may be managed by the SAAR fuel management subsystem 221.

Now moving to FIG. 14, a cutaway front-to-aft view of the SAAR fuselage subsystem 210, which may provide a foundation for additional SAAR components. The SAAR fuselage subsystem 210 may include multiple attachment points 211, that may removably attach to aircraft fuselage airframe hard points 116, via adjustable length, locking connecting rod trusses 212, with lightweight, high tensile strength bolts, according to various embodiments presented herein. Additionally, the installed adjustable length, locking connecting rod trusses 212 may employ lightweight, adjustable shock absorbers 213, or may employ lightweight, adjustable strain gauges 214. The aircraft fuselage airframe hard points 116 may be reinforced with carbon pads 311 (e.g., lightweight, high tensile strength "flat-fit carbon pads" and/or "form-fit carbon pads") that distribute forces across a larger area of the LCA aircraft 101 fuselage 112 structure. The carbon pads 311 may become semi-permanently installed structural attachment hard points 116 inside the LCA aircraft 101 fuselage 112. To reduce fatigue and the potential for hardware failure at and around aircraft fuselage airframe hard points 116, certain connecting rod trusses 212 may employ lightweight, adjustable shock absorbers 213. To measure strain on connecting rod trusses 212, and to reduce the potential for hardware failure at and around aircraft fuselage airframe hard points 116, certain connecting rod trusses 212 may employ lightweight, adjustable strain gauges 214, that provide data to aircrew via the SAAR fuel wiring harness and reporting subsystem 223, may be displayed in the SAAR Aerial Refueling Operator Station (AROS) 240.

Installation of SAAR Components Integrated with the Fuselage Subsystem. Looking again at FIG. 14, the cutaway side view of the SAAR fuselage subsystem 210 may provide a foundation for additional SAAR components. As previously described, additional SAAR subsystems integrated with the SAAR fuselage subsystem 210 may include the SAAR fuel subsystem 220, the SAAR Refueling System 230, the SAAR Aerial Refueling Operator Station (AROS) 240, the SAAR lighting and safety subsystems 250, the SAAR Built-In-Test (BIT) subsystem 260, the SAAR ground refueling subsystem 270, the SAAR computer processing subsystem 280, and the SAAR distributed AI/ML software and firmware subsystem 290.

Figure 18:
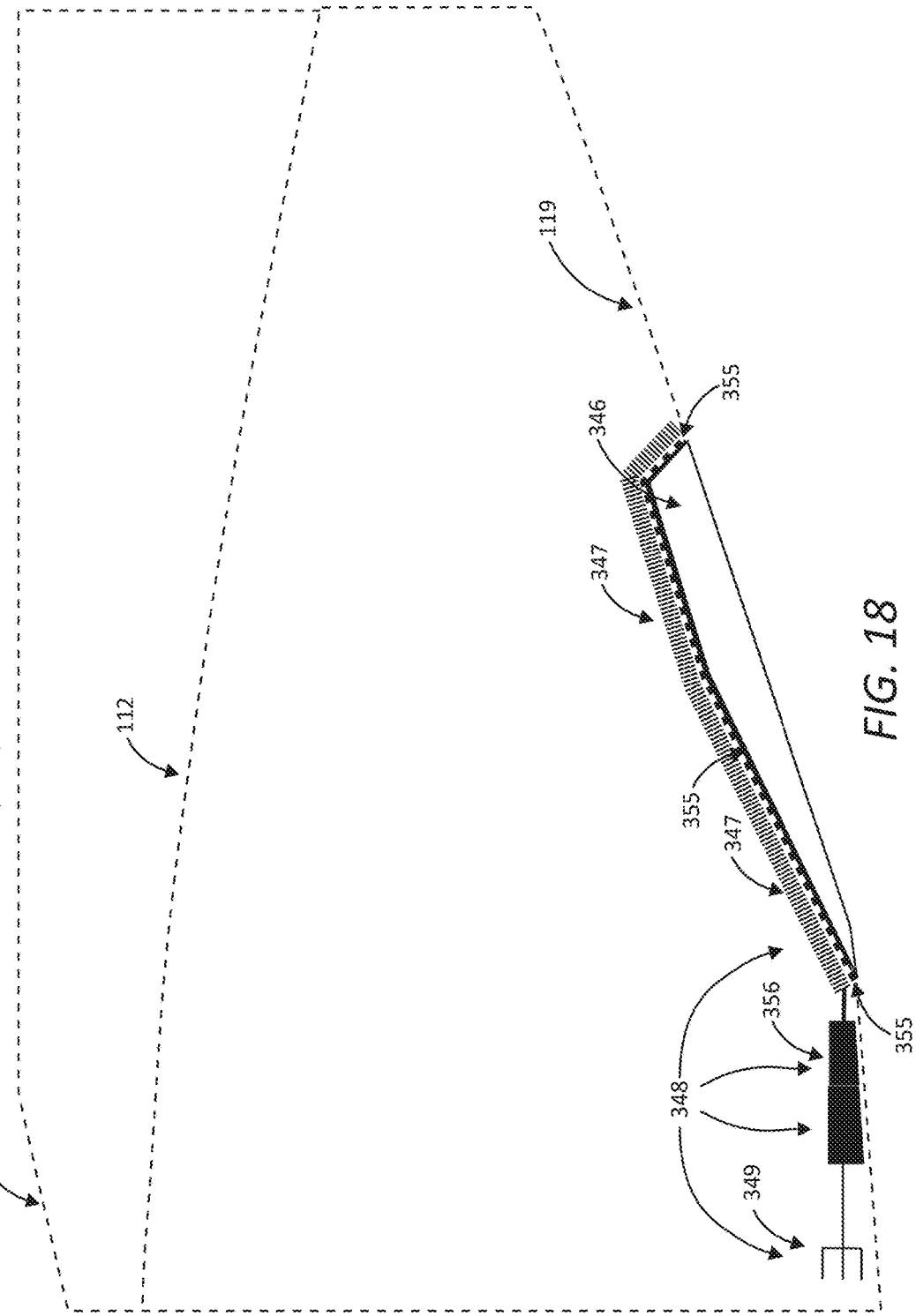
FIG. 18 shows a cutaway side view of the aft wall seals 355, that may be semi-permanently installed in an optional aft wall reinforcement collar 347, according to various embodiments presented herein.

Semi-Permanent Installation of AROS viewport window. Moving to the semi-permanent installation of the SAAR AROS viewport window 219, FIG. 15, FIG. 16 and FIG. 17 provide three cutaway views of the optional SAAR temporary fuselage aft wall 346, the optional AROS viewport window 219, and the optional semi-permanent aft wall seals 355, with FIG. 15 depicting the aircraft 101 aft wall cutout removed from the area denoted 318, FIG. 16 showing the aircraft 101 without the SAAR system 201 and with a temporary fuselage aft wall 346 installed, and FIG. 17 illustrating the optional AROS viewport window 219 installed, according to various embodiments presented herein. With the SAAR aft wall cutout removed from the area denoted 318, FIG. 15 reveals the permanent installation of an aft wall reinforcement collar 347 that strengthens and protects the aft fuselage wall 119 of the aircraft 101. With the SAAR aft wall cutout removed, FIG. 16 shows the semi-permanent installation of the optional temporary fuselage aft wall 346 inside the aft wall reinforcement collar 347. The temporary fuselage aft wall 346 may include semi-permanent aft wall seals 355, that may provide the means to reliably seal the aircraft fuselage 112 pressure vessel for pressurization, to enable the aircraft pressurization subsystem 117 to continue to function normally. With the SAAR AROS viewport window 219 installed, FIG. 17 shows the semi-permanent installation of the optional SAAR AROS viewport window 219 inside the aft wall reinforcement collar 347. With a small portion of the SAAR aft fuselage wall 119 removed and the optional temporary fuselage aft wall 346 installed, FIG. 18 shows a cutaway side view of the aft wall seals 355, that may be semi-permanently installed in an optional aft wall reinforcement collar 347, that may be connected to an optional permanently installed aft wall kit 348, that may include an optional aft wall wiring harness 349, and an optional aft wall door seal controller 356.

FIG. 19 shows a cutaway side view of the SAAR Semi-Permanent installation and integration of an optional ARS refueling manifold 233 and an optional ARS Electrical Wiring Harness 232, as well as installation and integration of an ARS Carriage Assembly 434, that may be oriented horizontally, or may be oriented in a 5-15 degree incline to better align the aerial refueling hose 234 with its necessary exit from the LCAA fuselage. Additionally, the optional SAAR fuselage subsystem 210 may provide optional reliable, fault tolerant quick disconnects 351, which may provide interfaces between the optional SAAR dual-walled fuel manifolds 225 and the SAAR Aerial Refueling System (ARS) 231 refueling manifolds 233. Additionally, an internal Refueling Hose Drum 331 may roll out or roll in the aerial refueling hose 234 to effectively guide the hose outside into the slipstream or back inside the LCAA 101. An optional curved fixed guidetube 432 may be employed to effectively guide the refueling hose 234 into the correct position aft and below the LCA Aircraft 101, to a position that provides AR receiver aircraft smoother air and a more stable aerial refueling hose 234 and drogue and basket 235. Additionally, an electric motor 335, may provide motive force, through a gear reduction and clutch assembly 336, that accurately matches receiver aircraft "hose push forward/ pull aft" to ensure the aerial refueling hose 234 does not have excessive slack. Electrical power for refueling apparatus and fuel control systems may be provided by the SAAR fuselage subsystem 210 via reliable, fault tolerant quick disconnects 319, which may provide interfaces between the SAAR fuel wiring harness and reporting subsystem 223, the aircraft fuel wiring harness and reporting subsystem 123 the aircraft electrical wiring harness 162, and to the SAAR Aerial Refueling System (ARS) wiring harness 232. Additionally, an optional SAAR center-of-gravity (SAARCG) subsystem 236 may provide for selectively automated CG management.

Figure 20:
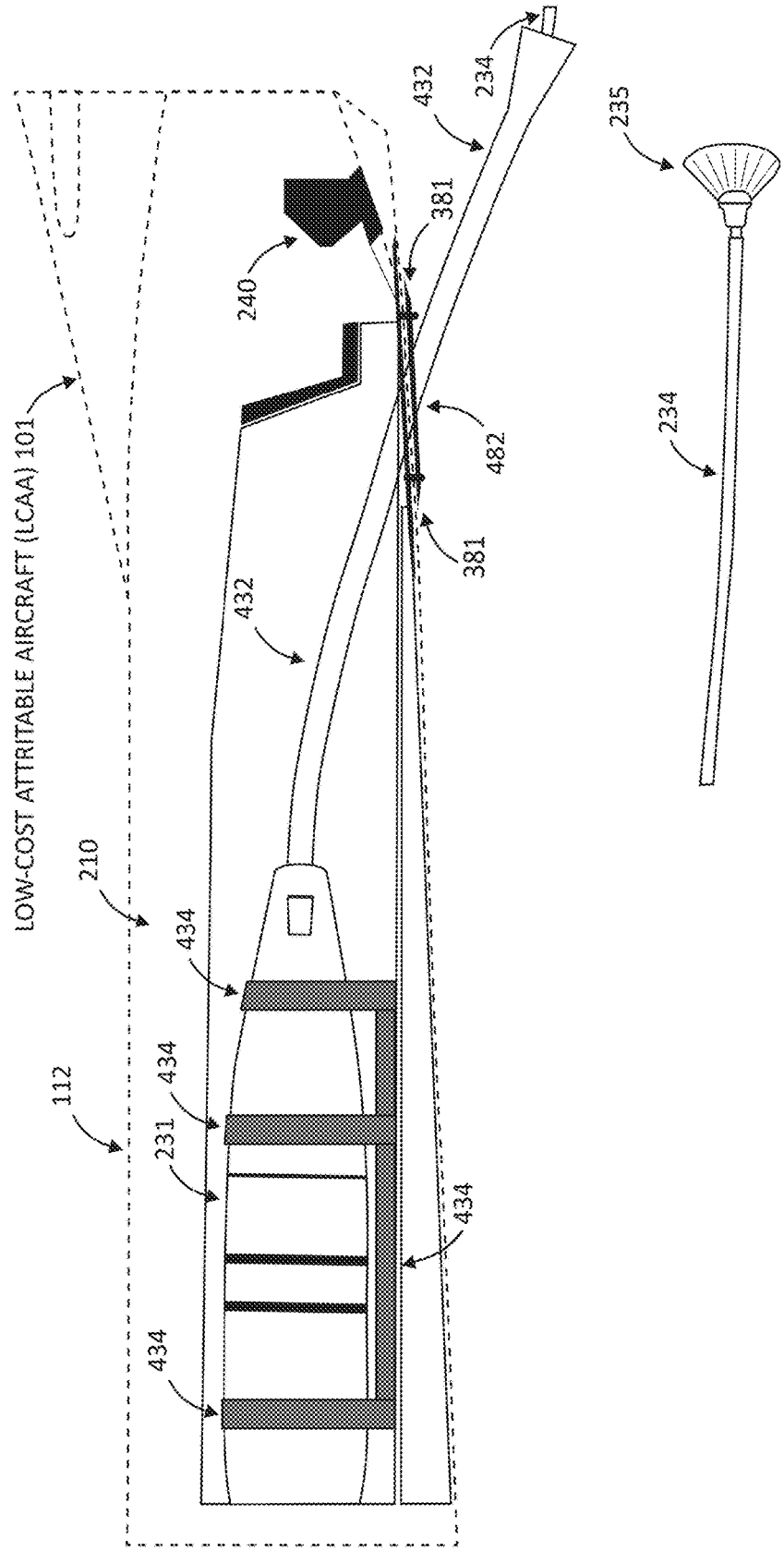
FIG. 20 provides a cutaway side view of the SAAR internally mounted, horizontally installed ARS 231, with the optional AROS 240 installed, according to various embodiments presented herein.

FIG. 20 provides a cutaway side view of the SAAR internally mounted, horizontally installed ARS 231, with the optional AROS 240 installed, with the optional curved fixed guidetube 432, and without the optional SAAR internal fuel tanks 224, according to various embodiments presented herein. To securely integrate the SAAR ARS 231, an ARS Carriage Assembly 434 may be installed oriented either horizontally or in a 5-15 degree incline. Additionally, a SAAR sealed pressure vessel fuselage exit 482 may provide a pressure-sealed passageway for the optional curved fixed guidetube 432, to effectively guide the refueling hose 234 into the ambient pressure slipstream. The optional SAAR sealed pressure vessel fuselage exit 482 enables the LCA Aircraft to maintain its standard pressurization schedule, while inside the SAAR fuselage subsystem pressure vessel 202 the pressure is the same as the ambient outside pressure. Additionally, the SAAR pressure vessel 202 may employ optional floor wall seals 215, that may be semi-permanently installed in an optional floor wall reinforcement collar 343, that may be connected to a permanently installed floor wall kit 344, that may include an optional floor wall wiring harness and installation kit 345.

Figure 21:
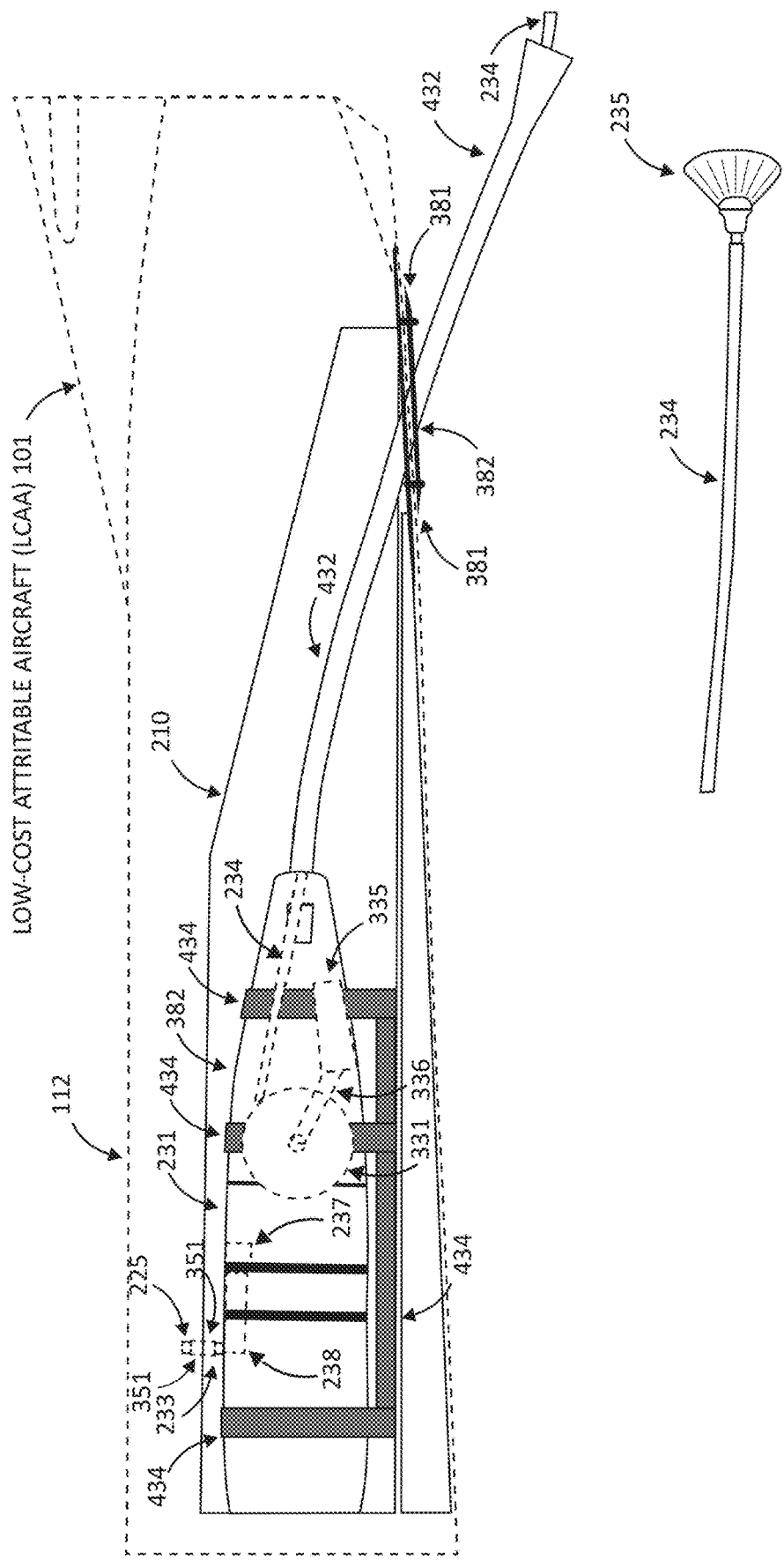
FIG. 21 provides a cutaway side view of the internally installed, horizontally situated SAAR Aerial Refueling System (ARS) 231, according to various embodiments presented herein.

FIG. 21 provides a cutaway side view of the internally installed, horizontally situated SAAR Aerial Refueling System (ARS) 231, its internal Refueling Hose Drum 331, its optional curved fixed guidetube 432, and optional SAAR Pressure Vessel 202, but without the optional AROS 240, optional SAAR internal fuel tanks 224, and optional SAARCG, according to various embodiments presented herein. The installed ARS 231 may be securely supported by the ARS Carriage Assembly 434 that may either be oriented horizontally, or in a 5-15 degree incline to align the aerial refueling hose 234 with its necessary exit from the LCAA fuselage. If the ARS Carriage Assembly 434 is oriented horizontally, the optional curved fixed guidetube 432 will be used to align the aerial refueling hose 234 properly for exit below and aft of the LCAA 101, and if the ARS Carriage Assembly 434 is oriented in a 5-15 degree incline, the optional straight fixed guidetube 433 will be used to align the aerial refueling hose 234 properly for exit below and aft of the LCAA 101. The ARS 231 and its Carriage Assembly 434 may be mounted in a SAAR Fuselage Subsystem 210, that is installed appropriately to be a Pressure Vessel 202—although the LCA Aircraft 101 may not have the optional AROS 240, optional SAAR internal fuel tanks 224, or optional SAARCG installed. FIG. 21 also shows the internal and external fuselage reinforcement plates 381, and the curved fixed guidetube 432. The curved fixed guidetube 432 serves to effectively guide the refueling hose 234 into the ambient pressure slipstream.

Figure 22:
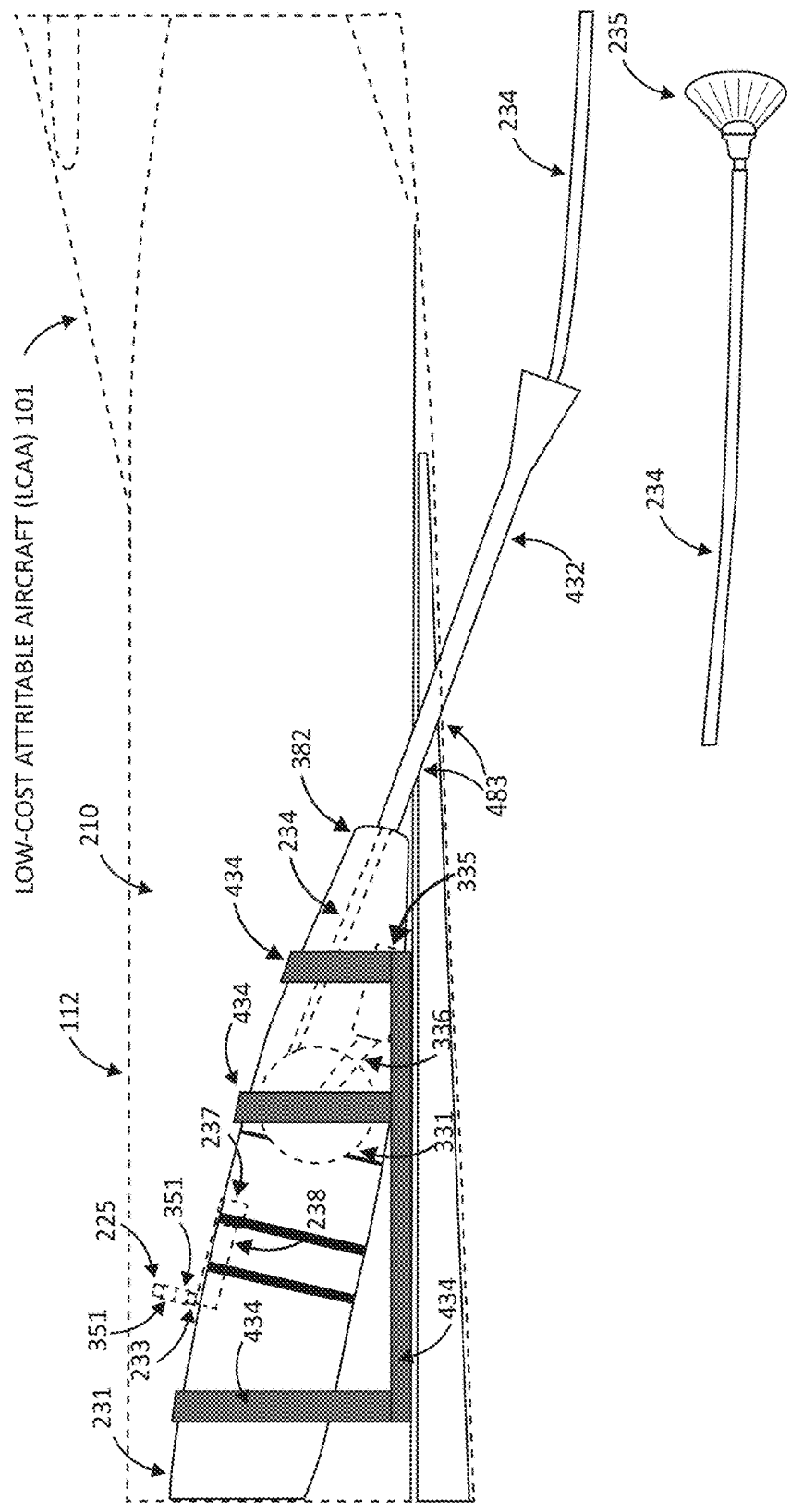
FIG. 22 provides a cutaway side view of the Low-Cost Attritable Aircraft (LCAA) 101, with its internally installed, inclined SAAR Aerial Refueling System (ARS) 231, according to various embodiments presented herein.

FIG. 22 provides a cutaway side view of the Low-Cost Attritable Aircraft (LCAA) 101, with its internally installed, inclined SAAR Aerial Refueling System (ARS) 231, its internal Refueling Hose Drum 331, its optional straight fixed guidetube 433—but without the optional AROS 240, optional SAAR internal fuel tanks 224, and optional SAARCG, according to various embodiments presented herein. The installed ARS 231 may be supported securely by an ARS Carriage Assembly 434, that may be oriented in a 5-15 degree incline to better align the aerial refueling hose 234 with its necessary exit from the LCAA fuselage. The optional straight fixed guidetube 433 may exit through a SAAR unsealed pressure vessel fuselage exit 483, to provide the SAAR aerial refueling hose 234 an apparatus to be routed aft and below the LCAA 101, to a position that provides AR receiver aircraft smoother air and a more stable aerial refueling hose 234 and drogue and basket 235. The optional SAAR unsealed pressure vessel fuselage exit 483 results in the LCA Aircraft maintaining ambient outside pressure and oxygen levels. Therefore, all personnel stations can be outfitted with OBOGS or another oxygen system. FIG. 22 also shows the internal and external fuselage reinforcement plates 381.

Figure 23:
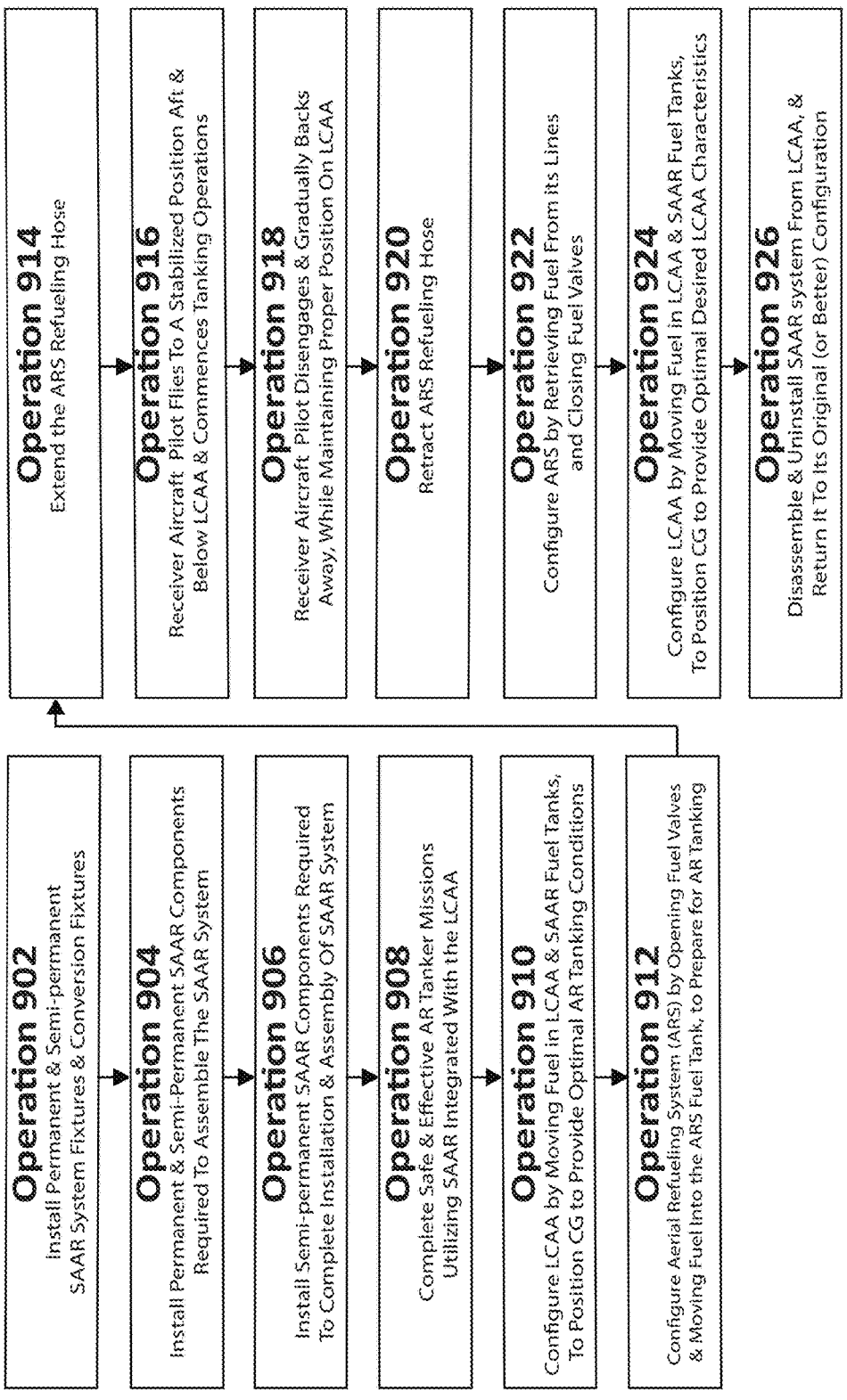
FIG. 23 is a flow diagram showing a method of providing AR tanker support utilizing the SAAR system 201 and a Low-Cost Attritable Aircraft (LCAA) 101, according to various embodiments presented herein.

FIG. 23 depicts an overall routine 900 for installing, employing and uninstalling the Selectively-Autonomous Aerial Refueling (SAAR) System with suitable Low-Cost Attritable Aircraft (LCAA), in order to provide AR tanker support to a wide spectrum of receiver aircraft and missions. The routine operations may be performed in a different manner than those described in routine 900. Additional or fewer operations may be required to complete routine 900, according to various embodiments presented herein.

Procedure for Installing and Employing SAAR for LCA aircraft—Preparation of Permanent and Semi-Permanent Fixtures and Conversion Fixtures. Routine 900 commences at operation 902, to install the permanent and semi-permanent SAAR system 201 fixtures, and conversion fixtures, required to support safe and effective integration of the modular SAAR system 201 components within the LCA aircraft 101. A variety of permanent and semi-permanent SAAR system 201 fixtures are needed to be installed and integrated with the LCA aircraft 101, before installing remaining SAAR system 201 modules. Once all SAAR system 201 modular components are installed, the LCA aircraft 101 is converted into a fully operational AR tanker. When conversion of the LCA aircraft 101 to a different mission that does not require the SAAR system 201 is desired, all SAAR modules and the semi-permanent SAAR fixtures may be removed. The permanent SAAR fixtures will remain in the aircraft—but will not interfere with its normal operations. Permanent SAAR system 201 fixtures may include the following SAAR system 201 components:

Floor Wall Reinforcement Collar 343—the floor wall reinforcement collar 343, that strengthens and protects the aircraft 101 floor wall cutout 118. The floor wall reinforcement collar 343 is permanently integrated with the LCA aircraft 101 fuselage 112 structure to strengthen the fuselage.

Floor Wall Installation Kit 344, Floor Wall Wiring Harness 345—the floor wall kit 344, that may include a floor wall wiring harness and installation kit 345, may be permanently installed, and may support the floor wall reinforcement collar 343 and either the temporary fuselage floor wall 342 (when installed), or the SAAR floor wall system 218 (when installed).

Semi-permanent Floor Wall Seals 215. The floor wall seals 215 are semi-permanently integrated within the floor wall reinforcement collar 343, the floor wall installation kit 344, the floor wall wiring harness 345. The semi-permanent floor wall seals 215 may provide the means to reliably seal the aircraft fuselage 112 pressure vessel, against the SAAR fuselage subsystem 210 pressure vessel 202, to enable the aircraft pressurization subsystem 117 to continue to function normally.

Additional permanent SAAR fixtures that may include the following SAAR system 201 components: LCA aircraft Single-Wall Fuel Manifold Quick Disconnects 350. A specific subset of LCA aircraft 101 single walled fuel manifolds 125 may be selectively attached to permanently installed LCA aircraft Single-Wall Fuel Manifold Quick Disconnects 350. This may provide reliable, fault tolerant quick disconnects with the SAAR Fuel Manifold Quick Disconnects 351. The LCA aircraft Single-Wall Fuel Manifold Quick Disconnects 350 may be permanently installed on a select subset of LCA aircraft single walled fuel manifolds 125. The SAAR Fuel Manifold Quick Disconnects 351 may be permanently installed on a select subset of optional SAAR Dual-Walled Fuel Manifolds 225.

Additional permanent SAAR fixtures that may include the following SAAR system 201 components: Wiring Harness Quick Disconnects 330. The LCA aircraft 101 fuel wiring harness and reporting subsystem 123 may be permanently connected to the Wiring Harness Quick Disconnects 330, to enable quick connections/disconnections with the SAAR fuel wiring harness and reporting subsystem 223 and to the SAAR Aerial Refueling System (ARS) wiring harness 232. Semi-permanent SAAR system 201 fixtures may include the following SAAR system 201 components: Temporary fuselage floor wall 342 and SAAR floor wall system 218

After a portion of the aircraft 101 floor wall cutout 118 has been selectively removed, and the floor wall reinforcement collar 343 and the floor wall installation kit 344, the floor wall wiring harness 345 have been permanently installed—and the SAAR System 201 is not installed—the temporary fuselage floor wall 342 replaces the aircraft 101 floor wall cutout 118 for normal, non-AR, flight operations. When the SAAR System 201 is installed, the SAAR floor wall system 218 replaces the temporary fuselage floor wall 342 for AR flight operations. For both the temporary fuselage floor wall 342 and the SAAR floor wall system 218, the semi-permanent floor wall seals 215 may provide the means to reliably seal the aircraft fuselage 112 pressure vessel, against the SAAR fuselage subsystem 210 pressure vessel 202, to enable the aircraft pressurization subsystem 117 to continue to function normally.

Yet another semi-permanent SAAR fixture are the carbon pads 311 (e.g., lightweight, high tensile strength flat-fit carbon pads and/or form-fit carbon pads) that attach to and reinforce multiple aircraft 101 fuselage airframe hard points 116, that distribute forces across a larger area of the LCA aircraft 101 fuselage 112 structure. The carbon pads 311 may become semi-permanently installed structural attachment hard points 116 inside the LCA aircraft fuselage 112, and may be removed without damaging the fuselage 112. Another semi-permanent SAAR fixture are the SAAR adjustable length, locking connecting rod trusses 212 that may be attached to and later detached from (1) the carbon pads 311 hard points installed within the LCA aircraft fuselage 112 and (2) the SAAR fuselage subsystem 210 attachment points 211, with lightweight, high tensile strength bolts. Additional semi-permanent SAAR fixtures that may include the following SAAR system 201 components: SAAR Fuel Manifold Quick Disconnects 351 and SAAR Dual-Walled Fuel Manifolds 225

The LCA aircraft 101 single walled fuel manifolds 125 may be semi-permanently connected to the optional SAAR dual-walled fuel manifolds 225, using the LCA aircraft Single-Wall Fuel Manifold Quick Disconnects 350 and connecting to the SAAR Fuel Manifold Quick Disconnects 351. The LCA aircraft Single-Wall Fuel Manifold Quick Disconnects 350 may be permanently installed on a select subset of LCA aircraft single walled fuel manifolds 125. The SAAR Fuel Manifold Quick Disconnects 351 may be permanently installed on a select subset of SAAR Dual-Walled Fuel Manifolds 225.

SAAR fuel control units 227 (fuel flow controller/shutoff valves), SAAR Fuel Manifold Quick Disconnects 351 and SAAR Dual-Walled Fuel Manifolds 225. The SAAR fuel control units 227, acting as fuel flow controller/shutoff valves, may be positioned semi-permanently between the aircraft fuel tanks 124 and the SAAR fuel tanks 224, between the SAAR fuel tanks 224, as well as, between SAAR fuel tanks 224 and the ARS 231. The LCA aircraft Single-Wall Fuel Manifold Quick Disconnects 350 may be semi-permanently attached to the SAAR Fuel Manifold Quick Disconnects 351. The SAAR Fuel Manifold Quick Disconnects 351 may be semi-permanently attached to the optional SAAR Dual-Walled Fuel Manifolds 225.

Electronic commands to SAAR fuel control units 227 (fuel flow controller/shutoff valves), distributed by the SAAR fuel wiring harness and reporting subsystem 223, are initiated by aircrew—or are initiated by the SAAR fuel management subsystem 221 or the SAAR center-of-gravity (SAARCG) subsystem 236. The ARS 231 Fuel Manifold Quick Disconnects 351 may be semi-permanently attached to the SAAR Fuel Manifold Quick Disconnects 351.

SAAR Vacuum Relief Fuel Check Valves 321 and Other SAAR Fuel System Components 229. In addition to the SAAR fuel control units 227 described above, SAAR Vacuum Relief Fuel Check Valves 321 and a number of other SAAR fuel system components 229 may be positioned semi-permanently between the aircraft fuel tanks 124 and the SAAR fuel tanks 224, as well as, between the SAAR fuel tanks 224, as well as, between the SAAR fuel tanks 224 and the ARS fuel management system 238. Additional semi-permanent SAAR fixtures that may include the following SAAR system 201 components: SAAR fuel wiring harness and reporting subsystem 223. The LCA aircraft 101 fuel wiring harness and reporting subsystem 123 may be semi-permanently connected to the SAAR fuel wiring harness and reporting subsystem 223, and to the SAAR Aerial Refueling System (ARS) wiring harness 232, using the Wiring Harness Quick Disconnects 330. To enable such quick connections/disconnections, the Wiring Harness Quick Disconnects 330 may be permanently attached to the LCA aircraft 101 fuel wiring harness and reporting subsystem 123 and to the SAAR Aerial Refueling System (ARS) wiring harness 232, and also to the SAAR fuel wiring harness and reporting subsystem 223.

Additional semi-permanent SAAR fixtures that may include the following SAAR system 201 components: SAARCG-AFCS Interconnect (SAARCG-AFCS-I) Subsystem 237.

The LCA aircraft 101 automatic flight control subsystem (AFCS) 132 may be semi-permanently connected to the SAARCG-AFCS Interconnect (SAARCG-AFCS-I) subsystem 237, using the Wiring Harness Quick Disconnects 330. Electronic commands to SAAR fuel control units 227 (fuel flow controller/shutoff valves), distributed by the SAAR fuel wiring harness and reporting subsystem 223, are initiated by aircrew—or are initiated by the SAAR fuel management subsystem 221 or the SAAR center-of-gravity (SAARCG) subsystem 236. Additional semi-permanent SAAR fixtures that may include the following SAAR system 201 components: SAAR Aerial Refueling Operator Station (AROS) 240. The LCA aircraft 101 cockpit, with integrated displays and controls subsystem 181 and the LCA aircraft 101 integrated computer 191 may be semi-permanently connected to the SAAR Aerial Refueling Operator Station (AROS) 240, using the SAAR fuel wiring harness and reporting subsystem 223. The LCA aircraft 101 automatic flight control subsystem (AFCS) 132 may be semi-permanently connected to the SAAR Aerial Refueling Operator Station (AROS) 240, using SAARCG-AFCS Interconnect (SAARCG-AFCS-I) subsystem 237. In this manner, the SAAR Aerial Refueling Operator Station (AROS) 240 provides selectively automated (crewed), selectively autonomous (uncrewed), and selectively stabilized aerial refueling operations.

To enable such quick connections/disconnections, the Wiring Harness Quick Disconnects 330 may be permanently attached to the LCA aircraft 101 cockpit, with integrated displays and controls subsystem 181, Aircraft integrated computer 191, Aircraft automatic flight control subsystem (AFCS) 132 and also to the SAAR Aerial Refueling Operator Station (AROS) 240. Additional semi-permanent SAAR fixtures that may include the following SAAR system 201 components: SAAR lighting and safety subsystems 250. Appropriate lighting and safety subsystems 250 of the LCA aircraft 101 and SAAR system 201 may be semi-permanently connected to the SAAR lighting and safety subsystems 250 using the SAAR computer vision system wiring harness 228. The SAAR light management and control panel subsystem 251, which may provide controls for all SAAR lighting and safety subsystems 250, may be semi-permanently connected to both the SAAR Aerial Refueling Operator Station (AROS) 240 and in the aircraft cockpit 181.

Additionally, using the SAAR computer vision system wiring harness 228, the aircraft subsystems that may be may be semi-permanently connected with the SAAR lighting and safety subsystems 250 may include the aircraft electrical system 161, the aircraft electrical wiring harness 162, the aircraft electrical fault detection and circuit breaker subsystem 163, the aircraft exterior lighting subsystem 164, and the SAAR Built-In-Test (BIT) subsystem 260, SAAR Aerial Refueling System (ARS) 231, the aerial refueling hose 234, the SAAR drogue and basket subsystem 235, the wire ducting and exterior of the aircraft 101 and fuselage 112, and the SAAR light management and control panel subsystem 251, the manually and automatically dimmable SAAR conventional refueling hose, basket/drogue and aircraft light subsystem 252, the manually and automatically dimmable SAAR night-vision-device refueling hose, basket/drogue and aircraft light subsystem 253, the SAAR "excessive closure rate" RADAR safety alert subsystem 254, the SAAR "incorrect position" RADAR safety alert subsystem 255, the SAAR "fuel flow error" safety alert subsystem 256, the manually and automatically executed SAAR "break-away" light safety subsystem 257, and the SAAR ambient light measurement subsystem 258.

To enable such quick connections/disconnections, the Wiring Harness Quick Disconnects 330 may be permanently and/or semi-permanently attached to appropriate wiring harnesses, networks, and electrical leads. Additional semi-permanent SAAR fixtures that may include the following SAAR system 201 components: BIT control and data processing computer subsystem 262. The LCA aircraft 101 (appropriate BIT) subsystems 361 may be semi-permanently connected to the SAAR BIT control and data processing computer subsystem 262, using the SAAR BIT quick-disconnect wiring harness 263. The LCA aircraft 101 (appropriate BIT) subsystems 361 may be semi-permanently connected to the SAAR BIT control and data processing computer subsystem 262, using the Wiring Harness Quick Disconnects 330. Additional semi-permanent SAAR fixtures that may include the following SAAR system 201 components: SAAR Sensors 700 and SAAR Distributed Software and Firmware Subsystem 290 The SAAR Sensors 700 and the SAAR Distributed Software and Firmware Subsystem 290 may be semi-permanently connected to the SAAR Computer Processing Subsystem 280 using the SAAR computer vision system wiring harness 228.

Procedure for Installing and Employing SAAR for LCA aircraft—Installation of AR System. From operation 902, routine 900 continues with operation 904, to permanently and semi-permanently install SAAR system 201 components required to assemble the SAAR system, resulting in a complete system that provides safe and effective AR tanking. Test Procedures for Tests of SAAR Individual and Aggregate Subsystems—During Installation of AR System Per a hardware and software test plan, the SAAR subsystem components may be tested. Per the hardware and software test plan, and prior to installation, certain SAAR components which are about to be installed, will be tested offline. Per the hardware and software test plan, ongoing inline testing of, previously installed, individual and aggregate SAAR subsystems will occur, after their installation.

Permanent Component Installation. A precisely engineered and measured portion of the LCA aircraft 101 floor wall cutout 118 is removed, along with portions of support structure, and corrosion-preventative coatings applied to all bare metal. The floor wall reinforcement collar 343, the floor wall kit 344, the floor wall wiring harness and installation kit 345, and the floor wall seals 215 may be semi-permanently installed. Next, the LCA aircraft Single-Wall Fuel Manifold Quick Disconnects 350, may be permanently installed on a select subset of LCA aircraft single walled fuel manifolds 125. Next, the SAAR Wiring Harness Quick Disconnects 330 may be permanently installed on the LCA aircraft fuel wiring harness and reporting subsystem 123, and to the SAAR Aerial Refueling System (ARS) wiring harness 232. Next, the SAAR Wiring Harness Quick Disconnects 330 may be permanently attached to a selective subset of avionics wiring associated with the aircraft cockpit, with integrated displays and controls subsystem 181, the aircraft integrated computer 191, and the aircraft automatic flight control subsystem (AFCS) 132.

Semi-Permanent Component Installations. After completion of these permanent fixture installations, next up is the semi-permanent fixture installations, starting with the connection of the SAAR Fuel Manifold Quick Disconnects 351 to the LCA aircraft Single-Wall Fuel Manifold Quick Disconnects 350, and the appropriate routing of the SAAR Dual-Walled Fuel Manifolds 225. Next, the SAAR fuel control units 227, acting as fuel flow controller/shutoff valves, may be positioned semi-permanently between the aircraft fuel tanks 124 and the SAAR fuel tanks 224, as well as, between the SAAR fuel tanks 224. Next, and in addition to the SAAR fuel control units 227 described above, SAAR Vacuum Relief Fuel Check Valves 321 and a number of other SAAR fuel system components 229 may be positioned semi-permanently between the aircraft fuel tanks 124 and the SAAR fuel tanks 224, as well as, between the SAAR fuel tanks 224, as well as, between the SAAR fuel tanks 224 and the ARS fuel management system 238.

Next, and using the Wiring Harness Quick Disconnects 330, the LCA aircraft 101 fuel wiring harness and reporting subsystem 123, the SAAR Aerial Refueling System (ARS) wiring harness 232, and the ARS fuel management system 238 the SAAR fuel management subsystem 221, the SAAR fuel wiring harness and reporting subsystem 223, the SAAR fuel control units 227, and the SAAR center-of-gravity (SAARCG) subsystem 236 may be semi-permanently connected. Next, and using the Wiring Harness Quick Disconnects 330, the LCA aircraft 101 automatic flight control subsystem (AFCS) 132 may be semi-permanently connected to the SAARCG-AFCS Interconnect (SAARCG-AFCS-I) subsystem 237. Next, and using the SAAR fuel wiring harness and reporting subsystem 223, the LCA aircraft 101 cockpit, with integrated displays and controls subsystem 181 and the LCA aircraft 101 integrated computer 191 may be semi-permanently connected to the SAAR Aerial Refueling Operator Station (AROS) 240. Next, and using the SAARCG-AFCS Interconnect (SAARCG-AFCS-I) subsystem 237, the LCA aircraft 101 automatic flight control subsystem (AFCS) 132 may be semi-permanently connected to the SAAR Aerial Refueling Operator Station (AROS) 240.

Next, and using the SAAR computer vision system wiring harness 228, a select subset of LCA aircraft 101 subsystems and a select subset of SAAR 201 subsystems may be semi-permanently connected to the SAAR lighting and safety subsystems 250. To enable quick connections/disconnections, the Wiring Harness Quick Disconnects 330 may be permanently and/or semi-permanently attached to appropriate wiring harnesses, networks, and electrical leads. Next, using the SAAR computer vision system wiring harness 228, the select subset of LCA aircraft 101 subsystems that may be semi-permanently connected to the SAAR lighting and safety subsystems 250 may include: the appropriate wiring and ducting within the aircraft 101 and fuselage 112, appropriate lighting and safety subsystems of the LCA aircraft 101, appropriate wiring and ducting within the aircraft electrical system 161, the appropriate wiring and ducting within the aircraft electrical wiring harness 162, the appropriate wiring and ducting within the aircraft electrical fault detection and circuit breaker subsystem 163, the appropriate wiring and ducting within the aircraft exterior lighting subsystem 164, and the SAAR Aerial Refueling Operator Station (AROS) 240 in the aircraft cockpit 181.

Next, using the SAAR computer vision system wiring harness 228, the select subset of SAAR 201 subsystems that may be semi-permanently connected to the SAAR lighting and safety subsystems 250 may include: the SAAR fuselage subsystem 210, the ARS 231, the SAAR drogue and basket subsystem 235, the SAAR Aerial Refueling Operator Station (AROS) 240 and in the aircraft cockpit 181, the SAAR lighting and safety subsystems 250, the SAAR light management and control panel subsystem 251, the manually and automatically dimmable SAAR conventional refueling hose, basket/drogue and aircraft light subsystem 252, the manually and automatically dimmable SAAR night-vision-device refueling hose, basket/drogue and aircraft light subsystem 253, the SAAR "excessive closure rate" RADAR safety alert subsystem 254, the SAAR "incorrect position" RADAR safety alert subsystem 255, the SAAR "fuel flow error" safety alert subsystem 256, the manually and automatically executed SAAR "break-away" light safety subsystem 257, the SAAR ambient light measurement subsystem 258, the SAAR Built-In-Test (BIT) subsystem 260, and the SAAR BIT control and data processing computer subsystem 262. Next, using the SAAR BIT quick-disconnect wiring harness 263, the LCA aircraft 101 (appropriate BIT) subsystems 361 may be semi-permanently connected to the SAAR BIT control and data processing computer subsystem 262. Next, using the Wiring Harness Quick Disconnects 330, the LCA aircraft 101 (appropriate BIT) subsystems 361 may be semi-permanently connected to the SAAR BIT control and data processing computer subsystem 262.

Next, using the SAAR computer vision system wiring harness 228, the SAAR Sensors 700 and the SAAR Distributed Software and Firmware Subsystem 290 may be semi-permanently connected to the SAAR Computer Processing Subsystem 280. Next, the carbon pads 311 are attached to and reinforce multiple aircraft 101 fuselage airframe hard points 116 to distribute forces across a larger area of the LCA aircraft 101 fuselage 112 structure. The carbon pads 311 may become semi-permanently installed structural attachment hard points 116 inside the LCA aircraft fuselage 112, and may be removed without damaging the fuselage 112.

Procedure for Installing and Employing SAAR for LCA aircraft-Completion of AR System. From operation 904, routine 900 continues with operation 906, to semi-permanently install SAAR system 201 components required to complete the installation and assembly of the SAAR system, resulting in a complete system that provides safe and effective AR tanking. Test Procedures for Tests of SAAR Individual and Aggregate Subsystems. During Completion of AR System Per a hardware and software test plan, the SAAR subsystem components may be tested. Per the hardware and software test plan, and prior to installation, certain SAAR components which are about to be installed, will be tested offline. Per the hardware and software test plan, ongoing inline testing of, previously installed, individual and aggregate SAAR subsystems will occur, after their installation.

Semi-Permanent Component Installations. Next, the number of SAAR fuel tanks 224 may be semi-permanently installed one at a time and fastened together in an assembly to support the SAAR fuselage subsystem 210, but below and outside the pressure vessel 202. After installation of the SAAR fuel tanks 224, the remaining SAAR dual-walled fuel manifold subsystem 225 and SAAR fuel wiring harness and reporting subsystem 223 connections are removably attached. It is important to note that the SAAR fuel management subsystem 221, the SAAR fuel measurement (sending units) subsystem 222, portions of the SAAR fuel wiring harness and reporting subsystem 223, portions of the optional SAAR dual-walled fuel manifold subsystem 225, the number of SAAR fuel pumps 226, the number of SAAR fuel control units 227, and the number of other SAAR fuel system components 229 may be located internally in the SAAR fuel tanks 224, or some may be located adjacent to the SAAR fuel tanks 224. Based on selections the aircrew make, the SAAR fuel management subsystem 221 may appropriately manage the fuel located in the SAAR fuel tanks 224, fuel being moved from aircraft fuel tanks 124 to individual SAAR fuel tanks 224, fuel being moved between individual SAAR fuel tanks 224, and fuel being sent to the SAAR Refueling System 230 and SAAR Aerial Refueling System (ARS) 231.

Next, the SAAR fuselage subsystem 210 and pressure vessel 202 may be semi-permanently installed into the LCA aircraft fuselage 112. Prior to installation of fuselage subsystem 210 components, preparations of the aircraft 101 floor wall cutout 118 and SAAR floor wall system 218 alignment and installation are completed. The SAAR fuselage subsystem 210 may be a pressure vessel 202, and may replace a small portion of the aircraft floor wall cutout 118 with a SAAR floor wall system 218 and that may be reliably sealed against the fuselage 112, with a durable semi-permanent floor wall seals 215, to enable the aircraft pressurization subsystem 117 to continue to function normally. Next, the internal and external fuselage reinforcement plates 381 are installed, and the ARS 231 with its aerial refueling hose 234, are installed—with the ARS 231 refueling manifolds 233 connected to the SAAR dual-walled fuel manifold subsystem 225. Additional aircraft fuel manifold 125 and SAAR fuel manifold 225 integrations are completed, and a number of additional aircraft and SAAR and ARS wiring harness integrations are completed. The remaining SAAR center-of-gravity (SAARCG) subsystem 236 components are installed, and the remaining SAARCG-AFCS Interconnect (SAARCG-AFCS-I) subsystem 237 components are installed.

Following installation of the SAAR floor wall system 218, the next step is to install and integrate the SAAR ground refueling hose connection 271, which provides a ground refueling connection on the outside of the SAAR floor wall system 218, that may be connected with a SAAR ground refueling hose 272. Additional aircraft fuel manifold 125 and SAAR fuel manifold 225 integrations are completed, and a number of additional aircraft and SAAR wiring harness integrations are completed. Following installation of the SAAR floor wall system 218 and SAAR ground refueling hose connection 271, the next step is to complete installation and integration of the durable semi-permanent floor wall seals 215, SAAR pressure vessel 202 seals, fasteners and sensors in the SAAR fuselage subsystem 210 and SAAR floor wall system 218, that are required to maintain aircraft pressurization. Next, aircraft fuel manifold 125 and SAAR fuel manifold 225 integrations are completed, and a number of additional aircraft and SAAR wiring harness integrations are done.

The SAAR ground refueling subsystem 270 may include the SAAR fuselage subsystem 210, the SAAR fuel subsystem 220, the SAAR fuel management subsystem 221, the SAAR Refueling System 230, the SAAR Aerial Refueling Operator Station (AROS) 240, the SAAR lighting and safety subsystems 250, and the SAAR Built-In-Test (BIT) subsystem 260, as well as, the SAAR ground refueling hose connection 271, which may be located on the outside of the SAAR floor wall system 218, to which may be connected a SAAR ground refueling hose 272, which has on its other end a receiver aircraft refueling connection 273, and SAAR ground refueling aircrew control panel and alert subsystem 274 which may be located in the SAAR Aerial Refueling Operator Station (AROS) 240 which may be located in both the SAAR fuselage subsystem 210 or in the aircraft cockpit, with integrated displays and controls subsystem 181.

Following installation and integration of the SAAR pressure vessel 202, the next step is to complete installation and integration of the SAAR adjustable length, locking connecting rod trusses 212 that may be attached to (1) the carbon pads 311 hard points installed within the LCA aircraft fuselage 112 and (2) the multiple SAAR fuselage subsystem 210 attachment points 211, with lightweight, high tensile strength bolts. To reduce fatigue and the potential for hardware failure at and around aircraft fuselage airframe hard points 116, certain connecting rod trusses 212 may employ lightweight, adjustable shock absorbers 213.

Following installation and integration of the SAAR adjustable length, locking connecting rod trusses 212, the next step is to complete installation and integration of the lightweight, adjustable SAAR strain gauges 214 that may be integrated with certain connecting rod trusses 212. After installing the lightweight, adjustable SAAR strain gauges 214, they are then connected to the SAAR fuel wiring harness and reporting subsystem 223, in order to provide strain gage data and alerts to aircrew, via the SAAR Aerial Refueling Operator Station (AROS) 240 displays and alerts.

Following installation and integration of the SAAR strain gauges 214, the next step is to complete installation and integration of the SAAR Aerial Refueling Operator Station (AROS) 240, which may be made up of modular units, and the AROS modular units may be delivered to the LCA aircraft 101 in a customized set of AROS cases 299, that are similar to "Pelican" design of instrument cases. After SAAR Aerial Refueling Operator Station (AROS) 240 components are unloaded, and in-line and offline tests are completed per the hardware and software test plan, the next step is to complete installation, assembly and more tests. The SAAR Aerial Refueling Operator Station (AROS) 240 components are installed on top of the SAAR fuselage subsystem 210, near the aft of the LCA aircraft. Similar to the SAAR fuselage subsystem 210, the optional AROS 240 attachment points (not shown), may be attached to connecting rod trusses (not shown), which are attached to several of the carbon pad 311 hard points installed within the LCA aircraft fuselage 112. Connections are made with lightweight, high tensile strength bolts and locking nuts.

Also similar to the SAAR fuselage 210 connecting rod trusses 212, the AROS-specific connecting rod trusses 412 may employ adjustable shock absorbers 213 to reduce fatigue and potential for hardware failure at and around aircraft fuselage airframe hard points 116. SAAR Aerial Refueling Operator Station (AROS) 240 installation includes final integration with wiring harnesses that connect to high-level SAAR 201 subsystems, such as: the SAAR fuel subsystem 220, the SAAR refueling subsystem 230, the SAAR lighting and safety subsystems 250, the SAAR Built-In-Test (BIT) subsystem 260, the SAAR ground refueling subsystem 270, the SAAR computer processing subsystem 280, and the SAAR distributed AI/ML software and firmware subsystem 290, as well as lower-level SAAR 201 subsystems, such as the ARS 231, the refueling hose 234, the drogue and basket subsystem 235, the SAAR center-of-gravity (SAARCG) subsystem 236, the SAARCG-Aircraft Flight Control System Interconnect (SAARCG-AFCS-I) subsystem 237, the AROS console 241, the AROS aerial refueling displays 242, the AROS aerial refueling controls 243, the SAAR fuel management controls 244, the Selectively-Autonomous Aerial Refueling Automation (SAARA) subsystem 245, the AROS augmented-reality displays 248, and the AROS video displays 249, as well as, LCA aircraft 101 subsystems, such as: the aircraft fuel management subsystem 121, the aircraft flight control system 131, and the aircraft automated flight control system (AFCS) 132.

The optional AROS 240, integrated with the SAAR system 201, located in the aircraft fuselage 112, provides the Aerial Refueling Operator (ARO) with the AROS displays 242, AROS controls 243, ISR, Computer vision and Decision-Support AI/ML Software 529, SAAR fuel management controls 244, and SAAR Automation (SAARA) 245 controls—for management and control of the SAAR system 201. The optional AROS 240, integrated with the SAAR system 201, located in the aircraft fuselage, provides the Aerial Refueling Operator (ARO) with the AROS displays 242, AROS controls 243, ISR, Computer vision and Decision-Support AI/ML Software 529, SAAR fuel management controls 244, and SAAR Automation (SAARA) 245 controls—for management and control of the SAAR system 201. Following installation, integration and testing of the optional AROS 240 located in the aircraft fuselage 112, the next step is to complete installation, integration and testing of the SAAR Aerial Refueling Operator Station (AROS) 240 located in the aircraft cockpit 181.

A number of strategically selected optional AROS 240 modules may be installed in the aircraft cockpit 181, and networked to the optional AROS 240, located in the aircraft fuselage 112. The optional cockpit 181 AROS 240 and the optional fuselage 112 AROS 240 are functionally similar, wherein, the optional AROS 240 provides necessary SAAR monitors, controls and AR automation to safely and efficiently conduct manual or automatic control of aircraft and SAAR of the aerial refueling mission. However, the optional cockpit 181 AROS 240 components require significantly less room and may be adaptively positioned in the cockpit 181 where they may be best utilized.

For the optional cockpit 181 AROS 240 installation, the optional AROS 240 components are unloaded, and in-line and offline tests are completed per the hardware and software test plan, the next step is to complete installation, assembly and more tests. The next step is to complete networking of the optional cockpit 181 AROS 240 and the optional fuselage 112 AROS 240, utilizing both the SAAR fuel wiring harness and reporting subsystem 223 and the SAAR computer vision system wiring harness 228. The optional cockpit 181 AROS 240, located in the aircraft cockpit, 181 provide the captain and FO with the AROS displays 242, AROS controls 243, SAAR fuel management controls 244, SAAR Automation (SAARA) 245 displays and controls, the SAAR lighting and safety subsystems 250 displays and controls, the SAAR Built-In-Test (BIT) subsystem 260 displays and controls, and the SAAR ground refueling subsystem 270 displays and controls—for management and control of the SAAR system 201.

Procedure for Installing and Employing SAAR for LCA aircraft-Operation of the Completed AR System. From operation 906, routine 900 continues with operation 908, to complete safe and effective AR tanker missions utilizing the SAAR system 201 integrated with the LCA aircraft 101. Per the standard operating procedures (SOP) approved by the appropriate authorized commanding officer, and with resulting updates to the procedures detailed below, the SAAR system 201 and the LCA aircraft 101 may be used to provide military compliant AR tanking services.

Refueling the Aircraft and SAAR System. Operation 908 commences with appropriate fueling of the aircraft 101 and the SAAR system 201 fuel tanks, and continues with the take-off, enroute flight and rendezvous with receiver aircraft, at the briefed position, altitude, speed and AR tanking maneuvers. Management of the Aircraft CG and Flight control subsystem. Next, and at some time prior to the AR tanking evolution, operation 910 commences with the aircrew appropriately configuring the LCA aircraft 101 by selectively moving the fuel in the aircraft 101 and SAAR system 201 fuel tanks, to position the CG where it provides optimal AR tanking conditions. Activation and Operation of the SAAR ARS and Deployment of the Refueling Hose. Next, and at some time prior to the AR tanking evolution, operation 912 commences with the ARO, captain or FO selectively activating the SAAR Aerial Refueling System (ARS) 231, by actuating the optional AROS 240 controls, which also controls the ARS fuel control units 239. Deployment/Extension of the Aerial Refueling Hose. Next, and at some time prior to the AR tanking evolution, operation 914 commences with the ARO, captain or FO selectively extending the aerial refueling hose 234, by actuating the optional AROS 240 controls, which initiates the SAAR Aerial Refueling System (ARS) 231 to extend the aerial refueling hose 234 out of the Buddy Store 231 so that the attached drogue and basket subsystem 235 is extended for engagement by receiver aircraft. Engagement of the Drogue. Next, the AR tanking evolution, operation 916, commences with the pilot of the receiver aircraft flying to a stabilized position aft and below the LCA aircraft 101, correctly positioned in relationship to the drogue and basket subsystem 235.

When the pilot of the receiver aircraft has been provided clearance, they may fly their refueling probe forward and into the drogue and basket subsystem 235. Upon refueling probe contact with the drogue and basket subsystem 235, the pilot of the receiver aircraft continues to keep the receiver aircraft properly aligned and flying formation on the LCA aircraft 101, while gradually pushing the drogue and basket subsystem 235 forward a number of feet to the correct aerial refueling position. Lines on the aerial refueling hose 234 assist the receiver aircraft pilot in properly positioning the aerial refueling hose 234. Refueling continues until the appropriate fuel offload has been achieved.

Disengagement from the Drogue. Upon completion of AR fuel transfer, operation 918 commences with the pilot of the receiver aircraft gradually backing the receiver aircraft away while maintaining proper position on the LCA aircraft 101 to disengage from the drogue and basket subsystem 235, and finally move aft, and laterally away and separated from, the LCA aircraft 101, at which time, the AR tanking evolution is completed. Retraction of the Aerial Refueling Hose. Next, operation 920 commences with the ARO, captain or FO selectively retracting the aerial refueling hose 234, by actuating the optional AROS 240 controls, which initiates the SAAR Aerial Refueling System (ARS) 231 to retract the aerial refueling hose 234 from outside the LCA aircraft 101 back into the Buddy Store 231 until the attached drogue and basket subsystem 235 is safely stowed in the aft of the SAAR Aerial Refueling System (ARS) 231. Deactivation of the SAAR Aerial Refueling System (ARS). Next, operation 922 commences with the ARO, captain or FO selectively completing refueling operations and deactivating the SAAR Aerial Refueling System (ARS) 231, by actuating the optional AROS 240 controls. Management of the Aircraft CG and Flight control subsystem. Next, operation 924 commences with the aircrew appropriately configuring the LCA aircraft 201 by selectively moving the fuel in the aircraft 101 and SAAR system 201 fuel tanks, to position the CG where it contributes to the optimal angle of attack and least drag for the most efficient distance, endurance or maximum airspeed.

Procedure for Uninstalling SAAR for LCA aircraft—Removal of Semi-Permanents SAAR Components. From operation 924, routine 900 continues with operation 926, to disassemble and uninstall the SAAR system 201 from the LCA aircraft 101, in order to return it to its original (or better) configuration, so that it may continue to fly missions that are not in support of aerial refueling. In reverse order or in approximate reverse order, each of the semi-permanent SAAR system 201 components is removed, and then stored in the customized set of AROS cases 299. When all semi-permanent SAAR system 201 components have been removed, the LCA aircraft 101 is fitted with the temporary fuselage floor wall 342 and the optional temporary fuselage aft wall 346. Next, the floor wall kit 344 and the floor wall wiring harness and installation kit 345, and the aft wall kit 348 and aft wall wiring harness and installation kit 349, are configured appropriately to return the LCA aircraft 101 to non-AR service. Next, all LCA aircraft 101 wiring harnesses are reconnected to their original configurations, and all LCA aircraft 101 fuel manifolds 125 are reconnected to their original configurations. When all SAAR system 201 operations and all LCA aircraft 101 restoration operations are completed, the routine 900 is completed.

Figure 24:
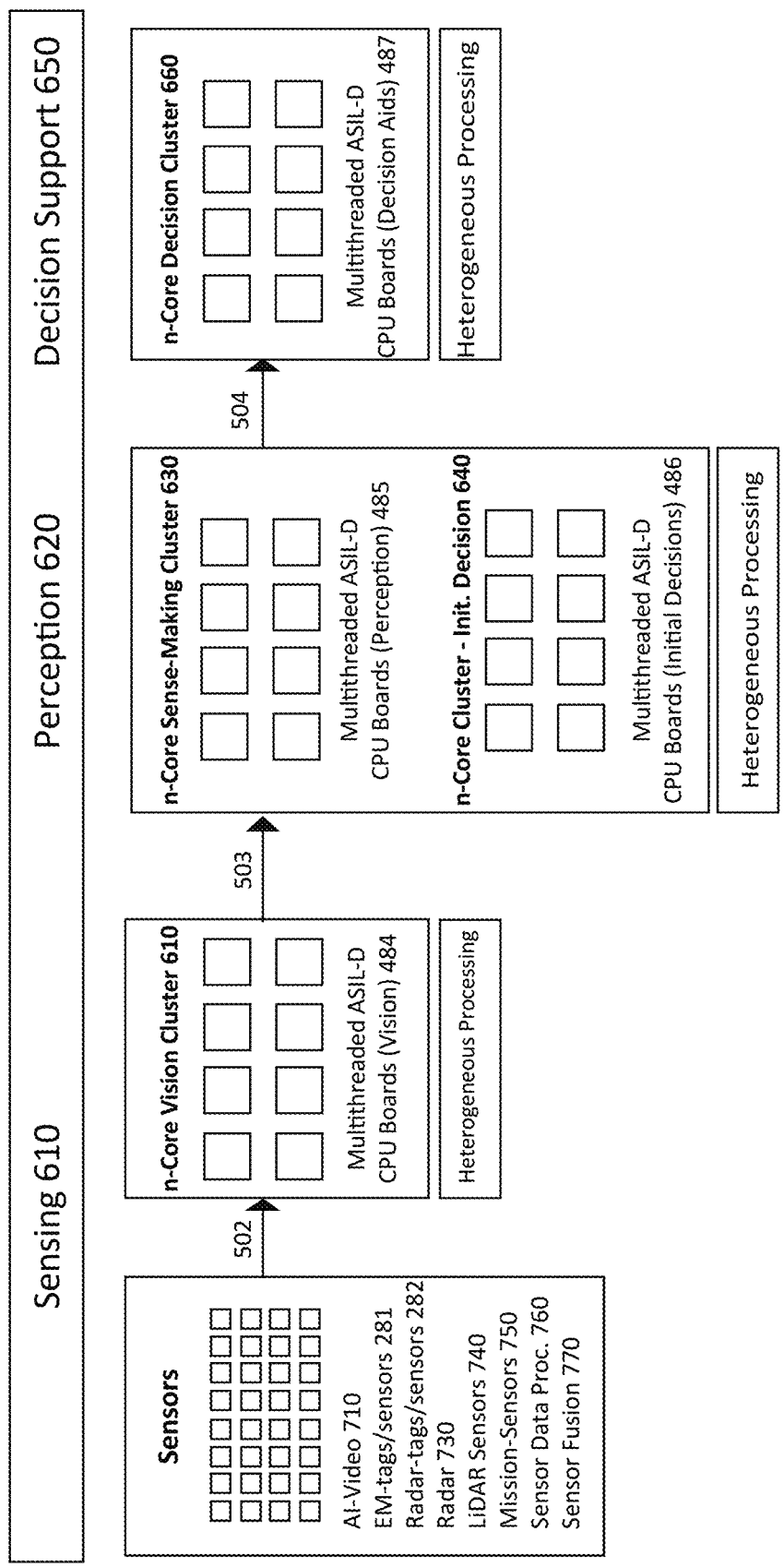
FIG. 24 provides a representative block diagram of optional SAAR end-to-end heterogeneous processing from sensors to perception to decision, according to various embodiments presented herein.

FIG. 24 provides a representative block diagram of SAAR end-to-end heterogeneous processing—from sensors to perception to decision. Three sets of clusters 600 are represented, including the sensor data and computer vision cluster 610—with sensor data that may include AI-video 710, EM-reflective tag sensors 281, RADAR-reflective tag sensors 282, RADAR 730, LiDAR 740, mission-specific sensors 750, sensor data processing and storage 760, SAAR sensor fusion 770, and an n-core 500 heterogeneous vision cluster 610 of multithreaded ASIL-D CPU boards (Vision) 484, as well as the perception clusters 620—that may include an n-core 500 heterogeneous sense-making cluster 640 of multithreaded ASIL-D CPU boards (Perception) 485, working in parallel with an n-core 500 heterogeneous initial decision-support "sense-making" cluster 640 of multithreaded ASIL-D CPU boards (Initial Decisions) 486, as well as the decision support and alerts cluster 630—that may include an n-core 500 heterogeneous decision-support and alerts cluster 650 of multithreaded ASIL-D CPU boards (Decision Aids and Alerts) 487.

Figure 25:
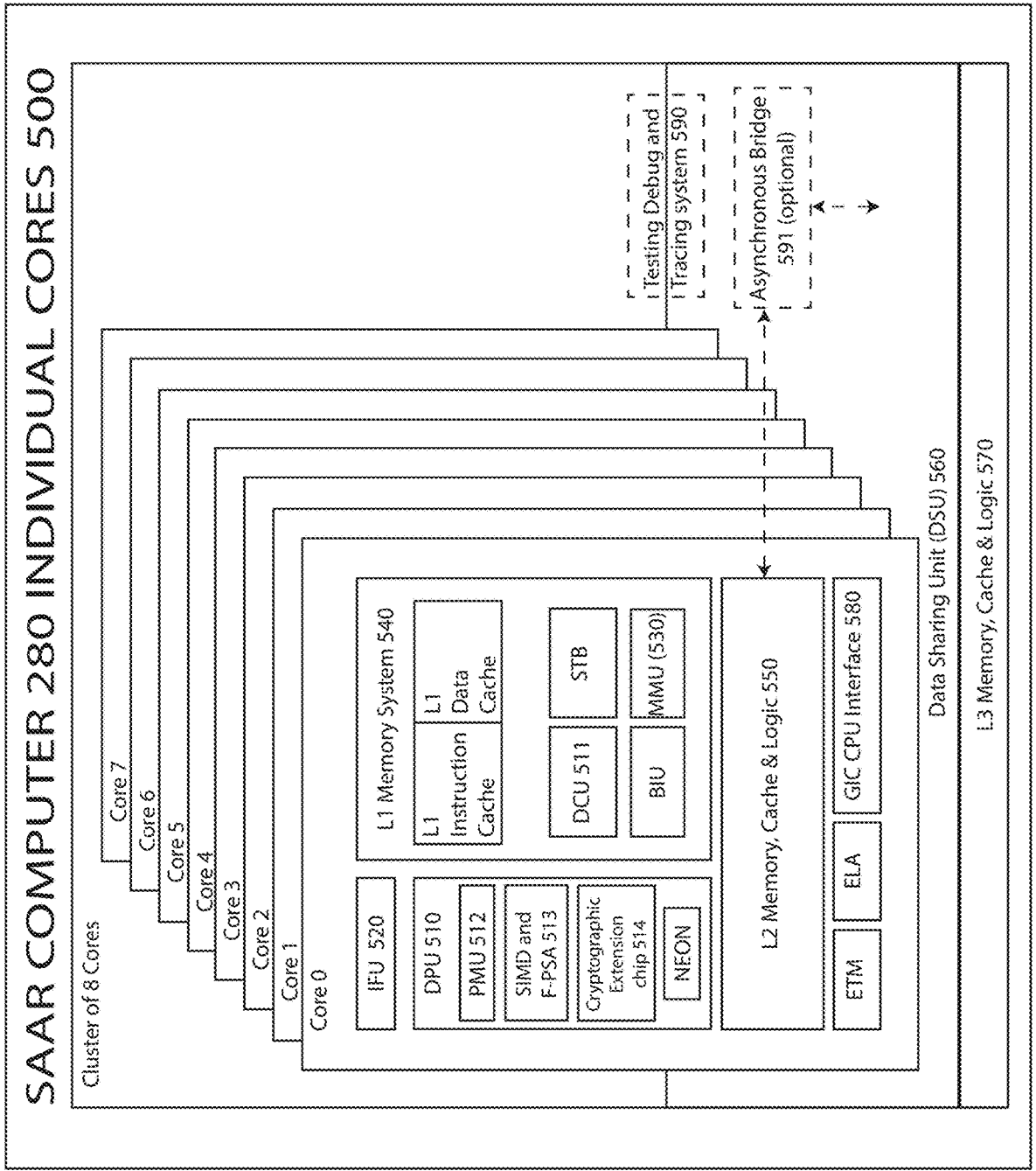
FIG. 25 provides a block diagram of the optional SAAR computer 280 Individual Computer Cores 500, according to various embodiments presented herein.
Figure 26:
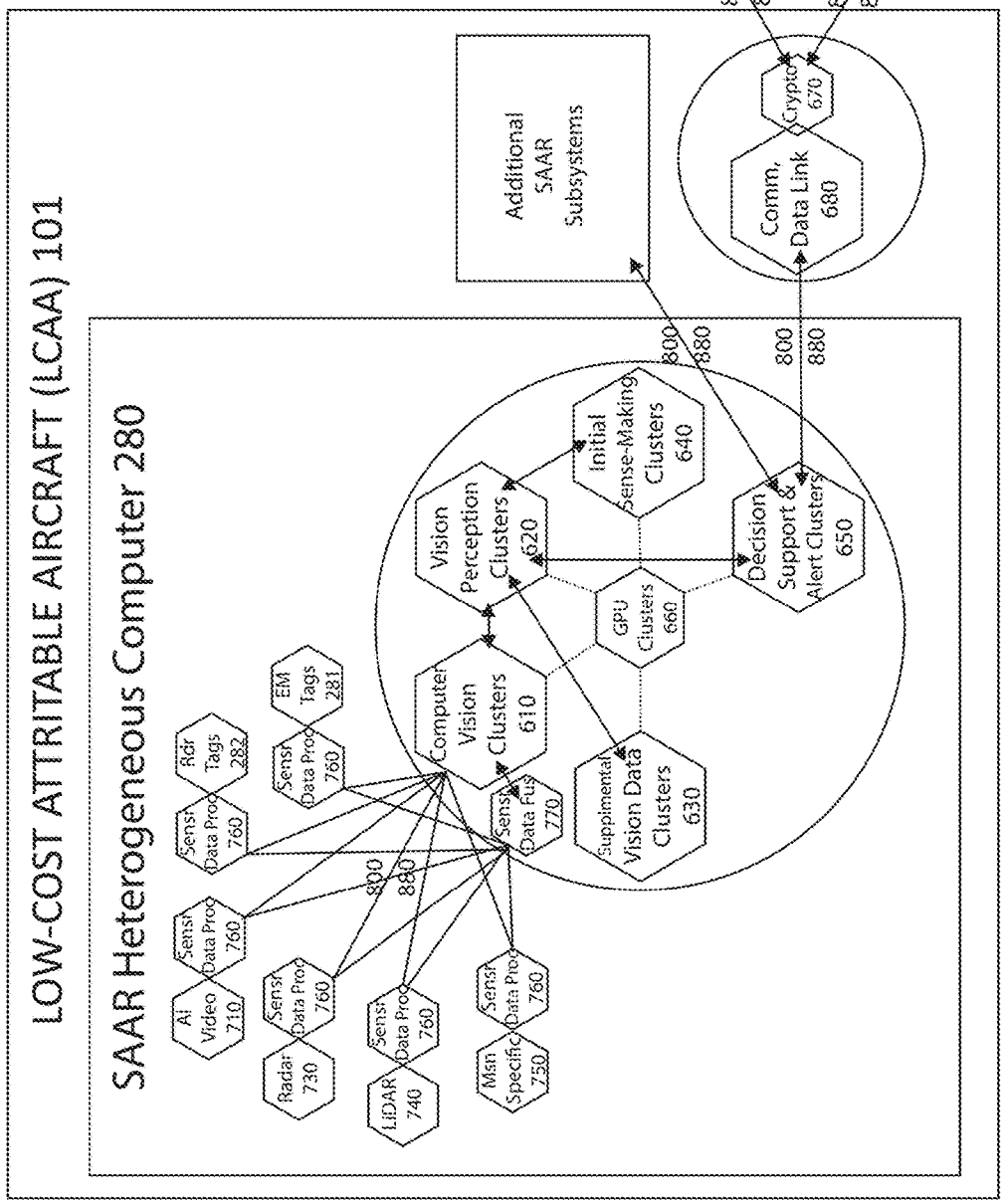
FIG. 26 provides a block diagram of the optional SAAR Multiple Computer Board Clusters 600, according to various embodiments presented herein.
Figure 27:
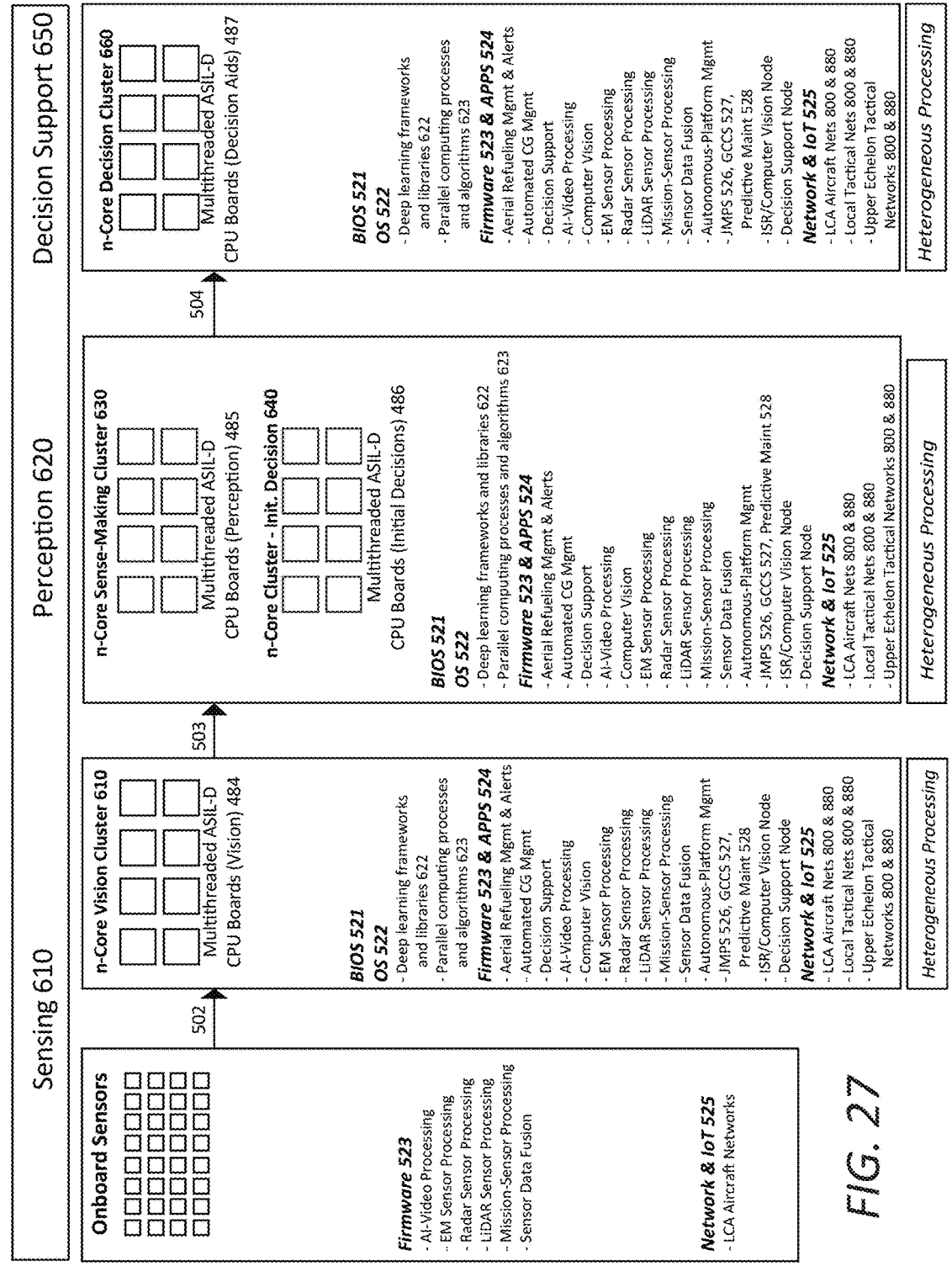
FIG. 27 provides a block diagram of the optional SAAR distributed software and firmware 290 that may include support for Aerial Refueling, optional Computer vision, optional Decision-Support and optional Autonomous-Platform applications, according to various embodiments presented herein.
Figure 28:
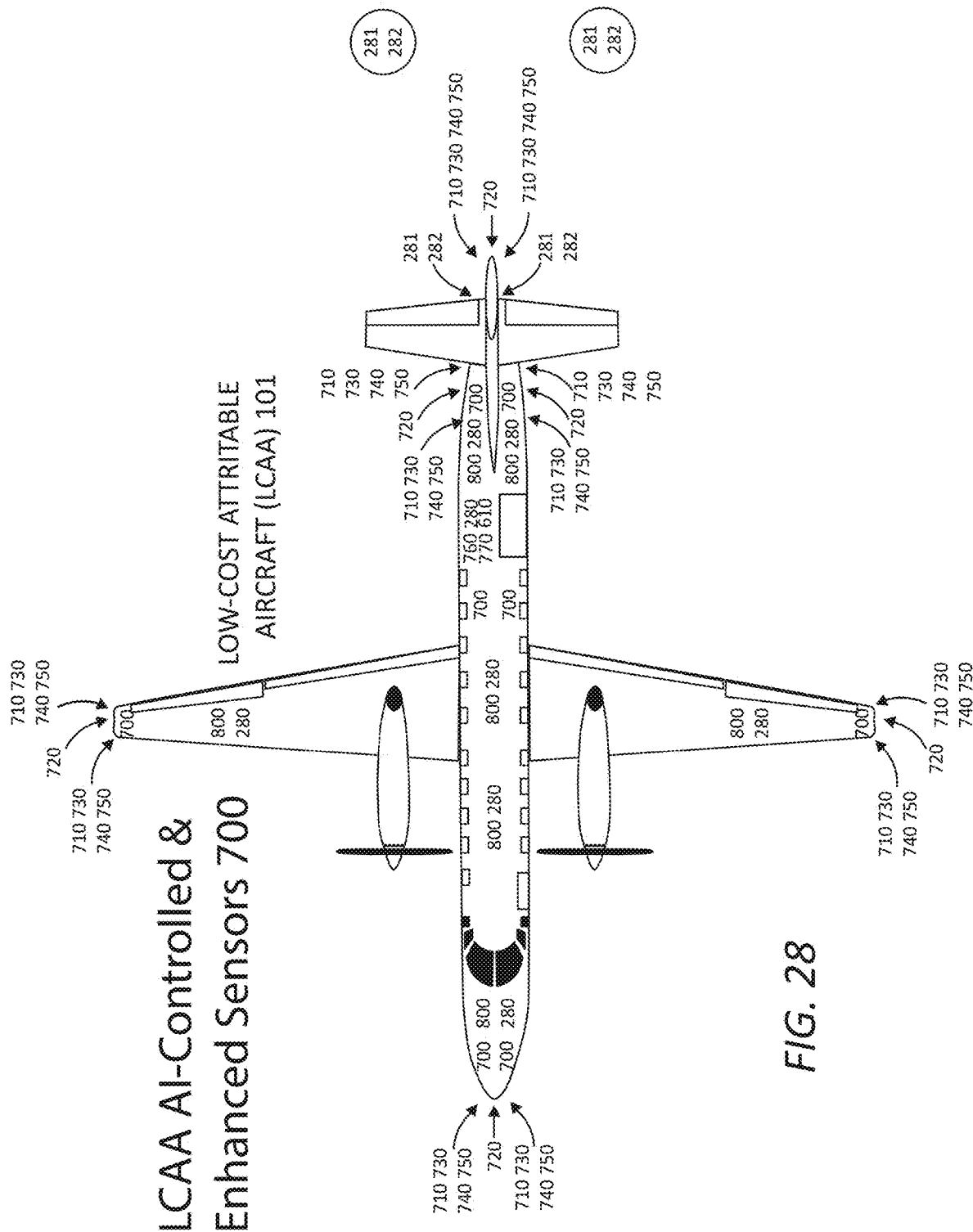
FIG. 28 provides a cutaway top view of the LCA aircraft 101 with optional SAAR sensors 700 and computers integrated, according to various embodiments presented herein.

SAAR Distributed Computer and Software Architecture—Overview. Respectively, FIG. 25, FIG. 26 and FIG. 27 provide block diagrams of the SAAR Individual Computer Cores 500, Multiple Computer Board Clusters 600, and SAAR distributed software and firmware 290. FIG. 28 provides a cutaway top view of the LCA aircraft 101 with SAAR sensors 700 and computers integrated. The computer cores 500 may be grouped in heterogeneous computer clusters 600. A subset of the cores 500 may perform initial processing, computer vision optimizations, and sensor fusion computations from the data inputs—while another subset of computer cores 500 may provide decision support computations. Graphic processing units (GPUs) 660 may work with cores 500 and/or clusters 600 to boost data throughput and increase the number of simultaneous calculations in software applications.

A reduced instruction set computer (RISC) architecture and/or a system on chip (SOC) architecture may be utilized for the SAAR computer. Parallel processing of video and telemetry may be utilized to create situational awareness displays and alerts. Several angles of video and sensor data may be processed simultaneously. Architectures of the computer 280 and software 290 may employ inexpensive COTS hardware components, as well as, firmware and software applications, that provide the best mix of computer vision and decision-support performance versus total system cost. The goal of the assembled SAAR computer 280 and software 290 is to "make sense of the situation" and provide decision-support data and alerts to aircrew, who may be fatigued or distracted. Together, the assembled computer hardware, network, firmware and software create a selectively-autonomous aerial refueling (SAAR) computer system that provides computer vision, safety alerts, decision aids, and the option of semi-autonomous and autonomous aerial refueling.

When aircrew are using the optional AROS 240, they are provided with SAAR actionable data and alerts that may be based on sensor data from: EM-reflective tag sensors 281, RADAR-reflective tag sensors 282, AI-video 710, RADAR 730, LiDAR 740, mission-specific sensors 750, sensor data processing and storage 760, and SAAR sensor fusion 770. This same AI computer vision and decision-support architecture may enable selectively-autonomous aerial refueling (SAAR). It is important to note there are multiple operating system, firmware and software application interdependencies that require detailed requirements analysis, design, implementation and test—in order to ensure safe and effective aerial refueling operations for a LCA aircraft 101.

SAAR Computer 280 Architecture—Components of Individual Computer Cores 500. For each individual computer core 500 which may be operating heterogeneously with several other computer cores 500, the block diagram shown in FIG. 25 illustrates that each core 500 may include a Data Processing Unit (DPU) 510, an Instruction Fetch Unit (IFU) 520, L1 Memory Management Unit (MMU) 530, an Onboard L1 Memory and Logic system 540, an L2 Memory and Logic system 550, a Data Sharing Unit (DSU) 560, an L3 Memory and Logic system 570, a Generic Interrupt Controller (GIC) Central Processing Unit (CPU) interface 580, and Testing Debug and Tracing system 590.

SAAR Computer 280, Individual Computer Core 500—Data Processing Unit (DPU) 510. The block diagram shown in FIG. 25 provides additional details on the Data Processing Unit (DPU) 510. The DPU 510 may decode and execute a variety of program instructions. Additionally, the DPU 510 may execute instructions that require data transfer to/from an L1 Memory system 530, and it may do this by interfacing with a Data Cache Unit (DCU) 511. The DPU 510 may also include a Performance Monitoring Unit (PMU) 512, Advanced Single Instruction Multiple Data (SIMD) and floating-point support architecture 513, and a Cryptographic Extension chip 514. The PMU 512 may provide performance monitors that may be configured to gather statistics on the operations of each core, as well as, the memory system 530. This statistical information may be used for debug and code profiling, to update the code and improve performance. The PMU 512 may provide six counters. Each counter may count any of the events available within the cluster 600.

The Advanced Single Instruction Multiple Data (SIMD) and floating-point support architecture 513 that may be used as a media and signal processing design may create instructions for audio, video, three-dimensional graphics, image processing, and speech processing. Additionally, the floating-point support architecture 513 may provide support for floating-point operations in half-, single-, and double-precision arithmetic. The Cryptographic Extension chip 514 may provide instructions to the Advanced SIMD 513 that may accelerate Advanced Encryption Standard (AES) encryption and decryption; Secure Hash Algorithm (SHA) functions SHA-1, SHA-224, and SHA-256; and finite field arithmetic.

SAAR Computer 280, Individual Computer Core 500—Instruction Fetch Unit (IFU) 520. The block diagram shown in FIG. 25 provides additional details on the Instruction Fetch Unit (IFU) 520. The IFU 520 may fetch instructions from an instruction cache or from an external memory source. Additionally, the IFU 520 may predict the outcome of branches in the instruction stream. The IFU 520 may pass instructions to the DPU 510 for processing. SAAR Computer 280, Individual Computer Core 500—Memory Management Unit (MMU) 530. The MMU 530 may provide fine-grained control of memory 531, by utilizing a set of virtual-to-physical address mappings and memory attributes 532, that may be held in translation tables 533. These mappings and memory attributes 532 may be saved into Translation Lookaside Buffer (TLB) 534 tables, when an address is translated. These TLB 534 tables may be instruction side TLB 535 or data side TLB 536. Translation Lookaside Buffer (TLB) 534 entries may include global and Address Space Identifiers (ASIDs) 537, which may prevent context switch TLB 534 flushes. These mappings and memory attributes 532 may also include Virtual Machine Identifiers (VMIDs) 538 to preclude TLB 534 flushes on Virtual Machine (VM) 539 switches by a hypervisor. A first level of caching for the translation table may be an L1 TLB 534 caching. This may be implemented on both of the instruction 535 and the data sides 536. TLB 534 related maintenance operations may result in flushing both the instruction 535 and the data sides 536.

SAAR Computer 280, Individual Computer Core 500— Onboard L1 Memory and Logic System 540 The Onboard L1 Memory and Logic System 540 may include a Data Cache Unit (DCU) 511. The Data Cache Unit (DCU) 511 may manage all loading and storing functions. The Data Cache Unit (DCU) 511 RAM may be protected using Error Correction Codes (ECC) 541. The ECC 541 may use a Single Error Correct Double Error Detect (SECDED) 542 program. Also, the Data Cache Unit (DCU) 511 may include a Combined Local And Global Exclusive Monitor 543. The Combined Local And Global Exclusive Monitor 543 may be used by Load-Exclusive and Store-Exclusive instructions 544. Additionally, the Onboard L1 Memory and Logic System 540 may include a Bus Interface Unit (BIU) 545, and a Store Buffer (STB) 546. The Bus Interface Unit (BIU) 545 may include an interface 547 with the L2 Memory and Logic System 550. Also, the BIU 545 may include buffers 548 to decouple the interface from the L1 data cache 549 and the Store Buffer (STB) 546. The Store Buffer (STB) 546 may cache store functions after they've left a load/store pipeline in the Data Cache Unit (DCU) 511 and have been committed by the Data Processing Unit (DPU) 510. If necessary, the Store Buffer (STB) 546 may request access to L1 data cache 549 data, and use that data to initiate line fills, or write to the L2 Memory and Logic system 550 and L3 Memory and Logic system 570. Also, the Store Buffer (STB) 546 may be utilized to queue up maintenance processes prior to their being broadcast to other cores 500 within the cluster 600.

SAAR Computer 280, Individual Computer Core 500— L2 Memory and Logic System 550 The L2 Memory and Logic System 550 may contain a L2 cache 551. The L2 cache 551 is optional and remains private to each core. The L2 cache 551 is four-way set associative. The L2 cache 551 provides 64-byte cache lines. Also, the L2 cache 551 may provide a configurable cache RAM size of between 64 KB and 256 KB. A L2 Memory Translation Lookaside Buffer (TLB) 552 may manage any misses from the L1 TLBs 534. The L2 Memory TLB 552 may be configured with Core Cache Protection 553. When the L2 Memory TLB 552 implementation includes Core Cache Protection 553, parity bits may guard the TLB 552 RAM memory by facilitating detection of single-bit errors. If a single-bit error is detected, the TLB 552 RAM memory entry may be nullified and retrieved again. The L2 Memory and Logic System 550 may be connected to the Data Sharing Unit (DSU) 560 via an optional asynchronous bridge 591.

SAAR Computer 280, Individual Computer Core 500— Data Sharing Unit (DSU) 560. A Data Sharing Unit (DSU) 560 microarchitecture may integrate one or more individual computer cores 500 (FIG. 24) to form a computer cluster 600, that may be an application-specific configuration. Up to eight individual computer cores 500 may be selected and configured during implementation, and may be integrated with the DSU 560. Also, during implementation, a mix of low power and high performance computer cores 500 may be combined in a computer cluster 600. After DSU 560 integration of multiple computer cores 500, the resulting group may be referred to as a heterogeneous computer cluster 600. The DSU 560 may connect the computer cores 500 to an external memory system. Additionally, the DSU 560 may include debug components, that may be separated from the computer cluster 600.

SAAR Computer 280, Individual Computer Core 500— L3 Memory and Logic system 570. The Data Sharing Unit (DSU) 560 may also contain a cache and logic required for the L3 Memory and Logic system 570 to maintain coherence between multiple computer cores 500 in the computer cluster 600. A group of appropriately configured computer cores 500, connected together via a DSU 560, may form a computer cluster 600. The L3 Memory cache 570 may be shared by all the cores 500 in the cluster 600. The L3 Memory 570 may support storing requests from the Accelerator Coherency Port (ACP) 571 and the Coherent Hub Interface (CHI) 572 architecture interfaces. The Accelerator Coherency Port (ACP) 571 may be employed as a possible slave interface. The ACP 571 may provide direct access to cacheable memory 573. The Coherent Hub Interface (CHI) 572 architecture, which may be defined by the Advanced Microcontroller Bus Architecture (AMBA), may define the additional L3 memory interfaces 574 for the connection of fully coherent processors and high-performance interconnects.

SAAR Computer 280, Individual Computer Core 500— Generic Interrupt Controller (GIC) 580 CPU Interface. A Generic Interrupt Controller (GIC) 580 CPU interface may be a resource for handling interrupts in a computer cluster 600. A Generic Interrupt Controller (GIC) 580 architecture may have two or more methods of operation, and may be integrated to manage four or more different types of interrupt sources. SAAR Computer 280, Individual Computer Core 500—Testing Debug and Tracing System 590. The Data Sharing Unit (DSU) 560 and its associated computer cores 500, may be integrated with a Testing Debug and Tracing System 590. The Testing Debug and Tracing System 590 may be configured to debug, test, and trace individual computer cores 500. The Testing Debug and Tracing System 590 may facilitate both self-hosted and external debug. Also, the Testing Debug and Tracing System 590 may support both single and multi-threaded core debug and tracing. The Testing Debug and Tracing System 590 may use a discrete debug power domain, which may enable it to continue to operate with a debugger while the computer cores 500 and computer cluster(s) 600 are powered down.

SAAR Computer 280 Architecture—Multiple Computer Board Clusters 600. For the individual computer cores 500 operating heterogeneously, the block diagram shown in FIG. 26 illustrates that individual computer cores 500 may be grouped into logical clusters 600—such as computer vision sensor data clusters 610, perception clusters 620, and a supplemental type of computer vision 630 cluster. Sensors that may provide data to the computer vision 610 cluster may include EM-reflective tag sensors 281, RADAR-reflective tag sensors 282, AI-video 710, RADAR 730, LiDAR 740, mission-specific sensors 750, sensor data processing and storage 760, and SAAR sensor fusion 770. The computer vision 610 cluster(s) may provide data to the perception 620 clusters, which may include both a supplemental type of computer vision 630 cluster, as well as, an initial decision-support "sense-making" 640 cluster. The perception clusters 620 may provide data to the decision-support and alerts 650 cluster, which may include a final decision-support and alerts 650 cluster.

SAAR Computer Hardware 280 Architecture—AI-Controlled and Enhanced Sensors 700. SAAR AI-Controlled and Enhanced Sensors 700 are shown in FIG. 28, a cutaway top view of the LCA aircraft 101 with SAAR computers 280, networks 800, and sensors 700. SAAR computer hardware 280 has been previously detailed above. SAAR network 800 will be covered below. SAAR Sensors 700 are divided into seven categories: AI-video 710, sensor-lighting 720, RADAR 730, LiDAR 740, mission-specific sensors 750, sensor data processing and storage 760, and SAAR sensor fusion 770. SAAR AI-video 710 may utilize video captured by two or more "AI-video" cameras in the drogue and basket subsystem 235 engagement area, as well as, video from AI-video cameras in other areas outside or inside the LCA aircraft fuselage 112. There are many inexpensive COTS AI-video cameras available. SAAR AI-video 710 camera systems may employ stereo (dual) cameras, using AI data fusion techniques to measure and balance depth. The SAAR AI-video 710 cameras may be integrated with small internal computers 711 and AI software programs 712 that intelligently enhance, analyze and react to the images and videos the camera captures. For example, an AI-video camera 710 may scan captured image frames constantly, in order to detect any number of specific shapes, outlines, colors, text, faces, rates of object movements, types of movements, and other graphical artifacts. Small AI-video cameras 710 may be mounted on dual-gimbal camera control mounts 713, that may be controlled by human-in-the-loop, AI-software programs in the camera, another computer and software program, or combination of these. AI-video cameras 710 may be programmed to complete a back-and-forth raster or other types of optimized scans, to search for specific objects or for a specific graphic sign, signal, prompt or cue—including detecting specific types of activities and movements. AI-video cameras 710 may zoom in or out, change their focal length, change their effective aperture for current lighting conditions, and may automatically begin tracking objects. Finally, AI-video cameras 710 may perform requisite image processing and enhancement in real time. AI processing advanced cameras help to save time by smartly finding, capturing and optimizing video and still images. SAAR sensor-lighting 720 may provide specific-wavelength illumination of lightweight, pliable electromagnetic (EM)-reflective tags or fibers 721, affixed to specific objects of interest, that SAAR AI-video 710 cameras may capture and process wavelength-specific video of. By way of example, the aerial refueling hose 234 may be integrated with pliable EM-reflective tags or fibers 721, that resonate with the specific wavelength of EM energy being radiated by SAAR sensor-lighting 720. In doing so, the aerial refueling hose 234 (FIG. 4) may be monitored and tracked in unfavorable ambient light and/or IR conditions. Additionally, receiver aircraft may have EM-reflective tags or fibers 721 affixed to key points on their fuselage (not shown) for the same purpose. Using EM-reflective tags enhances the accuracy and reliability of processed video.

SAAR RADAR 730 subsystems may provide methods for measuring distances (ranging) by illuminating targets with transmitted radar energy and measuring and timing the reflection with a receiver sensor. Reflected from an object, the radar energy may be sensed by appropriate detectors in the same device. Computation of distance, velocity and acceleration from the target may be made. SAAR RADAR systems may measure relative velocities directly. The SAAR RADAR 730 may utilize 77 GHz millimeter wave transmitters and receivers. SAAR RADAR 730 performance is not adversely affected by heavy precipitation or water vapor. However, while radar energy is not as adversely affected by water as LiDAR is, only a small percentage of emitted radar signals are reflected back. This problem may be addressed by installing two radar units at each desired location, and the two radars may be 1 to 3 meters apart from each other. Algorithms may be used to combine the reflected radar received to produce a resolved composite view. This stereoscopic technique may also be used to filter out extraneous noise. Additionally, millimeter wave radar may be employed, which may also improve the fidelity of the return radar signals. SAAR EM-reflective tag sensors 281, RADAR-reflective tag sensors 282 and RADAR 730 data may be fused 770 with AI-video 710 data, SAAR LiDAR 740 data, and/or mission-specific sensors 750 data. SAAR Light Detection and Ranging (LiDAR) 740 subsystems may provide yet another set of methods for measuring distances (ranging) by illuminating targets with specific wavelengths of transmitted laser light and measuring and timing the reflection with a receiver sensor. Reflected from an object, the laser energy may be sensed by appropriate detectors in the same device. Computation of distance, velocity and acceleration from the target may be made. SAAR LiDAR systems may measure relative velocities directly. The SAAR LiDAR 740 may utilize Frequency-Modulated Continuous Wave (FMCW) techniques to overcome interference from rain or water vapor, to accurately measure light Time-of-flight (ToF). SAAR LiDAR 740 data may be fused 770 with AI-video 710 data, SAAR EM-reflective tag sensors 281, RADAR-reflective tag sensors 282, RADAR 730 data, and/or mission-specific sensors 750 data. SAAR mission-specific sensors 750 that may provide data to the computer vision 610 cluster may include medium to long range radars 751, forward looking infrared (FLIR) sensors 752, infrared search and track (IRST) sensors 753, and other TBD mission-specific sensors 754.

These mission-specific sensors 750 may be connected with the computer vision 610 cluster, and their data may be integrated with SAAR AI-Controlled and Enhanced Sensors 700. SAAR sensor data processing and storage 760 may manage, process, and store Sensor 700 data, before further distributing Sensor 700 data to other memory and/or processors on the LCAA, and/or distributing data outside the LCAA to the tactical edge C3 network. The tactical edge C3 network may enable interactions between people located around the globe with the SAAR and other onboard LCAA systems, in near real-time. Sensor data processing and storage 760 devices may be located internal to or adjacent to Sensors 700, or they may be integrated with the SAAR computer vision system wiring harness 228. A negative result of multiple SAAR Sensors 700 and sensor data storage and processing 760 may be the proliferation of a large amount of data that will require efficient management, processing and storage. The SAAR sensor data processing and storage 760 system may provide sensor data processing 762 and/or sensor data storage 763. Sensor data processing 762 may be completed by SAAR GPU, DSP, ASIC or FPGA chips or chipsets 284 or other processors or systems on chips (SoC). Sensor data storage 763 systems may include memory types that are Static RAM (SRAM), Dynamic RAM (DRAM), Flash memory, Cache memory, Virtual memory, solid state drives (SSDs), hard drives, optical drives and others. Storing, querying and processing large amounts of data may require the sensor data storage 763 to include database clusters 764, that are installed with the SAAR computer vision system wiring harness 228. SAAR sensor fusion 770 may, in near real-time, resolve and integrate data from multiple SAAR AI-Controlled and Enhanced Sensors 700, SAAR mission-specific sensors 750 and aircrew optional AROS 240 inputs, to complete processing to provide aircrew with user-definable pictures of current aerial refueling systems and safety status, as well as, decision-support alerts. Decision support alerts or automated actions may flow from fused sensor information combined with aircrew SAAR control inputs and settings.

SAAR Computer Hardware Architecture—SAAR Computer Configuration Interface.

The SAAR computer input and output systems 489 may include appropriate connectivity with a portable SAAR computer configuration interface 780 with standard user input/output devices such as a keyboard, mouse/trackpad, and display. The SAAR computer configuration interface 780 may also include a multi-bank of SAAR computer configuration SSDs 781, that include drive ghosting provisions 782 and a virtual private network (VPN) system 783 for downloading SAAR software updates 784, or uploading sensor and other data to a SAAR server 785. The SAAR computer configuration interface 780 computer configuration SSDs 781 may be used to configure the SAAR computer processing subsystem 280 and the SAAR computer vision and decision-support software 290.

SAAR AI/ML Software Architecture—AR, Computer vision, Decision-Support and Autonomous-Platform. Pertaining to the software 290 installed on each of the computers 280, the block diagram shown in FIG. 27 illustrates the assembled suite of COTS computer software may include a basic input/output system (BIOS) system 521, operating system 522, firmware 523, application software 524, and support for military C2/C4ISR and/or IoT networks 525—such as the Joint All Domain Command and Control (JADC2) Advanced Battle Management System (ABMS) network. The software components depicted in this drawing support crewed, semi-autonomous and autonomous aerial refueling (AR) operations. Together, the SAAR computer hardware 280 and software/firmware 290 enable the capture, storage, processing and display of critical AR information and decision-aids.

SAAR AI/ML Software Architecture—Basic Input/Output System (BIOS) System 521 System. A basic input/output system (BIOS) system 521 may provide a set of essential software routines which may enable the SAAR computer hardware 280 and software 290 to perform essential functions such as boot up from software stored on the read-only memory (ROM) 484, additional loading of software and data from ROM 484, systems management, and updates to system settings. In addition to system boot up and systems management, the BIOS 521 may provide the ability to update essential software and settings for the chipset-based motherboard, to support future software upgrades, as well as, support the management of hardware settings—such as management of overclocking. During peacetime training, it may not be prudent to overclock any chipset components. However, during wartime it may make sense to update BIOS 521 settings to overclock specific chipset components.

SAAR AI/ML Software Architecture—Operating System. Specific to the computer operating system 522, it may be a collection of current AI, deep learning, computer vision and decision support specific software components, APIs and libraries, that may or may not include Windows or Linux. The computer operating system 522 may or may not include support for higher-level languages such as Python, R, C, C++, or Ada. Additionally, the computer operating system 522 may or may not include support for deep learning frameworks and libraries 622, customized for specific higher level languages, in order to train and deploy algorithms that are based on neural networks. Complex AI use cases for the SAAR 201 system, such as computer vision and decision support, require deep learning algorithms. Deep learning frameworks and libraries 622, that may be integrated with the collection of software components, APIs and libraries that make up the computer operating system 522, may or may not include support for TensorFlow, PyTorch, MXNet, Caffe, and others. Parallel computing processes and algorithms 623, that may be integrated with the collection of software components, APIs and libraries that make up the computer operating system 522, may or may not include support for task parallelism and/or parallel computing. The resulting operating system 522 enables real-time computer vision and decision-support from the edge to JADC2 IoT network cloud.

SAAR AI/ML Software Architecture—Firmware. SAAR function-specific firmware programs 523 may be loaded onto SAAR computer chips or chipsets, which may be appropriately integrated with SAAR sensors 700, the sensor data processing and storage 760 systems, the SAAR sensor fusion 770 systems, the SAAR computers 280, and/or the SAAR network 800 nodes. SAAR AI-Controlled and Enhanced Sensors 700 are shown in FIG. 28, a cutaway top view of the LCA aircraft 101 with SAAR computers 280, networks 800, and sensors 700. SAAR computer hardware 280 has been previously detailed above. SAAR network 800 will be covered below. SAAR function-specific firmware programs 523 may be utilized with a number of strategically placed SAAR GPU, DSP, ASIC or FPGA chips 284, and/or the SAAR computer vision system wiring harness 228—with the goal these SAAR Sensors 700 may be used to process telemetry and image data before routing it to the SAAR computer processing subsystem 280. SAAR function-specific firmware programs 523 may provide low-level control for each SAAR chip or chipset device's hardware. SAAR function-specific firmware programs 523 is stored in non-volatile memory that may be Flash memory, ROM, EPROM, and/or EEPROM. SAAR function-specific firmware programs 523 may provide a simple operating environment for other, more complex, chip or chipset device firmware or software. This type of firmware may provide more complex chips or chipsets with greater hardware-independence. Alternatively, SAAR function-specific firmware programs 523 may be programmed to act as a hardware device operating system, performing control, monitoring and data manipulation functions for less complex chips or chipsets. SAAR function-specific firmware programs 523 may be upgradeable or may be permanently programmed. When it may become necessary to update firmware, SAAR ROM circuits may be physically replaced—or SAAR function-specific firmware programs 523 Flash memory, EPROM or EEPROM chips or chipsets may be flashed. SAAR function-specific firmware programs 523 installed on SAAR Flash memory, EPROM or EEPROM chips or chipsets may be programmed to provide for the previous installed firmware to be saved before the flash upgrade, so it may be reverted—if the flash procedure fails, or if the updated firmware fails to operate correctly.

SAAR function-specific firmware programs 523 may utilize current "open source" substitutes for expensive proprietary programs. SAAR function-specific firmware programs 523 may utilize current "microelectronics protections," that may provide component protection against reverse engineering and other forms of compromise. SAAR function-specific firmware programs 523 may meet US military requirements for accreditation as both a "trusted supplier" and as a System Security Integration Through Hardware and Firmware (SSITH) program supplier. Finally, AI and/or machine learning support for automated aerial refueling, computer vision, decision support, predictive maintenance, semi-autonomous or autonomous flight may or may not be provided or supplanted by all or a subset of SAAR function-specific firmware programs 523 programs, APIs and/or libraries.

SAAR AI/ML Software Architecture-Application Software. SAAR computer vision and decision-support software 290 may include SAAR application software 524, that may include mission-specific software modules to meet requirements. SAAR application software 524 may be stored on memory modules integrated within the SAAR computer 280 and/or integrated within the SAAR network 800. To support the Selectively Autonomous Aerial Refueling mission, SAAR application software 524 may include support for both Crewed and Semi-Autonomous (man-in-the-loop) Aerial Refueling. SAAR application software 524 may also include support for Autonomous Aerial Refueling. To support the aerial refueling mission, to optimize the AR platform for current weather conditions and AR requirements, and to increase LCA aircraft 101 maximum range and maximum endurance performance, SAAR application software 524 may include support for the optimization of LCAA 101 center of gravity—(SAARCG) 236, and referring to FIG. 2, LCAA 101 angle of attackcontrol 436 for angle of attack (not shown) in relation to a reference line and a flight path of the LCAA. To enhance its aerial refueling capabilities and increase flight safety, SAAR application software 524 may support and integrate with one or more SAAR software and firmware 290 application-specific modules. Taking advantage of the other SAAR software and firmware 290 modules, SAAR application software 524 modules may also be networked and integrated with military C2/C4ISR networks and/or IoT networks—such as the Joint All Domain Command and Control (JADC2) Advanced Battle Management System (ABMS) network. Utilizing military C2/C4ISR and/or IoT network integration, SAAR software and firmware 290 modules may send and receive valuable data and intel provided to or by the Joint Mission Planning System (JMPS) 526, Global Command and Control System (GCCS) 527, as well as aircraft predictive-maintenance (PM) systems 528, and ISR, Computer vision and Decision-Support AI/ML systems 529. Network integration with military C2/C4ISR networks and/or IoT networks, the SAAR equipped LCAA 101 is transformed into a tactical edge C3 network node 810, and to act as a networked ISR sensors platform 820, networked ASW weapons platform 830, networked MDA weapons platform 840, networked strike weapons platform 850, networked intelligent swarming fighter weapons platform Skyborg 860—in the crewed, semi-autonomous or autonomous configurations.

SAAR Computer Network Architecture. A SAAR network 800 may provide LCAA 101 aircraft-internal network connectivity between the SAAR computer 280, computer configuration interface 780, sensors 700, sensor data storage and processing 760, SAAR system 201, optional AROS 240, SAAR center-of-gravity (SAARCG) control 236, SAAR aircraft angle of attack control 436, AROS console 241, SAAR Built-In-Test (BIT) subsystem 260, LCAA flight control subsystem 131, and LCAA automatic flight control subsystem (AFCS) 132. SAAR computer network 800 connectivity, facilitated by SAAR computer network and integration software 525 supporting military C2/C4ISR and/or IoT networks within the LCAA 101 aircraft, may facilitate real-time mission operations, alerts and troubleshooting. The LCAA 101 aircraft-internal SAAR computer network 800, by itself, integrated with, or separate from a higher classification aircraft-internal SAAR computer network 880, may provide connectivity between the SAAR computer 280, its application software 524 modules, and its network and integration software 525 supporting military C2/C4ISR and/or IoT networks—such as the Joint All Domain Command and Control (JADC2) Advanced Battle Management System (ABMS) network—along with required support for network protocols, packets, security, crypto, and software applications.

SAAR computer 280, application software 524, and network and integration software 525 connectivity outside of the LCAA 101 aircraft, to military C2/C4ISR and/or IoT networks, is provided by the SAAR computer network 800 and/or the SAAR computer network 880 to facilitate real-time networked integration and operations with the Joint Mission Planning System (JMPS) 526, Global Command and Control System (GCCS) 527, LCA aircraft predictive-maintenance (LCAAPM) systems 528, and/or other externally hosted distributed applications. Additional SAAR application software 524 modules may be necessary to provide support for networked integration with JMPS 526, GCCS 527, LCAAPM 528, and/or other externally hosted distributed systems. SAAR network and integration software 525 connectivity enables the SAAR 201 equipped LCAA 101 to become a tactical edge C3 network node 810, and to act as a networked ISR sensors platform 820, networked ASW weapons platform 830, networked MDA weapons platform 840, networked strike weapons platform 850, networked intelligent swarming fighter weapons platform Skyborg 860—in the crewed, semi-autonomous or autonomous configurations.

In various embodiments, a Low-Cost Attritable Aircraft (LCAA) can be provided comprising: a low-cost aircraft, not originally intended for use in military combat missions, that is converted to a military Low-Cost Attritable Aircraft (LCAA), and a Selectively-Autonomous Aerial Refueling (SAAR) System that is integrated with a low-cost aircraft, to convert it to the LCAA role. The LCAA may be a low-cost aircraft, not originally intended for use where "attritable" is a requirement for an aircraft, that is converted to a military Low-Cost Attritable Aircraft (LCAA), and a Selectively-Autonomous Aerial Refueling (SAAR) System that is integrated with a low-cost aircraft, to convert it to the LCAA role.

In various embodiments, an aerial refueling system may be provided which comprises: a low-cost aircraft, not originally intended for use in the aerial refueling missions, converted to a military Low-Cost Attritable Aircraft (LCAA), and a Selectively-Autonomous Aerial Refueling (SAAR) System that is integrated with a low-cost aircraft, to convert it to the aerial refueling (AR) role. The system many include a low-cost aircraft converted to a military Low-Cost Attritable Aircraft (LCAA), and a Selectively-Autonomous Aerial Refueling (SAAR) System that is integrated with a LCAA, and the SAAR System has a fuselage subassembly configured to be selectively attached to or removed from an interior portion of the LCAA fuselage, the SAAR Aerial Refueling Store (ARS) Installed Internally to the fuselage subassembly, the LCAA further modified with SAAR subsystems to improve its electrical power generating, electrical power distribution, fault detection and isolation systems, the LCAA further modified with SAAR subsystems to improve its aerodynamics, powerplant and flight control systems to improve performance, the LCAA further modified with SAAR subsystems to provide artificial intelligence (AI) and machine learning (ML) software applications for LCAA mission requirements, the LCAA further modified with SAAR subsystems to enable synergistic sensor and network subsystems for LCAA mission requirements, the LCAA further modified with SAAR subsystems to enable computer vision and decision support software applications for LCAA mission requirements, the LCAA may be further modified: with SAAR subsystems to enable semi-autonomous crewed flight, with SAAR subsystems to enable semi-autonomous uncrewed flight, with SAAR subsystems to enable autonomous uncrewed flight, with SAAR subsystems to enable active participation as contributing communications nodes in "tactical edge" secure communications, command, and control (C3) network topologies and secure military Internet of Things (IoT) (aka "tactical edge C3 networks"), with SAAR subsystems to enable active participation as contributing decision-support nodes in "tactical edge C3 networks," with SAAR subsystems to enable active participation as intelligence, surveillance and reconnaissance (ISR) platforms in "tactical edge C3 networks," with SAAR subsystems to enable active participation as anti-submarine warfare (ASW) platforms in "tactical edge C3 networks," with SAAR subsystems to enable active participation as maritime domain awareness (MDA) platforms in "tactical edge C3 networks," with SAAR subsystems to enable active participation as strike platforms in "tactical edge C3 networks," and/or with SAAR subsystems to enable active participation as fighter platforms in "tactical edge C3 networks."

In various embodiments, a Selectively-Autonomous Aerial Refueling (SAAR) system for modifying Low-Cost Attritable Aircraft (LCAA) to enable such aircraft to act as fully functional aerial refueling platforms is provided which comprises: a SAAR fuselage subassembly that removably attaches inside the aft fuselage of Low-Cost Attritable Aircraft (LCAA), the assembly includes a new aft fuselage wall that temporarily replaces a portion of the aircraft aft fuselage wall, retaining its pressurization capabilities, the SAAR fuselage subassembly removably attaches non-destructively to fuselage hard points and is also removably connected to aircraft electrical and fuel subsystems, a new SAAR hose and drum management subsystem for deploying and stowing the refueling hose, a new SAAR Aerial Refueling System (ARS) for deploying the hose/basket/drogue to the correct positions for refueling presentations, the furthest aft area of the SAAR Aerial Refueling System (ARS) also provides an internal container area for the basket/drogue assembly, wherein it may be securely stowed when retracted, a SAAR fuel tank subsystem, a SAAR fuel transfer and management subsystem and a SAAR center-of-gravity (SAARCG) control subsystem operate in conjunction with both the aircraft and SAAR fuel control systems to automatically or manually control the aircraft CG, a SAAR Aerial Refueling System (ARS) for deploying the hose, basket and drogue to optimized positions, that operates in conjunction with a new SAARCG-AFCS Interconnect (SAARCG-AFCS-I) subsystem that provides receiver aircraft with optimized refueling presentations that are selectively stabilized for turbulence, and when extended, the SAAR Aerial Refueling System (ARS) moves the refueling hose, basket and drogue to the aft of and below the aircraft, an Aerial Refueling Operator Station (AROS) provides the Air Refueling Officer (ARO) with effective AROS console and SAAR monitor and control subsystem for safe and efficient completion of refueling missions, and/or integrated SAAR control, lighting and safety subsystems enable safe and efficient AR tanking.

The SAAR system may further include: a lightweight SAAR fuselage subassembly that is assembled and attaches firmly inside the fuselage of Low-Cost Attritable Aircraft (LCAA), wherein, the assembly includes a new aft fuselage wall that temporarily replaces a portion of the aircraft aft fuselage wall, retaining its pressurization capabilities, wherein, a portion of the aft fuselage wall is temporarily replaced in such a manner that enables the aircraft pressurization subsystem to continue to function correctly, wherein, the SAAR fuselage subassembly is itself a pressure vessel that maintains ambient atmospheric pressure, in order to facilitate reliable aerial refueling operations, wherein, the SAAR fuselage subassembly removably attaches non-destructively to fuselage hard points, wherein, the SAAR fuselage subassembly is removably connected to aircraft electrical and fuel subsystems with new power and avionics harnesses and new fuel manifolds, and/or wherein, the SAAR fuselage subassembly includes new fuel tanks and a new fuel/center-of-gravity (CG) control subsystem.

The SAAR system may further comprise: a SAAR Aerial Refueling System (ARS) subsystem for deploying the refueling hose/basket/drogue to the correct positions for refueling presentations, wherein, the furthest aft area of the SAAR Aerial Refueling System (ARS) provides an internal container area for the basket/drogue assembly, wherein it may be securely stowed when retracted, wherein, the SAAR fuselage subassembly is itself a pressure vessel that maintains ambient atmospheric pressure, in order to facilitate reliable aerial refueling operations, wherein, when the refueling hose is extended or retracted, the SAAR Aerial Refueling System (ARS) is operated at ambient atmospheric pressure, wherein, when utilized, the SAAR Aerial Refueling System (ARS) provides the correct aerial refueling presentation for receiver aircraft, and/or wherein, the SAAR Aerial Refueling System (ARS), and its automated modes, are controlled by the Air Refueling Officer (ARO), captain or FO.

In certain embodiments, the SAAR system may include: a new SAAR hose and drum management subsystem for deploying and stowing the refueling hose, wrapping it around the drums, wherein, the drums are rotated to move the refueling hose out of, or back into, the subsystem, wherein, the drums are situated in the subsystem to reduce the vertical and lateral dimensions required to support and enclose them, wherein, the drums are situated in the subsystem to take advantage of the length of the fuselage, wherein, a SAAR Aerial Refueling System (ARS) provides a means to deploy the refueling hose/basket/drogue to the correct positions for refueling presentations, wherein, the SAAR hose and drum management subsystem is constructed to correctly interface, at all times, with the SAAR Aerial Refueling System (ARS), wherein, the SAAR Aerial Refueling System (ARS) internally maintain the stowed refueling hose, wherein, the SAAR hose and drum management subsystem is enclosed within the SAAR fuselage assembly's pressure vessel, which also provides physical separation for aircrew from the SAAR hose and drum management, fuel tanks and SAARCG control subsystems, and/or wherein, the SAAR hose and drum management subsystem enables the Air Refueling Officer (ARO), captain or FO to see the current status of the refueling system and to actuate controls necessary to deploy or retract the refueling hose.

In certain embodiments, the SAAR hose and drum management subsystem may include a drogue and basket subsystem coupled to the refueling hose and constructed to receive a receiver aircraft refueling probe, wherein, the drogue and basket subsystem—once correct drogue engagement, hose-push-forward and Air Refueling Officer (ARO) has enabled refueling—provides fuel from the refueling hose to the receiver aircraft refueling probe, and wherein, the SAAR fuel tanks, fuel pumps, fuel control units, and manifold subsystem deliver fuel to the refueling hose.

The SAAR system may further comprise new SAAR fuel tanks, fuel pumps, fuel control units, and fuel manifold subsystem for storing and manually managing fuel, wherein, the aircraft fuel tanks are filled from outside the aircraft, the aircraft fuel tanks utilize aircraft fuel level sensors to continually monitor and transmit aircraft fuel tank fuel quantities to the aircraft crewmembers, wherein, when selected by the captain or FO for manual fuel management and/or CG control, fuel may be transferred from aircraft fuel tanks to the new SAAR fuel tanks via the dual-walled SAAR fuel manifold subsystem, utilizing the SAAR fuel pumps, controlled by the SAAR fuel control units, wherein, when selected by the captain or FO for manual fuel management and/or CG control, fuel may be transferred back from SAAR fuel tanks and into the aircraft fuel tanks via the dual-walled SAAR fuel manifold subsystem, utilizing the SAAR fuel pumps, controlled by the SAAR fuel control units, wherein, when selected by the captain or FO for manual fuel management and/or CG control, fuel may be transferred from SAAR fuel tanks to other SAAR fuel tanks via the dual-walled SAAR fuel manifold subsystem, utilizing the SAAR fuel pumps, controlled by the SAAR fuel control units, wherein, when selected by the captain, FO or Air Refueling Officer (ARO) for manual aerial refueling, fuel may be transferred from SAAR fuel tanks to the SAAR fuel hose via the dual-walled SAAR fuel manifold subsystem, utilizing the SAAR fuel pumps, controlled by the SAAR fuel control units, and/or wherein, when selected by the captain, FO or Air Refueling Officer (ARO) for manual aerial refueling—where no fuel is transferred to a receiver aircraft, fuel may not be transferred from SAAR fuel tanks to the SAAR fuel hose via the dual-walled SAAR fuel manifold subsystem, and the receiver aircraft "dry plugs" for training purposes.

The SAAR fuel tanks, fuel pumps, fuel control units, and fuel manifold subsystem may include a Selectively-Autonomous Aerial Refueling Automation (SAARA) subsystem for enabling fuel control automation during aerial refueling that reduces aircrew workloads and increases flight safety, wherein, the SAARA subsystem, per selections made by the aircrew, automates fuel pump and fuel control unit (fuel transfer) operations, wherein, when selected by the captain or FO for automated fuel management during aerial refueling, fuel may be transferred from aircraft fuel tanks to the new SAAR fuel tanks via the dual-walled SAAR fuel manifold subsystem, utilizing the SAAR fuel pumps, controlled by the SAAR fuel control units, wherein, when selected by the captain or FO for automated fuel management during aerial refueling, fuel may be transferred from SAAR fuel tanks to other SAAR fuel tanks via the dual-walled SAAR fuel manifold subsystem, utilizing the SAAR fuel pumps, controlled by the SAAR fuel control units, wherein, when selected by the captain, first officer (FO) or Air Refueling Officer (ARO) for automated fuel management during aerial refueling, fuel may be transferred from SAAR fuel tanks to the SAAR fuel hose via the dual-walled SAAR fuel manifold subsystem, utilizing the SAAR fuel pumps, controlled by the SAAR fuel control units, and/or wherein, when selected by the captain, first officer (FO) or Air Refueling Officer (ARO) for automated fuel management during aerial refueling—where no fuel is transferred to a receiver aircraft, fuel may not be transferred from SAAR fuel tanks to the SAAR fuel hose via the dual-walled SAAR fuel manifold subsystem, and the receiver aircraft "dry plugs" for training purposes.

The SAAR fuel tanks, fuel pumps, fuel control units, and fuel manifold subsystem may include a Selectively-Autonomous Aerial Refueling Center-of-Gravity (SAARCG) subsystem for enabling CG movement automation that enables optimizing the CG for maximum speed/maximum range/maximum endurance flight operations, wherein, the SAARCG subsystem, per selections made by the aircrew, automates fuel pump and fuel control unit (fuel transfer) operations, wherein, when selected by the captain or FO for automated CG control during maximum speed/maximum range/maximum endurance flight, the SAARCG subsystem may direct transfer of fuel from aircraft fuel tanks to the new SAAR fuel tanks via the dual-walled SAAR fuel manifold subsystem, utilizing assistance from the SAAR fuel pumps, controlled by the SAAR fuel control units, and/or wherein, when selected by the captain or FO for automated CG control during maximum speed/maximum range/maximum endurance flight, the SAARCG subsystem may direct transfer of fuel from SAAR fuel tanks to other SAAR fuel tanks via the dual-walled SAAR fuel manifold subsystem, utilizing assistance from the SAAR fuel pumps, controlled by the SAAR fuel control units.

The SAAR fuel tanks, fuel pumps, fuel control units, and fuel manifold subsystem may further comprise a Selectively-Autonomous Aerial Refueling Center-of-Gravity (SAARCG) subsystem for enabling CG movement automation that enables optimizing the CG for aerial refueling operations, wherein, the SAARCG subsystem, per selections made by the aircrew, automates fuel pump and fuel control unit (fuel transfer) operations, wherein, when selected by the captain or FO for automated CG control during aerial refueling operations, the SAARCG subsystem may direct transfer of fuel from aircraft fuel tanks to the new SAAR fuel tanks via the dual-walled SAAR fuel manifold subsystem, utilizing assistance from the SAAR fuel pumps, controlled by the SAAR fuel control units, wherein, when selected by the captain or FO for automated CG control during aerial refueling operations, the SAARCG subsystem may direct transfer of fuel from SAAR fuel tanks to other SAAR fuel tanks via the dual-walled SAAR fuel manifold subsystem, utilizing assistance from the SAAR fuel pumps, controlled by the SAAR fuel control units, and/or wherein, when selected by the captain, FO or ARO for automated CG control for aerial refueling operations, the SAARCG subsystem may direct transfer of fuel from SAAR fuel tanks to the SAAR fuel hose via the dual-walled SAAR fuel manifold subsystem, utilizing the SAAR fuel pumps, controlled by the SAAR fuel control units.

The SAARCG subsystem may comprise a selective SAARCG-AFCS Interconnect (SAARCG-AFCS-I) subsystem that enables optimizing CG+AFCS for maximum speed/maximum range/maximum endurance flight operations—based on current aircraft, weather, inflight refueling, CG and AFCS variables, wherein, the SAARCG-AFCS subsystem, per selections made by the aircrew, automates fuel pump and fuel control unit (fuel transfer) operations, wherein, when selected by the captain or FO for interconnected SAARCG and AFCS operations during maximum speed/maximum range/maximum endurance flight, the SAARCG subsystem may direct transfer of fuel from aircraft fuel tanks to the new SAAR fuel tanks via the dual-walled SAAR fuel manifold subsystem, utilizing assistance from the SAAR fuel pumps, controlled by the SAAR fuel control units, wherein, when selected by the captain or FO for interconnected SAARCG and AFCS operations during maximum speed/maximum range/maximum endurance flight, the SAARCG subsystem may direct transfer of fuel back from new SAAR fuel tanks and into the aircraft fuel tanks, via the dual-walled SAAR fuel manifold subsystem, utilizing assistance from the SAAR fuel pumps, controlled by the SAAR fuel control units, wherein, when selected by the captain or FO for interconnected SAARCG and AFCS operations during maximum speed/maximum range/maximum endurance flight, the SAARCG subsystem may direct transfer of fuel from SAAR fuel tanks to other SAAR fuel tanks via the dual-walled SAAR fuel manifold subsystem, utilizing assistance from the SAAR fuel pumps, controlled by the SAAR fuel control units.

The SAARCG subsystem may include a selective SAARCG-AFCS Interconnect (SAARCG-AFCS-I) subsystem that enables optimizing CG+AFCS for aerial refueling operations-based on current aircraft, weather, inflight refueling, CG and AFCS variables, wherein the SAARCG-AFCS subsystem, per selections made by the aircrew, automates fuel pump and fuel control unit (fuel transfer) operations, wherein, when selected by the captain or FO for interconnected SAARCG and AFCS operations during aerial refueling, the SAARCG subsystem may direct transfer of fuel from aircraft fuel tanks to the new SAAR fuel tanks via the dual-walled SAAR fuel manifold subsystem, utilizing assistance from the SAAR fuel pumps, controlled by the SAAR fuel control units, wherein, when selected by the captain or FO for interconnected SAARCG and AFCS operations during aerial refueling, the SAARCG subsystem may direct transfer of fuel back from new SAAR fuel tanks and into the aircraft fuel tanks, via the dual-walled SAAR fuel manifold subsystem, utilizing assistance from the SAAR fuel pumps, controlled by the SAAR fuel control units, and/or wherein, when selected by the captain or FO for interconnected SAARCG and AFCS operations during aerial refueling, the SAARCG subsystem may direct transfer of fuel from SAAR fuel tanks to other SAAR fuel tanks via the dual-walled SAAR fuel manifold subsystem, utilizing assistance from the SAAR fuel pumps, controlled by the SAAR fuel control units.

The SAAR fuel tanks, fuel pumps, fuel control units, and fuel manifold subsystem may include a new dual-walled fuel manifold subsystem, which provides reliable management and movement of fuel for the fuel tanks, fuel pumps, fuel control units and aircraft fuel system, wherein the SAAR fuel tanks are each configured to be removably coupled to the dual-walled fuel manifold subsystem, wherein the SAAR fuel pumps are each configured to be removably coupled to the dual-walled fuel manifold subsystem, wherein the SAAR fuel control units are each configured to be removably coupled to the dual-walled fuel manifold subsystem, wherein the SAAR hose and drum management subsystem, refueling hose, basket and drogue are configured to be removably coupled to the dual-walled fuel manifold subsystem, wherein the dual-walled fuel manifold subsystem is configured to be removably coupled to a single-walled fuel manifold of the fuel system of the Low-Cost Attritable Aircraft (LCAA).

The SAAR system may include a new SAARCG-AFCS Interconnect (SAARCG-AFCS-I) subsystem that provides receiver aircraft with correct refueling presentations that are selectively stabilized for turbulence, wherein, when extended, the SAAR Aerial Refueling System (ARS) is located below the aircraft, wherein, when extended, the refueling hose and basket/drogue subsystem are deployed to accept receiver aircraft refueling missions, wherein, when the Air Refueling Officer (ARO) selects the SAARCG-AFCS "stabilized" mode for the basket/drogue on the SAAR control subsystem, and/or wherein, the pilot or FO have selectively turned on the aircraft AFCS system, the refueling hose and basket/drogue are presented to the receiver aircraft in the "stabilized" mode.

The SAAR system may include an integrated SAAR Aerial Refueling Operator Station (AROS), that provides an Air Refueling Officer (ARO) an ergonomic mission station, and an AROS console with effective aerial refueling monitor and control subsystems, for safe and efficient completion of aerial refueling missions, wherein, the ARO is provided easy entry and exit to move into the AROS, wherein the ARO, when in position at the AROS, has access to the AROS console and SAAR controls, wherein, the ARO is provided a comfortable secure seat and restraint devices in the AROS, wherein the ARO is provided ergonomic adjustable supports to provide comfortable working conditions during lengthy flights in the AROS, wherein, the ARO, when in position at the AROS console, is provided all displays, alerts and communications necessary to conduct safe aerial refueling missions, wherein, the ARO, in position at the AROS console, is provided displays and alerts for all subsystems within the SAAR system, wherein, the ARO, in position at the AROS console, controls many of the subsystem controls within the SAAR system, and/or wherein, once the refueling aircraft has engaged the basket and moved it forward the optimal distance, refueling is commenced by the ARO.

The SAAR system may include an integrated AROS console that provides the captain, FO and ARO SAAR displays and alerts for situational awareness, and SAAR controls for managing the SAAR systems, wherein, two AROS consoles are provided—one AROS console located in the AROS station for the Air Refueling Officer (ARO), and one AROS console located in the aircraft cockpit for the captain and FO, wherein, the AROS console provides necessary SAAR monitors and controls to safely and efficiently conduct manual aerial refueling operations, wherein, the AROS console provides controls for Aerial Refueling, fuel management and control systems operations, to support safe and efficient aerial refueling missions, wherein, the AROS console and the SAAR Aerial Refueling System (ARS) enables the ARO, captain or FO to manually or automatically complete the refueling hose, basket and drogue deployment, retraction, and inflight refueling processes, wherein, the AROS console and the SAAR hose management subsystem enables the ARO, captain or FO to manually or automatically complete the refueling hose deployment, retraction, and inflight refueling processes, and/or wherein, the AROS console and the SAARA fuel management automation subsystem enables the ARO, captain or FO to manually or automatically complete the monitor and control of aircraft and SAAR fuel quantities, fuel offload and CG management—in order to enable them to better focus on flying the aircraft and completing the aerial refueling mission.

The SAAR system may include an integrated SAAR light management subsystem that enables safe and efficient aerial refueling, wherein, two SAAR light management subsystem control stations are provided—one located in the AROS console in the AROS station for the Air Refueling Officer (ARO), and one located in the AROS console in the aircraft cockpit for the captain and FO, wherein, the SAAR light management subsystem enables the ARO, captain and FO to adjust the (normal or night vision device) lighting, per receiver pilot requests, wherein the SAAR light management subsystem provides brightness levels, per adjustments made by the ARO, captain and FO, to accommodate receiver pilot requests, wherein the SAAR aircraft lighting scheme (normal or night vision device), provides an appropriate presentation, and enables receiver pilots to better see the SAAR aircraft, wherein a refueling hose and basket/drogue light (normal or night vision device), enables receiver pilots to see the refueling hose and basket/drogue, wherein, automation options on the light management subsystem enables the ARO, captain and FO to adjust the (normal or night vision device) lighting settings, per the receiver pilots requests, and the system automatically adjusts brightness levels as ambient light changes, wherein, a refueling hose and basket/drogue assembly emergency light management subsystem enables the ARO, captain and FO to select emergency breakaway and other aerial refueling safety condition light settings, and/or wherein the emergency light management subsystem automatically adjusts light settings based on ambient light and the emergency selections made by the tanker aircrew.

The SAAR system may include an integrated SAAR Built-In-Test (BIT) subsystems, that enable safe and efficient aerial refueling, wherein, the BIT subsystem completes subsystem status tests on the electronic, hydraulic, securing/latching, software, and subsystems, wherein the BIT subsystem provides a status report to the tanker aircrew on initial aircraft startup, wherein the BIT subsystem provides a status report to the tanker aircrew after each drogue disengagement, wherein the BIT subsystem provides a status report to the tanker aircrew whenever it is requested by the tanker aircrew, and/or wherein the BIT subsystem provides a status report to the tanker aircrew upon certain events that are monitored several times per second.

The SAAR system may include a SAAR electrical power harness, which reliably provides necessary electrical power to provide for all aerial refueling, displays, alerts, hydraulic, control, lighting and safety subsystem needs, wherein the SAAR electrical power harness, removably connects to the aircraft electric power generating and distribution system and is removably integrated with the aircraft's (modified) electrical fault detection and circuit breaker systems, and wherein the aircraft electric power generating and distribution system has been modified to safely and reliably provide the SAAR electrical power harness the voltage and amperage needed.

In certain embodiments, the SAAR system may include: a SAAR electrical power harness coupling system, which reliably provides a removable connection to the aircraft electric power generating and distribution system for necessary electrical power; an aircraft fuel coupling system, which reliably provides a removable connection to the aircraft fuel control system for necessary fuel transfer; a refueling hose guillotine, which reliably provides a near-real-time means to physically disconnect the hose and basket/drogue subsystems from the SAAR system and aircraft; a SAAR system jettison, which reliably provides a near-real-time means to physically jettison the SAAR system away from the aircraft, without jettisoning or negatively impacting the SAAR seated observation and control (SAARSOC) station and Air Refueling Officer (ARO); a SAAR system jettison subsystem, which reliably provides a near-real-time means to physically detach and jettison the SAAR system aft and away from the aircraft, without negatively impacting the SAAR seated observation and control (SAARSOC) station and Air Refueling Officer (ARO); a SAAR fuel control units emergency self-sealing subsystem, which reliably provides a near-real-time means to physically seal selected fuel manifolds and fuel tanks from the rest of the fuel subsystem; a SAAR expedited ground refueling subsystem, that enables the refueling of aircraft, vehicles, and fuel cells on the ground; an Artificial Intelligence/Machine Learning "agile edge" network node, that enables tactical edge Communications Command and Control (C3), Intelligence Surveillance Reconnaissance (ISR), Anti-Submarine Warfare (ASW), networked sensors, networked weapons, networked fighter, and swarming aircraft missions—in the crewed, semi-autonomous or autonomous configurations; an Artificial Intelligence/Machine Learning warfighting platform, that provides flight crewmen or autonomous flight control subsystems with computer vision processing, intelligent decision aids and alerts, with the goal of enabling converted LCAAs to perform safe and effective aerial refueling, tactical edge Communications Command and Control (C3), Intelligence Surveillance Reconnaissance (ISR), Anti-Submarine Warfare (ASW), Maritime Domain Awareness (MDA), networked sensors, networked weapons, and networked fighter missions—in the crewed, semi-autonomous or autonomous configurations; a SAAR replacement generator, alternator and/or ram air turbine (RAT), and power distribution wiring harness improvements that enables safe and efficient aerial refueling; and/or a SAAR replacement wing, wingtips, deicing, engine mounts, main landing gear system, and fuel tank systems that enables safe and efficient aerial refueling, improved aerodynamics, reduced drag, increased fuel capacity, increased range, increased endurance, higher altitudes and higher speeds.

A method can be provided for providing Selectively-Autonomous Aerial Refueling operations with Low-Cost Attritable Aircraft (LCAA), and the method may include selectively automating deployment of the refueling hose aft and downward—from its stowed position within the SAAR Aerial Refueling System (ARS), that is positioned below the LCA aircraft fuselage, which is a sealed pressure vessel open to the atmosphere—to a position aft and below the aircraft fuselage, angled below the aircraft longitudinal axis, to a deployed position; selectively-automating extending a refueling hose into the slipstream—from its stowed position in the SAAR Aerial Refueling System (ARS), which is attached firmly inside the Low-Cost Attritable Aircraft (LCAA) fuselage with a carriage assembly; selectively-automating management of fuel movement within both the Low-Cost Attritable Aircraft (LCAA) fuel tanks and AR fuselage subassembly fuel tanks to control the aircraft center-of-gravity (CG); selectively-automating basket/drogue stabilization—in combination with selective aircraft flight control and selective aircraft CG control—to provide correct refueling presentations of the refueling hose/basket/drogue to receiver aircraft in turbulence; and/or selectively-automating fuel transfer—from a combination of aircraft fuel tanks and AR fuselage subassembly fuel tanks, while selectively-automating management of aircraft CG control—through the refueling hose to the drogue for receiving by a refueling probe of a receiver aircraft.

The method may include deploying the refueling hose aft and downward from the SAAR Aerial Refueling System (ARS) to a deployed position to provide a correct refueling presentation, managing the aircraft center-of-gravity (CG), stabilizing the basket/drogue in combination with aircraft flight control and aircraft CG control, and completing transfer of fuel from the fuel tanks are all monitored, Selectively-Autonomous, and controlled by an AROS console operated by the captain, FO and ARO. The method may include stopping fuel transfer; retracting the refueling hose into the SAAR Aerial Refueling System (ARS), from the deployed position to the stowed position.

The method may include installing an AR fuselage subassembly, which is a sealed pressure vessel that retains aircraft pressurization when fitted and sealed into the aircraft aft fuselage; replacing a small portion of the Low-Cost Attritable Aircraft (LCAA) lower fuselage (floor) wall with the AR fuselage subassembly floor wall; replacing a small portion of the Low-Cost Attritable Aircraft (LCAA) aft fuselage wall with the AR fuselage subassembly aft wall; the AR fuselage subassembly, SAAR Aerial Refueling System (ARS), refueling hose, basket/drogue, fuel tanks, fuel manifolds, fuel pumps, fuel control units, observation station, and an AROS station and AROS console; coupling the aircraft fuel system to the AR fuselage subassembly fuel system via fuel manifolds; coupling the AR fuselage subassembly fuel system to a SAAR Aerial Refueling System (ARS) via fuel manifolds; coupling the SAAR Aerial Refueling System (ARS) to a refueling hose; the SAAR Aerial Refueling System (ARS) comprising an internally routed refueling hose and a basket/drogue container area; the SAAR Aerial Refueling System (ARS) dynamically positioning the refueling hose around the drums; coupling the refueling hose to the basket/drogue; connecting the AROS station and the AROS console to the AR fuselage subassembly and subsystems; and/or the AROS console configured to provide the displays and controls necessary to manage and selectively-automate the SAAR Aerial Refueling System (ARS), refueling hose, basket/drogue and stabilization, fuel tanks, fuel manifolds, fuel pumps, fuel control units and CG management and to control movement of fuel from the fuel tanks of the Low-Cost Attritable Aircraft (LCAA) to the drogue.

The method may also include securing the AR fuselage subassembly within the fuselage of the Low-Cost Attritable Aircraft (LCAA); replacing select portions of the existing electrical power generation and distribution system within the Low-Cost Attritable Aircraft (LCAA); and replacing the wing, wingtips, engine mounts, main landing gear system, wing fuel tank systems, and select other systems, within the Low-Cost Attritable Aircraft (LCAA).

In various embodiments, an aircraft configuration may comprise, in combination, an LCAA with a pressurized internal fuselage area; the sealed replacement of a small portion of its lower floor fuselage wall with a new wall, which is the floor wall of a pressure sealed SAAR fuselage assembly; the sealed replacement of a small portion of its lower aft fuselage wall with a new wall, which is the aft wall of a pressure sealed SAAR fuselage assembly; the unpressurized but sealed SAAR fuselage assembly, situated internally to the fuselage, and temporarily and non-destructively affixed to internal hard points inside the fuselage; wings, horizontal stabilizer and vertical stabilizer attached to the outside of the fuselage; an aircraft fuel system, modified to temporarily connect to the SAAR fuselage subassembly fuel system; an array of SAAR fuel tanks, internal to the SAAR fuselage assembly; a Selectively-Autonomous fuel/center-of-gravity (CG) control system and SAAR fuel transfer and management subsystem, internal to the SAAR fuselage assembly; an aircraft electrical system, modified to temporarily connect to the SAAR fuselage subassembly electrical system; a SAAR AROS installed with the SAAR fuselage assembly; an AROS Console integrated into the SAAR AROS; an AROS Console integrated with the Aircraft Cockpit; a refueling hose stowed internal to the SAAR Aerial Refueling System (ARS); a refueling hose with a drogue/basket, and lines painted for receiver pilot cues; a guide tube container area, that provides secure stowage for the basket/drogue assembly, when it is retracted; multiple automated AR control systems—that assist the SAAR monitor and control subsystem, fuel tanks, automated fuel/center-of-gravity (CG) control system, fuel transfer and management subsystem, and SAAR fuselage assembly, and are integrated with the aircraft fuel tanks and aircraft flight control subsystem; multiple lighting and safety subsystems—that are integrated with the SAAR and aircraft subsystems; a SAAR Aerial Refueling System (ARS) guides the refueling hose to a deployed position aft and below the Low-Cost Attritable Aircraft (LCAA); and/or the control station configured to provide the displays and controls necessary to manage and selectively-automate the SAAR Aerial Refueling System (ARS), refueling hose, basket/drogue and stabilization, fuel tanks, fuel manifolds, fuel pumps, fuel control units and CG management and to control movement of fuel from the fuel tanks of the Low-Cost Attritable Aircraft (LCAA) to the drogue.

Aircraft configurations may embody a low-cost, high-performance aircraft combined with a conversion kit that results in a low-cost attritable aircraft (LCAA), that results in a military aerial refueler, and/or that results in an effective communications and decision-making node for military tactical edge C3 networks.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, method of use cases, or screen displays described herein can be necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual (e.g., cloud-based), permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, TypeScript, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, cellular network communication, power line communication, or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 (Oracle) application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture. Certain embodiments of the invention may employ web servers such as Apache web servers, for example.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "connected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components. Such technologies can be generally well known by those of ordinary skill in the art and, consequently, can be not described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

In various embodiments of the present invention, different types of artificial intelligence tools and techniques can be incorporated and implemented. Search and optimization tools including search algorithms, mathematical optimization, and evolutionary computation methods can be used for intelligently searching through many possible solutions. For example, logical operations can involve searching for a path that leads from premises to conclusions, where each step is the application of an inference rule. Planning algorithms can search through trees of goals and subgoals, attempting to find a path to a target goal, in a process called means-ends analysis.

Heuristics can be used that prioritize choices in favor of those more likely to reach a goal and to do so in a shorter number of steps. In some search methodologies heuristics can also serve to eliminate some choices unlikely to lead to a goal. Heuristics can supply a computer system with a best estimate for the path on which the solution lies. Heuristics can limit the search for solutions into a smaller sample size, thereby increasing overall computer system processing efficiency.

Propositional logic can be used which involves truth functions such as "or" and "not" search terms, and first-order logic can add quantifiers and predicates, and can express facts about objects, their properties, and their relationships with each other. Fuzzy logic assigns a degree of truth (e.g., between 0 and 1) to vague statements which may be too linguistically imprecise to be completely true or false. Default logics, non-monotonic logics and circumscription are forms of logic designed to help with default reasoning and the qualification problem. Several extensions of logic can be used to address specific domains of knowledge, such as description logics, situation calculus, event calculus and fluent calculus (for representing events and time), causal calculus, belief calculus (belief revision); and modal logics. Logic for modeling contradictory or inconsistent statements arising in multi-agent systems can also be used, such as paraconsistent logics.

Probabilistic methods can be applied for uncertain reasoning, such as Bayesian networks, hidden Markov models, Kalman filters, particle filters, decision theory, and utility theory. These tools and techniques help the system execute algorithms with incomplete or uncertain information. Bayesian networks are tools that can be used for various problems: reasoning (using the Bayesian inference algorithm), learning (using the expectation-maximization algorithm), planning (using decision networks), and perception (using dynamic Bayesian networks). Probabilistic algorithms can be used for filtering, prediction, smoothing and finding explanations for streams of data, helping perception systems to analyze processes that occur over time (e.g., hidden Markov models or Kalman filters). Artificial intelligence can use the concept of utility as a measure of how valuable something is to an intelligent agent. Mathematical tools can analyze how an agent can make choices and plan, using decision theory, decision analysis, and information value theory. These tools include models such as Markov decision processes, dynamic decision networks, game theory and mechanism design.

The artificial intelligence techniques applied to embodiments of the invention may leverage classifiers and controllers. Classifiers are functions that use pattern matching to determine a closest match. They can be tuned according to examples known as observations or patterns. In supervised learning, each pattern belongs to a certain predefined class which represents a decision to be made. All of the observations combined with their class labels are known as a data set. When a new observation is received, that observation is classified based on previous experience. A classifier can be trained in various ways; there are many statistical and machine learning approaches. The decision tree is one kind of symbolic machine learning algorithm. The naive Bayes classifier is one kind of classifier useful for its scalability, in particular. Neural networks can also be used for classification. Classifier performance depends in part on the characteristics of the data to be classified, such as the data set size, distribution of samples across classes, dimensionality, and the level of noise. Model-based classifiers perform optimally when the assumed model is an optimized fit for the actual data. Otherwise, if no matching model is available, and if accuracy (rather than speed or scalability) is a primary concern, then discriminative classifiers (e.g., SVM) can be used to enhance accuracy.

A neural network is an interconnected group of nodes which can be used in connection with various embodiments of the invention, such as execution of various methods, processes, or algorithms disclosed herein. Each neuron of the neural network can accept inputs from other neurons, each of which when activated casts a weighted vote for or against whether the first neuron should activate. Learning achieved by the network involves using an algorithm to adjust these weights based on the training data. For example, one algorithm increases the weight between two connected neurons when the activation of one triggers the successful activation of another. Neurons have a continuous spectrum of activation, and neurons can process inputs in a non-linear way rather than weighing straightforward votes. Neural networks can model complex relationships between inputs and outputs or find patterns in data. They can learn continuous functions and even digital logical operations. Neural networks can be viewed as a type of mathematical optimization which performs a gradient descent on a multi-dimensional topology that was created by training the network. Another type of algorithm is a backpropagation algorithm. Other examples of learning techniques for neural networks include Hebbian learning, group method of data handling (GMDH), or competitive learning. The main categories of networks are acyclic or feedforward neural networks (where the signal passes in only one direction), and recurrent neural networks (which allow feedback and short-term memories of previous input events). Examples of feedforward networks include perceptrons, multi-layer perceptrons, and radial basis networks.

Deep learning techniques applied to various embodiments of the invention can use several layers of neurons between the network's inputs and outputs. The multiple layers can progressively extract higher-level features from the raw input. For example, in image processing, lower layers may identify edges, while higher layers may identify the concepts relevant to a human such as digits, letters, or faces. Deep learning may involve convolutional neural networks for many or all of its layers. In a convolutional layer, each neuron receives input from only a restricted area of the previous layer called the neuron's receptive field. This can substantially reduce the number of weighted connections between neurons. In a recurrent neural network, the signal will propagate through a layer more than once. A recurrent neural network (RNN) is another example of a deep learning technique which can be trained by gradient descent, for example.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as claimed herein.

What is claimed is:

1. An aircraft modification system for an aircraft, the aircraft having an aircraft fuselage, aircraft flight control surfaces, and aircraft subsystems comprising one or more aircraft fuel systems, and an aircraft flight control system (FCS), the aircraft being characterized by an aircraft center-of-gravity (CG), the aircraft modification system comprising:

an aerial refueling system (ARS);
an ARS fuel management subsystem operatively integrated with the ARS;
an ARS carriage assembly secured inside the aircraft fuselage and configured to support and secure the ARS when the ARS is installed within the ARS carriage assembly;
a fuselage subsystem secured to the aircraft fuselage and configured to support and secure the ARS carriage assembly when the ARS carriage assembly is installed within the fuselage subsystem;
a center-of-gravity (CG) subsystem configured to control movement of fuel between and to and from a plurality of fuel tanks to manage and control the aircraft CG;
a refueling system(s) manager
operatively integrated with and configured to manage
the one or more aircraft fuel systems,
the ARS,
the ARS fuel management subsystem,
the aircraft FCS, and
the CG subsystem,
to manage and control the aircraft CG; and
interface subsystems comprising
one or more support structures configured to provide structural support or reinforcement for, and between, the aircraft fuselage, the fuselage subsystem, the ARS carriage assembly, the ARS, and the refueling system(s) manager, the one or more support structures comprising one or more adjustable structures, and
one or more operative interconnection systems configured to operatively interface the aircraft, the aircraft subsystems, the fuselage subsystem, the ARS carriage assembly, the ARS, and the refueling system(s) manager with each other.

2. The aircraft modification system of claim 1, the aircraft also having one or more aircraft fuel management subsystems:
wherein the refueling system(s) manager is operatively integrated with and configured to manage
the one or more aircraft fuel systems,
the one or more aircraft fuel management subsystems,
the ARS,
the ARS fuel management subsystem,
the aircraft FCS, and
the CG subsystem,
to manage and control the aircraft CG.

3. The aircraft modification system of claim 2, the aircraft also having an aircraft automatic flight control system (AFCS):
wherein the refueling system(s) manager is operatively integrated with and configured to manage
the one or more aircraft fuel systems,
the one or more aircraft fuel management subsystems,
the ARS,
the ARS fuel management subsystem,
the aircraft FCS,
the aircraft AFCS, and
the CG subsystem,
to manage and control the aircraft CG.

4. The aircraft modification system of claim 3, the aircraft being characterized by an aircraft center of lift (CL), the aircraft modification system further comprising:
one or more AI/ML subsystems;
a flight control system (FCS) configured to manage and control the aircraft flight control surfaces
in consideration of and responsive to
onboard crewed aircraft or offboard remote pilot flight control inputs, or
automatic flight control system (AFCS) inputs, or onboard or offboard AI flight control inputs, and
in consideration of and responsive to
a current location of the aircraft center-of-gravity (CG),
the FCS being configured to manage and control the aircraft flight control surfaces
such that FCS-controlled movement of the aircraft flight control surfaces manages
aircraft aerodynamic control: roll, pitch, yaw, acceleration, deceleration,
aircraft flight performance: speed, straight and level, climb, descent, turn, and
the aircraft center of lift (CL); and
a CG subsystem-AFCS interconnect (CG-AFCS-I) subsystem configured to manage and control
movement of fuel
within the aircraft modification system and the aircraft,
in coordination with
the CG subsystem,
the aircraft fuel management subsystem,
the one or more AI/ML subsystems,
the AFCS, and
the FCS,
to dynamically manage the interaction of purposeful movements of the aircraft CG and of the aircraft flight controls, respectively,
to manage and control
the aircraft aerodynamic control: roll, pitch, yaw, acceleration, deceleration,
the aircraft flight performance: speed, straight and level, climb, descent, turn, and
aircraft flight performance stability, and
to assist in providing one or more receiver aircraft with correct refueling presentations.

5. The aircraft modification system of claim 3, further comprising:
one or more AI/ML subsystems;
an aerial refueling (AR) hose; and
a drogue and basket subsystem operatively connected to the AR hose; and
wherein the refueling system(s) manager is configured to operatively manage or interface with
the one or more aircraft fuel systems,
the one or more aircraft fuel management subsystem(s),
the ARS,
the AR hose,
the drogue and basket subsystem,
the ARS fuel management subsystem,
the aircraft FCS,
the aircraft AFCS,
the AFCS,
the CG subsystem,
the aircraft fuel management subsystem, and
the one or more AI/ML subsystems,
in providing selectively stabilized AR presentations of the AR hose and the drogue and basket subsystem to one or more receiver aircraft.

6. The aircraft modification system of claim 5, the aircraft also having an aircraft CG subsystem:
wherein the refueling system(s) manager is configured to operatively manage or interface with
the one or more aircraft fuel systems,
the one or more aircraft fuel management subsystem(s),
the ARS,
the AR hose,
the drogue and basket subsystem,
the ARS fuel management subsystem,
the aircraft FCS,
the aircraft AFCS,
the AFCS,
the aircraft CG subsystem,
the CG subsystem,
the aircraft fuel management subsystem, and
the one or more AI/ML subsystems,
in providing selectively stabilized AR presentations of the AR hose and the drogue and basket subsystem to one or more receiver aircraft.

7. The aircraft modification system of claim 1,
wherein the ARS carriage assembly is installed within the fuselage subsystem and comprises
a carriage floor,
a plurality of structural columns, and
a plurality of support members extending along the carriage floor;
wherein the carriage floor comprises load bearing locations, and the plurality of structural columns and the plurality of support members are secured to the carriage floor at the load bearing locations and configured to longitudinally, vertically, laterally, and rotationally support and secure the ARS when the ARS is installed within the ARS carriage assembly; and
wherein the fuselage subsystem comprises
a sealed fuselage subsystem.

8. The aircraft modification system of claim 1,
wherein the ARS carriage assembly is installed within the fuselage subsystem and comprises
a carriage floor,
a plurality of structural columns, and
a plurality of support members extending along the carriage floor;
wherein the carriage floor comprises load bearing locations, and the plurality of structural columns and the plurality of support members are secured to the carriage floor at the load bearing locations and configured to longitudinally, vertically, laterally, and rotationally support and secure the ARS when the ARS is installed within the ARS carriage assembly; and
wherein the fuselage subsystem comprises
an unsealed fuselage subsystem.

9. The aircraft modification system of claim 1,
wherein the ARS carriage assembly is installed within the fuselage subsystem and configured to support and secure the ARS in a parallel orientation in which an ARS longitudinal axis of the ARS is substantially parallel with an aircraft longitudinal axis when the ARS is installed within the ARS carriage assembly.

10. The aircraft modification system of claim 9, the aircraft fuselage comprising a lower wall portion, the aircraft modification system further comprising:
an aerial refueling (AR) hose operatively connected to the ARS;
a curved guidetube configured to receive the AR hose therein and direct the AR hose when the AR hose is being deployed; and
a drogue and basket subsystem operatively connected to the AR hose and configured to extend aftward from the curved guidetube when the AR hose is extended outward; and
wherein the fuselage subsystem comprises a sealed fuselage subsystem comprising an exit configured, at the lower wall portion of the aircraft fuselage, to provide a passageway for the curved guidetube to extend downwardly from the sealed fuselage subsystem and guide the AR hose, when the AR hose is being deployed, into a position that provides smoother air and greater stability for the AR hose and the drogue and basket subsystem, and in providing selectively stabilized AR presentations of the AR hose and the drogue and basket subsystem to one or more receiver aircraft.

11. The aircraft modification system of claim 10,
wherein the sealed fuselage subsystem is sealed against the aircraft fuselage and configured such that pressure inside the sealed fuselage subsystem is maintained at the ambient external pressure and pressure inside the aircraft fuselage is pressurized to maintain a desired pressurization for human aircrew and systems operators.

12. The aircraft modification system of claim 10,
wherein the curved guidetube is fixedly secured in position in relation to the sealed fuselage subsystem when the AR hose is being deployed.

13. The aircraft modification system of claim 10,
wherein the curved guidetube has end portions that are substantially parallel to horizon of earth, the curved guidetube, between the end portions, initially curving downward moving aftward and then curving upward to being horizontal again at the aft end of the curved guidetube;
wherein the curved guidetube has dimensions and an internal shape configured such that the AR hose longitudinal axis, where the AR hose enters the curved guidetube inside the sealed fuselage subsystem, is substantially parallel to the curved guidetube entrance longitudinal axis when the AR hose is
stowed,
in transit aft or forward, and
deployed, and
the AR hose longitudinal axis, where the AR hose exits the curved guidetube outside in the slipstream, is substantially parallel to the curved guidetube exit longitudinal axis when the AR hose is
stowed,
in transit aft or forward, and
deployed; and
wherein the dimensions and the internal shape of the curved guidetube, as well as materials and internal coefficient of friction, are configured to
provide responsive, unrestricted movement of the AR hose within the curved guidetube.

14. The aircraft modification system of claim 10,
wherein the curved guidetube is configured to provide smooth unobstructed movement of the AR hose through the curved guidetube when the AR hose is being deployed, when aerial refueling operations are occurring, and when the AR hose is being retracted.

15. The aircraft modification system of claim 1,
wherein the ARS carriage assembly is installed within the fuselage subsystem and configured to support and secure the ARS in an inclined orientation in which an ARS longitudinal axis of the ARS has a 5 degree to 15 degree incline in relation to an aircraft longitudinal axis when the ARS is installed within the ARS carriage assembly.

16. The aircraft modification system of claim 15, the aircraft fuselage comprising a lower wall portion, the aircraft modification system further comprising:
an aerial refueling (AR) hose operatively connected to the ARS;
a drogue and basket subsystem operatively connected to the AR hose;
a straight guidetube configured to receive the AR hose therein and direct the AR hose when the AR hose is being deployed; and
a drogue and basket subsystem operatively connected to the AR hose and configured to extend aftward from the straight guidetube when the AR hose is extended; and
wherein the fuselage subsystem comprises a sealed fuselage subsystem comprising an exit configured, at the lower wall portion of the aircraft fuselage, to provide a passageway for the straight guidetube to extend downwardly from the sealed fuselage subsystem and guide the AR hose, when the AR hose is being deployed, into a position that provides smoother air and greater stability for the AR hose and the drogue and basket subsystem, and in providing selectively stabilized AR presentations of the AR hose and the drogue and basket subsystem to one or more receiver aircraft.

17. The aircraft modification system of claim 16,
wherein the straight guidetube is fixedly secured in position in relation to the sealed fuselage subsystem when the AR hose is being deployed;
wherein the AR hose longitudinal axis, where the AR hose enters the straight guidetube inside the sealed fuselage subsystem, is substantially parallel to the straight guidetube entrance longitudinal axis when the AR hose is
stowed, in transit aft or forward, and
deployed, and
the AR hose longitudinal axis, where the AR hose exits the straight guidetube outside in the slipstream, is substantially parallel to the straight guidetube exit longitudinal axis when the AR hose is
stowed,
in transit aft or forward, and
deployed; and
wherein the dimensions and the internal shape of the straight guidetube, as well as materials and internal coefficient of friction, are configured to
provide responsive, unrestricted AR hose movement within the straight guidetube.

18. The aircraft modification system of claim 16,
wherein the straight guidetube is configured to provide smooth unobstructed movement of the AR hose through the straight guidetube when the AR hose is being deployed, when aerial refueling operations are occurring, and when the AR hose is being retracted.

19. The aircraft modification system of claim 1,
wherein the refueling system(s) manager comprises:
one or more computer processing subsystems operatively integrated with the one or more operative interconnection systems, and
one or more distributed AI/ML software and firmware subsystems operatively integrated with the one or more computer processing subsystems and the one or more operative interconnection systems.

20. The aircraft modification system of claim 1,
wherein the refueling system(s) manager and the interface subsystems are configured to operatively interface with and control
the aerial refueling system (ARS), the AR hose, the drogue and basket subsystem, the CG subsystem, and the aircraft FCS;
wherein the ARS
is operatively connected with, and configured to manage and control,
the AR hose and
the drogue and basket subsystem,
in providing AR hose, drogue, and basket
deployment,
retraction, and
inflight refueling processes; and
wherein the refueling system(s) manager
is operatively interfaced with the ARS and is configured to manage and control the ARS
in providing the AR hose, drogue, and basket,
deployment,
retraction, and
inflight refueling processes,
for providing selectively stabilized AR presentations of the AR hose and the drogue and basket subsystem to one or more receiver aircraft.

21. The aircraft modification system of claim 1, the aircraft subsystems comprising aircraft CG subsystems and aircraft FCS subsystems, the aircraft being characterized by an aircraft center of lift (CL), the aircraft modification system further comprising:
a flight control system (FCS); and
wherein the refueling system(s) manager and the interface subsystems are configured to operatively interface with and control
the aerial refueling system (ARS),
the AR hose,
the drogue and basket subsystem, and
the CG subsystem;
wherein the CG subsystem comprises
one or more CG management subsystems that operatively interface with and control the aircraft subsystems including the one or more aircraft fuel management subsystems, and
one or more CG-to-flight control system (CG-to-FCS) interface systems that operatively interface with and control the CG management subsystems and the FCS;
wherein the CG management subsystems are configured
to manage and control the aircraft CG, and
to interface with and provide data to the one or more CG-to-FCS interface systems;
wherein the one or more CG-to-FCS interface systems are configured to interface with and provide data to the FCS;
wherein the FCS is configured to manage and control the aircraft flight control surfaces in consideration of and responsive to where the aircraft CG is currently located such that the aircraft flight control surfaces manage the center of lift (CL) of the aircraft to balance the CG and the CL; and
wherein the refueling system(s) manager and the interface subsystems
that are operatively interfaced with the ARS and configured to manage and control the ARS
in providing the AR hose, drogue, and basket,
deployment,
retraction, and
inflight refueling processes,
are additionally configured to manage the aircraft CG subsystems and the aircraft FCS subsystems
for providing selectively stabilized AR presentations of the AR hose and the drogue and basket subsystem to one or more receiver aircraft.

22. The aircraft modification system of claim 21,
wherein the refueling system(s) manager, the CG-to-FCS interface systems, the CG management subsystem, and the flight control system
manage and control the aircraft CG and the aircraft flight control surfaces in coordination with each other, for providing
flight performance and mission performance optimization, and
selectively stabilized AR presentations of the AR hose and the drogue and basket subsystem to one or more receiver aircraft.

23. The aircraft modification system of claim 22,
wherein the refueling system(s) manager, the CG-to-FCS interface systems, the CG management subsystem, and the flight control system are configured to provide flight performance and mission performance optimization by increasing/improving one or more of:
endurance,
range,
speed,
mission effectiveness,
fuel remaining for use in the future,
operational effectiveness,
weather and other environmental considerations, and
dynamic planning across multiple parameters for quickly updating plans when conditions and/or mission(s) change.

24. The aircraft modification system of claim 1, the aircraft fuselage comprising a lower fuselage wall:
　wherein the interface subsystems comprise
　　an internal fuselage reinforcement plate and an external fuselage reinforcement plate, that, together, when installed at opposite sides of the lower fuselage wall, are configured to strengthen a portion of the lower fuselage wall.

25. The aircraft modification system of claim 1, the aircraft fuselage comprising fuselage airframe structural hard points:
　wherein the fuselage subsystem comprises
　　a sealed fuselage subsystem installed internally to the aircraft fuselage with the ARS carriage assembly and the ARS being installed inside the sealed fuselage subsystem; and
　wherein the interface subsystems comprise
　　multiple attachment points that are connected to the sealed fuselage subsystem, the multiple attachment points being connected to one or more of the fuselage airframe structural hard points.

26. The aircraft modification system of claim 25,
　wherein the sealed fuselage subsystem is attached to
　　one or more adjustable structures
　　　that are connected to one or more of the fuselage airframe structural hard points
　　　via adjustable length, locking connecting rod trusses; and
　wherein lightweight, adjustable strain gauges
　　measure strain on connecting rod trusses and provide data to reduce the risk of hardware
　　failure at and around the fuselage airframe structural hard points.

27. The aircraft modification system of claim 25, the aircraft fuselage comprising fuselage ports, the aircraft modification system further comprising:
　an ARS pylon between the aircraft fuselage and the ARS; and
　wherein the one or more operative interconnection systems comprise
　　an ARS wiring harness and ARS fuel lines that are configured to be operatively connected to the ARS via the ARS pylon; and
　wherein the sealed fuselage subsystem comprises
　　a pressure vessel that is fitted to the fuselage ports in the aircraft fuselage, for the ARS wiring harness and the ARS fuel lines to have sealed passage to the ARS pylon, such that the aircraft retains pressurization.

28. The aircraft modification system of claim 1,
　wherein the interface subsystems comprise
　　a horizontal stabilizer and a vertical stabilizer attached to one or more external portions/surfaces of the aircraft fuselage.

29. The aircraft modification system of claim 1,
　wherein the one or more adjustable structures comprise adjustable length, locking connecting rod trusses; and
　wherein the aircraft modification system further comprises
　　one or more fuel wiring harnesses and reporting subsystems, and
　　one or more strain and pressure gauges that are operatively interfaced with the one or more adjustable length, locking connecting rod trusses, the one or more strain and pressure gauges being configured to provide strain and pressure gauge data to aircrew via the one or more fuel wiring harnesses and reporting subsystems.

30. The aircraft modification system of claim 1,
　wherein the refueling system(s) manager comprises
　　a fuel management subsystem,
　　one or more fuel measurement subsystems,
　　one or more fuel wiring harnesses and reporting subsystems,
　　a fault detection and isolation subsystem,
　　one or more fuel tanks,
　　one or more fuel distribution subsystems,
　　one or more fuel pumps, and
　　one or more fuel control units.

\* \* \* \* \*